US012542375B2

(12) United States Patent
Hajitabarmarznaki et al.

(10) Patent No.: US 12,542,375 B2
(45) Date of Patent: Feb. 3, 2026

(54) ELECTRONICALLY RECONFIGURABLE POLARIZATION-ROTATING PHASE SHIFTER

(71) Applicant: Wisconsin Alumni Research Foundation, Madison, WI (US)

(72) Inventors: Shiva Hajitabarmarznaki, Madison, WI (US); Nader Behdad, Oregon, WI (US); John H. Booske, McFarland, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 87 days.

(21) Appl. No.: 18/432,839

(22) Filed: Feb. 5, 2024

(65) Prior Publication Data

US 2025/0253547 A1 Aug. 7, 2025

(51) Int. Cl.
*H01Q 21/24* (2006.01)
*H01Q 1/38* (2006.01)
(Continued)

(52) U.S. Cl.
CPC ............... *H01Q 21/24* (2013.01); *H01Q 1/38* (2013.01); *H01Q 9/0407* (2013.01); *H01Q 21/065* (2013.01)

(58) Field of Classification Search
CPC ........ H01Q 21/24; H01Q 1/38; H01Q 9/0407; H01Q 21/065
See application file for complete search history.

(56) References Cited

U.S. PATENT DOCUMENTS

| | | | |
|---|---|---|---|
| 3,668,563 A | 6/1972 | Siekanowicz | |
| 4,725,795 A | 2/1988 | Ajioka et al. | |

(Continued)

FOREIGN PATENT DOCUMENTS

CN 110518338 A * 11/2019 ............... H01Q 1/48

OTHER PUBLICATIONS

Abadi, Seyed Mohamad Amin Momeni Hasan, and Nader Behdad. "Inductively-coupled miniaturized-element frequency selective surfaces with narrowband, high-order bandpass responses," IEEE Transactions on Antennas and Propagation, Nov. 2015, pp. 4766-4774, vol. 63, No. 11.

(Continued)

*Primary Examiner* — Seung H Lee
(74) *Attorney, Agent, or Firm* — Tarolli, Sundheim, Covell & Tummino LLP

(57) ABSTRACT

An antenna element includes a first impedance structure, a second impedance structure, and a polarization rotating element. The first impedance structure includes a first dielectric slab and a first conducting pattern layer mounted on the first dielectric slab. The second impedance structure includes a second dielectric slab and a second conducting pattern layer mounted on the second dielectric slab. The polarization rotating element includes a third dielectric slab, a third conducting pattern layer, a first switch, a fourth conducting pattern layer, and a second switch. The third conducting pattern layer is mounted between the third dielectric slab and the first dielectric slab and forms a first dipole dependent on a position of the first switch. The fourth conducting pattern layer is mounted between the third dielectric slab and the second dielectric slab and forms a second dipole dependent on a position of the second switch.

20 Claims, 63 Drawing Sheets

(51) Int. Cl.

| | |
|---|---|
| ***H01Q 9/04*** | (2006.01) |
| ***H01Q 21/06*** | (2006.01) |

(56) References Cited

U.S. PATENT DOCUMENTS

| | | | |
|---|---|---|---|
| 5,095,292 | A | 3/1992 | Masterton |
| 6,028,562 | A | 2/2000 | Guler et al. |
| 6,493,473 | B1 | 12/2002 | Wooten |
| 8,248,178 | B2 | 8/2012 | Lange |
| 8,542,081 | B2 | 9/2013 | Parekh et al. |
| 8,587,492 | B2 | 11/2013 | Runyon |
| 9,912,073 | B2 | 3/2018 | Anderson et al. |
| 10,073,177 | B2 | 9/2018 | Montoya et al. |
| 10,090,603 | B2 | 10/2018 | Behdad et al. |
| 10,320,084 | B2 | 6/2019 | Bily et al. |
| 10,749,270 | B2 | 8/2020 | Behdad et al. |
| 10,862,210 | B2 | 12/2020 | Behdad et al. |
| 11,205,828 | B2 | 12/2021 | Behdad et al. |
| 11,239,555 | B2 | 2/2022 | Behdad et al. |
| 2020/0243968 | A1 | 7/2020 | Behdad et al. |

OTHER PUBLICATIONS

Al-Joumayly, et al., "A new technique for design of low-profile, second-order, bandpass frequency selective surfaces," IEEE Transactions on Antennas and Propagation, Feb. 2009, pp. 452-459, vol. 57, No. 2.

Balanis, Constantine, "Ridged Waveguide," Advanced, Engineering Electromagnetics (2d ed. Wiley 2012), pp. 466-470.

Hietpas, et al., "Applications & Considerations for Double-Ridge Guide Horn Antennas," Aerospace and Defense Channel Broadband Channel, Jan. 14, 2021, 3 pages.

Yang, Xue, et al., "Design method for low-profile, harmonic-suppressed filter-antennas using miniaturized-element frequency selective surfaces," IEEE Antennas and Wireless Propagation Letters, Mar. 2019, pp. 427-431, vol. 18, No. 3.

* cited by examiner

ELECTRONICALLY RECONFIGURABLE POLARIZATION-ROTATING PHASE SHIFTER

REFERENCE TO GOVERNMENT RIGHTS

This invention was made with government support under N00014-19-1-2502 and N00014-21-1-2387 awarded by the Navy/ONR. The government has certain rights in the invention.

BACKGROUND

A phased array antenna is an array of antennas in which a relative phase of signals feeding each antenna is varied such that an effective radiation pattern of the array is reinforced in a desired direction and suppressed in undesired directions to provide electronic steering of a beam. Beams are formed by shifting the phase of the signal emitted from each radiating element to provide either constructive or destructive interference to steer the beam. These antenna systems come in different sizes and scales due to several factors such as frequency and power requirements.

Each unit cell of the phased array antenna is configured to apply a specific phase shift to realize a desired phase profile over the array's aperture to form a high gain pencil beam at an intended direction. The direction of primary beam 116 can be steered by adaptively changing the phase of each array element. Ideally, it is desirable to have the phased array antenna's unit cells that can be reconfigured to yield any arbitrary phase shift values between 0° and 360° to provide perfect phase correction. However, the reconfiguration techniques to achieve any arbitrary phase shift values between 0° and 360° require changing the control voltage continuously and individually configuring the unit cells, which results in a relatively sophisticated architecture for voltage supply circuitry. Moreover, it is challenging to realize the full, reconfigurable 0° to 360° phase range over a broad frequency range (e.g., with fractional bandwidth of larger than 10%).

As a result, high-power phased array antenna technology that yields an affordable system is a major problem in the commercial and military wireless industry. Additionally, the solid-state technology that lies at the heart of current phased array antenna technology has inherent limitations when it comes to power and heat handling capability due to the generation of a large amount of heat. These limitations reduce the practicality of these reconfiguration techniques for various scenarios where phased array antennas having large numbers of unit cells and wideband operation is needed. Therefore, instead of fulfilling a continuous 0° to 360° phase range, discrete phase correction schemes that quantize this phase range into a number of discrete levels have been widely adopted in order to reduce the complexity of the control circuitry and increase operating bandwidths of beam-steerable phased array antennas. The simplest phase quantization scheme is 1-bit, which has been demonstrated as sufficient for beam scanning operation.

SUMMARY

In an illustrative embodiment, a polarization rotating antenna element is provided. The polarization rotating antenna element includes, but is not limited to, a first impedance structure, a second impedance structure, and a polarization rotating element. The first impedance structure comprising includes, but is not limited to, a first dielectric slab and a first conducting pattern layer. The first dielectric slab is formed of a first dielectric material and has a first face and a second face. The first face is on an opposite side of the first dielectric slab relative to the second face. The first conducting pattern layer is formed of a first electrically conductive material mounted on the first face of the first dielectric slab. The second impedance structure includes, but is not limited to, a second dielectric slab and a second conducting pattern layer. The second dielectric slab is formed of a second dielectric material and has a third face and a fourth face. The third face is on an opposite side of the second dielectric slab relative to the fourth face. The second conducting pattern layer is formed of a second electrically conductive material mounted on the third face of the second dielectric slab. The polarization rotating element includes, but is not limited to, a frame, a third dielectric slab, a third conducting pattern layer, a first switch, a fourth conducting pattern layer, and a second switch. The frame is formed of a third electrically conductive material. The third dielectric slab includes a first dielectric surface and a second dielectric surface formed within the frame. The first dielectric surface is on an opposite side of the third dielectric slab relative to the second dielectric surface. The third dielectric slab is formed of a third dielectric material. The third conducting pattern layer is formed of a third electrically conductive material mounted to the first dielectric surface between the first dielectric surface and the second face of the first dielectric slab. The third conducting pattern layer includes a first conductor and a second conductor. The first switch is connected between the first conductor and the second conductor to electrically connect the first conductor to the second conductor or to electrically disconnect the first conductor from the second conductor. When the first conductor and the second conductor are electrically connected, the first conductor and the second conductor form a first dipole. The fourth conducting pattern layer is formed of a fourth electrically conductive material mounted to the second dielectric surface between the second dielectric surface and the fourth face of the second dielectric slab. The fourth conducting pattern layer includes a third conductor and a fourth conductor. The second switch is connected between the third conductor and the fourth conductor to electrically connect the third conductor to the fourth conductor or to electrically disconnect the third conductor from the fourth conductor. When the third conductor and the fourth conductor are electrically connected, the third conductor and the fourth conductor form a second dipole.

In another illustrative embodiment, a phased array antenna is provided. The phased array antenna includes, but is not limited to, a plurality of polarization rotating antenna elements.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
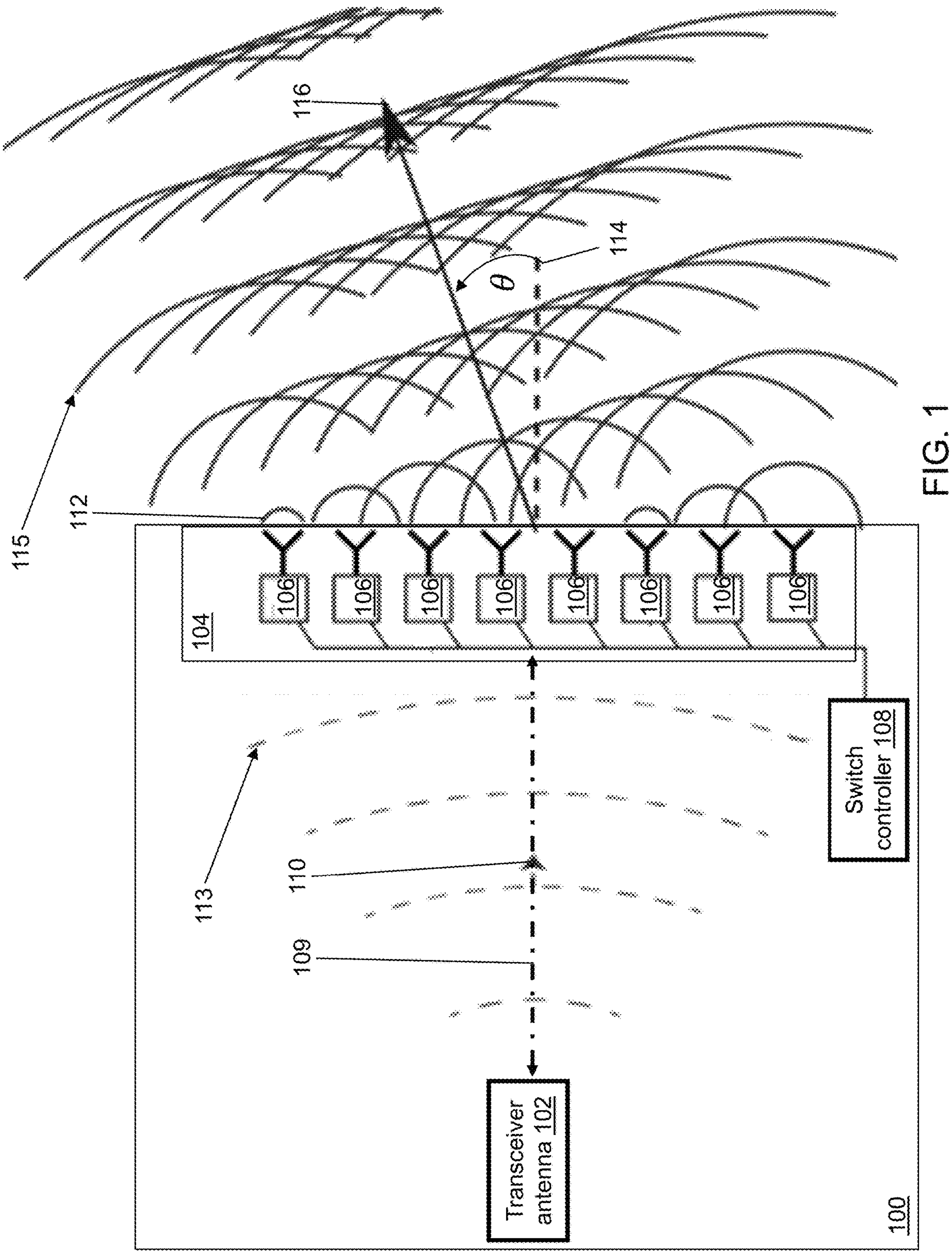
FIG. 1 depicts a block diagram of a transceiver system in accordance with an illustrative embodiment.

Referring to FIG. 1, a side view of a transceiver system 100 is shown in accordance with an illustrative embodiment. Transceiver system 100 may include a transceiver antenna 102, a phased array antenna 104, and a switch controller 108. Transceiver system 100 may act as a transmitter and/or a receiver of analog or digital signals and need not necessarily support both transmission and reception of signals to/from phased array antenna 104. Phased array antenna 104 includes a plurality of polarization rotating antenna elements.

Transceiver antenna 102 may be a dipole antenna, a monopole antenna, a helical antenna, a microstrip antenna, a patch antenna, a fractal antenna, a feed horn, a slot antenna, an end fire antenna, a parabolic antenna, double ridge horn antenna etc. Transceiver antenna 102 is positioned a focal distance 109, fa, from a back face of the plurality of polarization rotating antenna elements that is closest to transceiver antenna 102.

In the illustrative embodiment, transceiver antenna 102 radiates an electromagnetic wave 113 towards the back face of phased array antenna 104. Each polarization rotating antenna element 106 of the plurality of polarization rotating antenna elements rotates the incoming electromagnetic wave by either +90° or −90° dependent on a pair of switch states of a polarization rotating element 202 (shown referring to FIG. 2) of each polarization rotating antenna element 106. Each polarization rotating antenna element 106 of the plurality of polarization rotating antenna elements may be connected to switch controller 108 that controls a switch state of each polarization rotating element 202 of each polarization rotating element to electronically steer a primary beam 116 radiated from phased array antenna 104.

The plurality of polarization rotating antenna elements is arranged to form phased array antenna 104. For example, a front of phased array antenna 104 may be arranged to form a one-dimensional (1D) or a two-dimensional (2D) array of the plurality of polarization rotating antenna elements. The plurality of polarization rotating antenna elements may form variously shaped apertures including circular, rectangular, square, elliptical, etc. The plurality of polarization rotating antenna elements can include any number of polarization rotating antenna elements.

Phased array antenna 104 can electronically change a pointing direction of primary beam 116 by changing a phase shift of the electric field output $E^{out}$ from each polarization rotating antenna element 106 relative to an electric field input $E^{inc}$ to each polarization rotating antenna element 106 under control of switch controller 108. For example, a portion of the electric field input $E^{inc}$ from transceiver antenna 102 having a radiating direction 110 is received by and radiated individually from each polarization rotating antenna element 106. For example, a first electromagnetic field output 112 is shown radiated from an illustrative polarization rotating antenna element 106. A boresight axis direction 114 is defined relative to a center of phased array antenna 104 and represents a zero-degree steering angle θ of primary beam 116. Switch controller 108 thereby electronically steers primary beam 116 to different directions without moving any of the plurality of polarization rotating antenna elements or phased array antenna 104.

The electromagnetic energy associated with the electrical energy field input $E^{inc}$ from transceiver 102 is fed to each polarization rotating antenna element 106 of the plurality of polarization rotating antenna elements through free space in the illustrative embodiment though other types of feeds may be used in alternative embodiments. Based on the selected pointing direction of primary beam 116, switch controller 108 defines a phase shift value to be generated by each polarization rotating antenna element 106 of the plurality of polarization rotating antenna elements. Each polarization rotating antenna element 106 provides 1-bit phase quantization as discussed further below so that each polarization rotating antenna element 106 acts as a 1-bit phase shifter.

With the phase relationship defined by switch controller 108 for each polarization rotating antenna element 106, the electromagnetic waves from transceiver antenna 102 are rotated based on each switch state to add together to increase the radiation in the pointing direction of primary beam 116, while cancelling to suppress radiation in undesired directions. The lines from each polarization rotating antenna element 106 represent a wave front 115 of the electromagnetic waves emitted by each polarization rotating antenna element 106. The individual wave fronts are spherical, but they combine in front of phased array antenna 104 to create a plane wave such that primary beam 116 is radiated in the desired pointing direction.

In the illustration of FIG. 1, a phase shift selected for each polarization rotating antenna element 106 delays the waves progressively going up the aperture of phased array antenna 104 so that each polarization rotating antenna element 106 emits its electromagnetic wave front later than the one below it. The resulting plane wave is directed at the steering angle θ measured relative to boresight axis direction 114 of phased array antenna 104. By changing the phase shifts of each polarization rotating antenna element 106, switch controller 108 can quickly change the steering angle θ of primary beam 116. A 2D phased array can steer primary beam 116 in two dimensions.

Transceiver system 100 may include a plurality of transceivers, and phased array antenna 104 may be organized into subarrays to support a plurality of main beams. For example, a distinct transceiver 102 may be associated with one or more polarization rotating antenna elements. Additionally, in alternative embodiments, transceiver 102 may only transmit or only receive.

Figure 2:
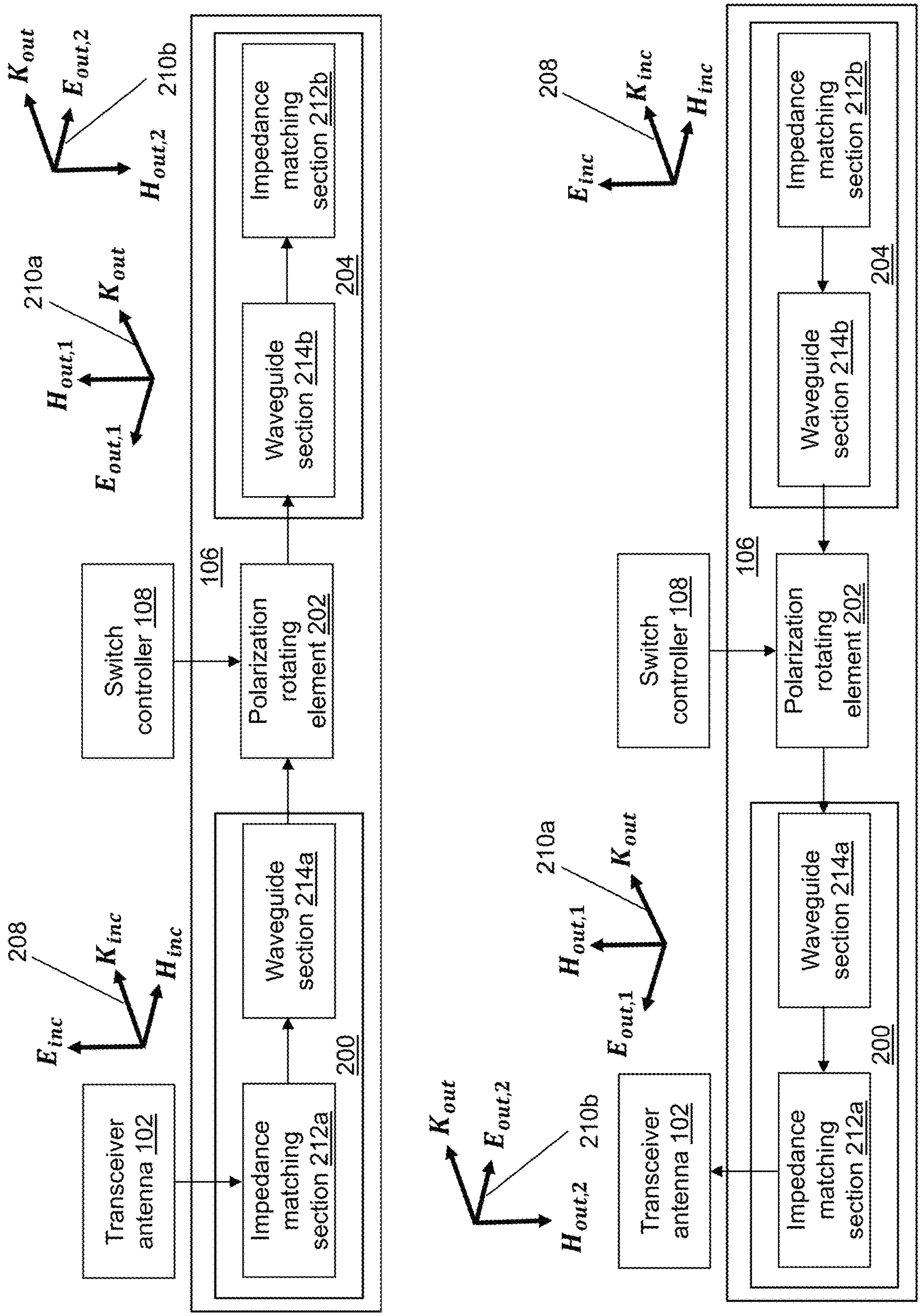
FIG. 2 depicts alternative operational block diagrams of the transceiver system of FIG. 1 in accordance with an illustrative embodiment.

Referring to FIG. 2, a block diagram of operation of transceiver system 100 is shown in accordance with an illustrative embodiment. Polarization rotating antenna element 106 may a first antenna 200, polarization rotating element 202, and a second antenna 204. First antenna 200 may include a first impedance matching section **212*a* and a first waveguide section 214*a*. Second antenna 202 may include a second impedance matching section 212*b* and a second waveguide section 214*b*. Switch controller 108 is connected to control a switch state of polarization rotating element 202. First impedance matching section 212*a* matches an impedance between free space and first waveguide section 214*a* to reduce a signal loss. Second impedance matching section 212*b* matches an impedance between second waveguide section 214*b*** and free space.

When operating as a transmitter, transceiver antenna 102 may radiate electromagnetic wave 113 toward first impedance matching section **212*a* of first antenna 200. For illustration, electromagnetic wave 113 may be represented by a first electromagnetic (EM) orthogonal system 208**.

An EM orthogonal system defines an orthogonal system for an electromagnetic wave in free space and includes an electric field direction vector indicated by E, a magnetic field direction vector indicated by H, and a wave vector direction vector indicated by K. K indicates a direction of propagation of the electric field E and the magnetic field H that are orthogonal to each other. K is also orthogonal to the electric field E and the magnetic field H. By convention, the polarization of circularly polarized electromagnetic waves refers to a direction of the electric field E and the fields rotate in either a right-hand direction (the electric field E into the magnetic field H) or in a left-hand direction (the magnetic field H into the electric field E). For linearly polarized electromagnetic waves, the fields oscillate along their axes (up or down) as they propagate.

First EM orthogonal system 208 defines an orthogonal system for electromagnetic wave 113 radiated from transceiver antenna 102 in an illustrative embodiment where the incoming electric field $E_{inc}$ is directed upwards meaning a vertically polarized radiated field. The radiated electric field $E_{inc}$ may be oriented in alternative directions in alternative embodiments. Depending on a switch state of polarization rotating element 202, polarization rotating antenna element 106 rotates the incoming electric field $E_{inc}$ by +90° or −90°. Second EM orthogonal system **210*a* defines an orthogonal system for a first outgoing electromagnetic wave $E_{out,1}$ from polarization rotating antenna element 106 that is rotated −90°. Third EM orthogonal system 210*b* defines an orthogonal system for a second outgoing electromagnetic wave $E_{out,2}$ from polarization rotating antenna element 106 that is rotated +90°. Based on first EM orthogonal system 208 and a switch state of polarization rotating element 202, an orientation of first electromagnetic field output 112 radiated from second impedance matching section 212***b* of second antenna 204 of polarization rotating antenna element 106 is defined by either second EM orthogonal system 210*a* or third EM orthogonal system 210*b*. As a result, electromagnetic wave 113 is rotated by polarization rotating antenna element 106 by +90° or −90°.

When operating as a receiver, a first electromagnetic field input represented by first EM orthogonal system 208 is received by second impedance matching section 212*b* of second antenna 204 and propagated through polarization rotating antenna element 106. The propagated first electromagnetic field input is radiated from first impedance matching section 212*a* of first antenna 202 toward transceiver antenna 102. The electromagnetic field radiated toward transceiver antenna 102 may be represented by either second EM orthogonal system 210*a* or third EM orthogonal system 210*b* depending on a switch state of polarization rotating element 202.

Figure 3:
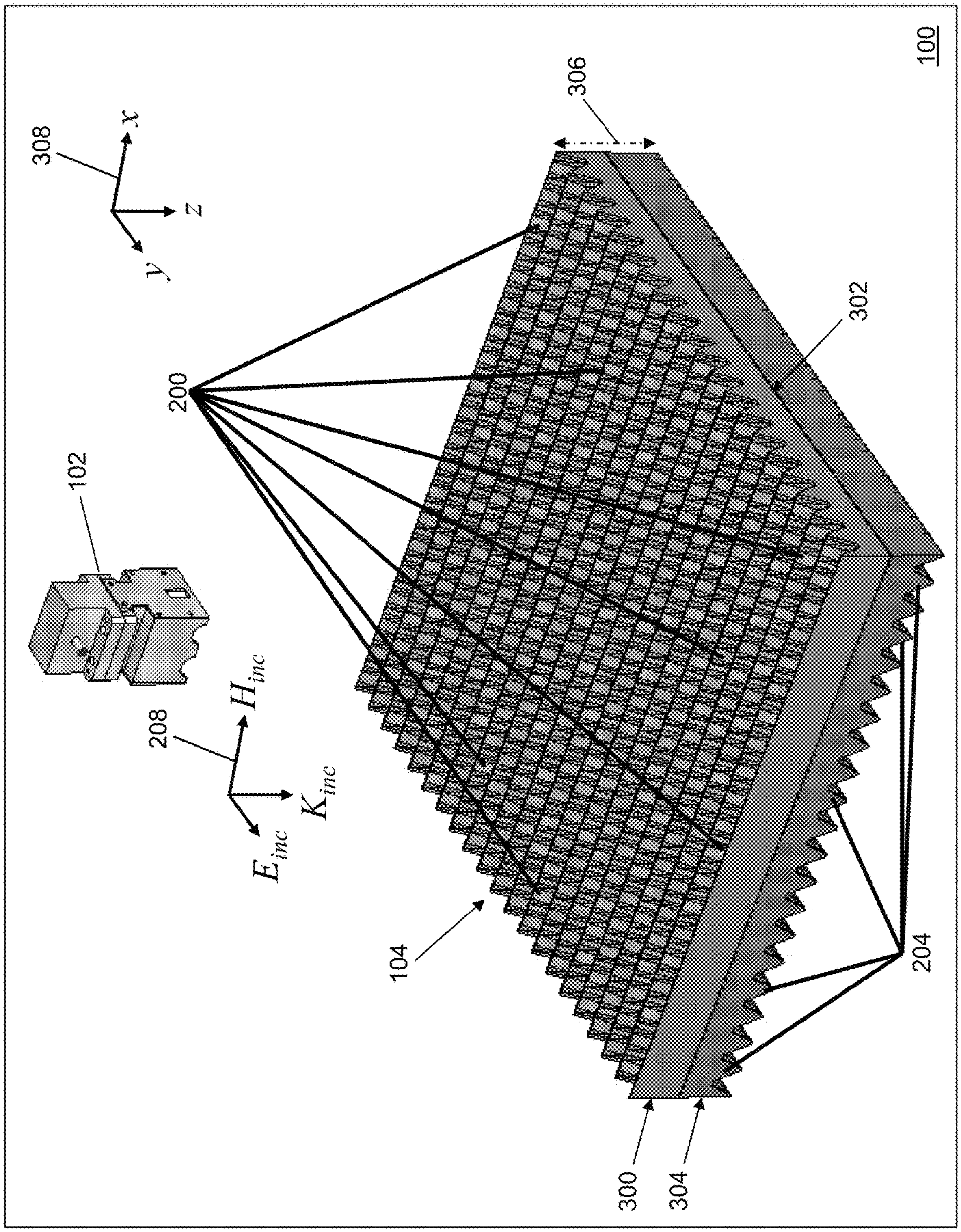
FIG. 3 depicts a perspective side view of the transceiver system of FIG. 1 in accordance with an illustrative embodiment.
Figure 4:
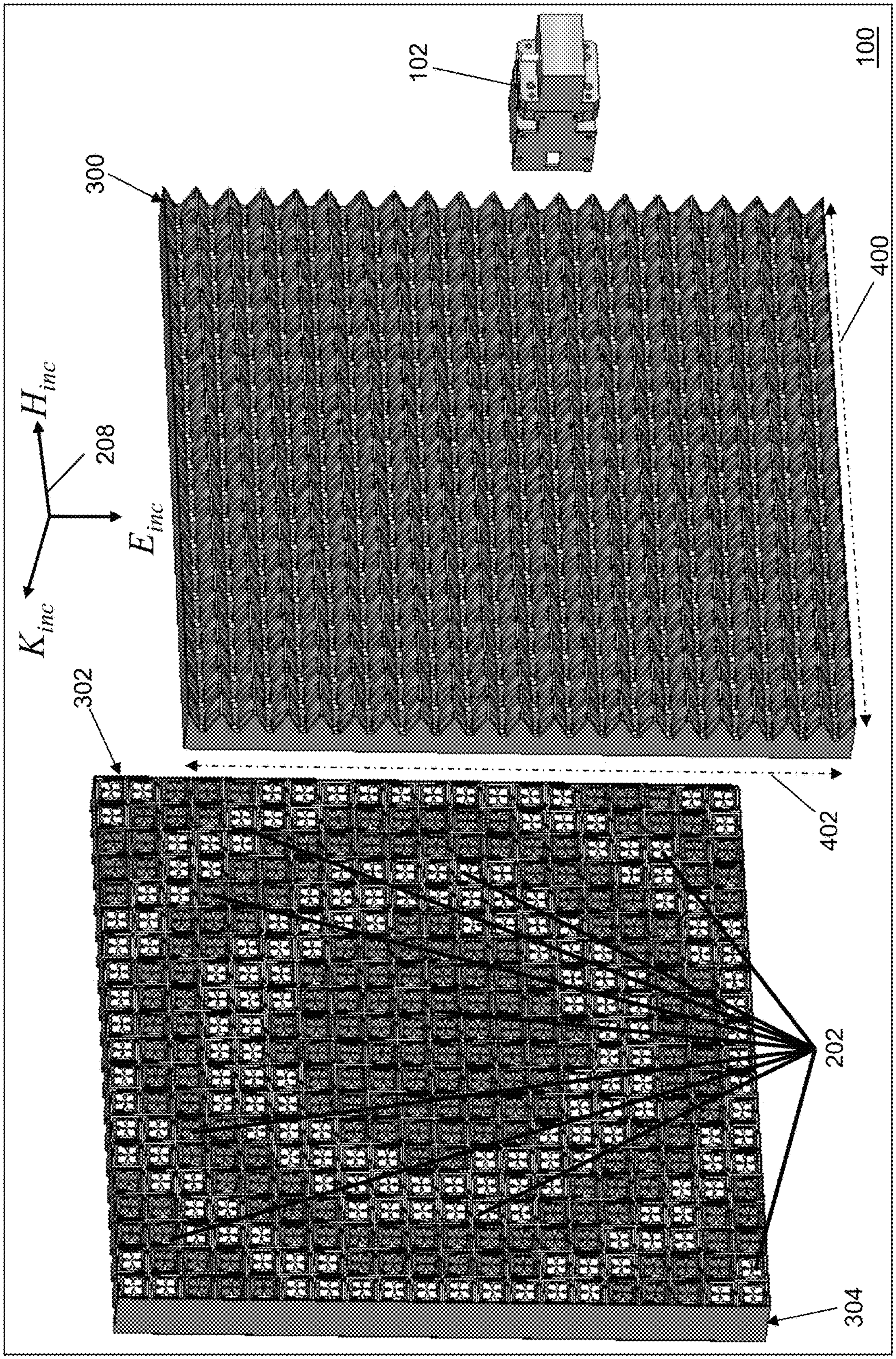
FIG. 4 depicts a perspective back view of the transceiver system of FIG. 1 with a polarization rotating element layer separated from a back antenna element layer in accordance with an illustrative embodiment.
Figure 5A:
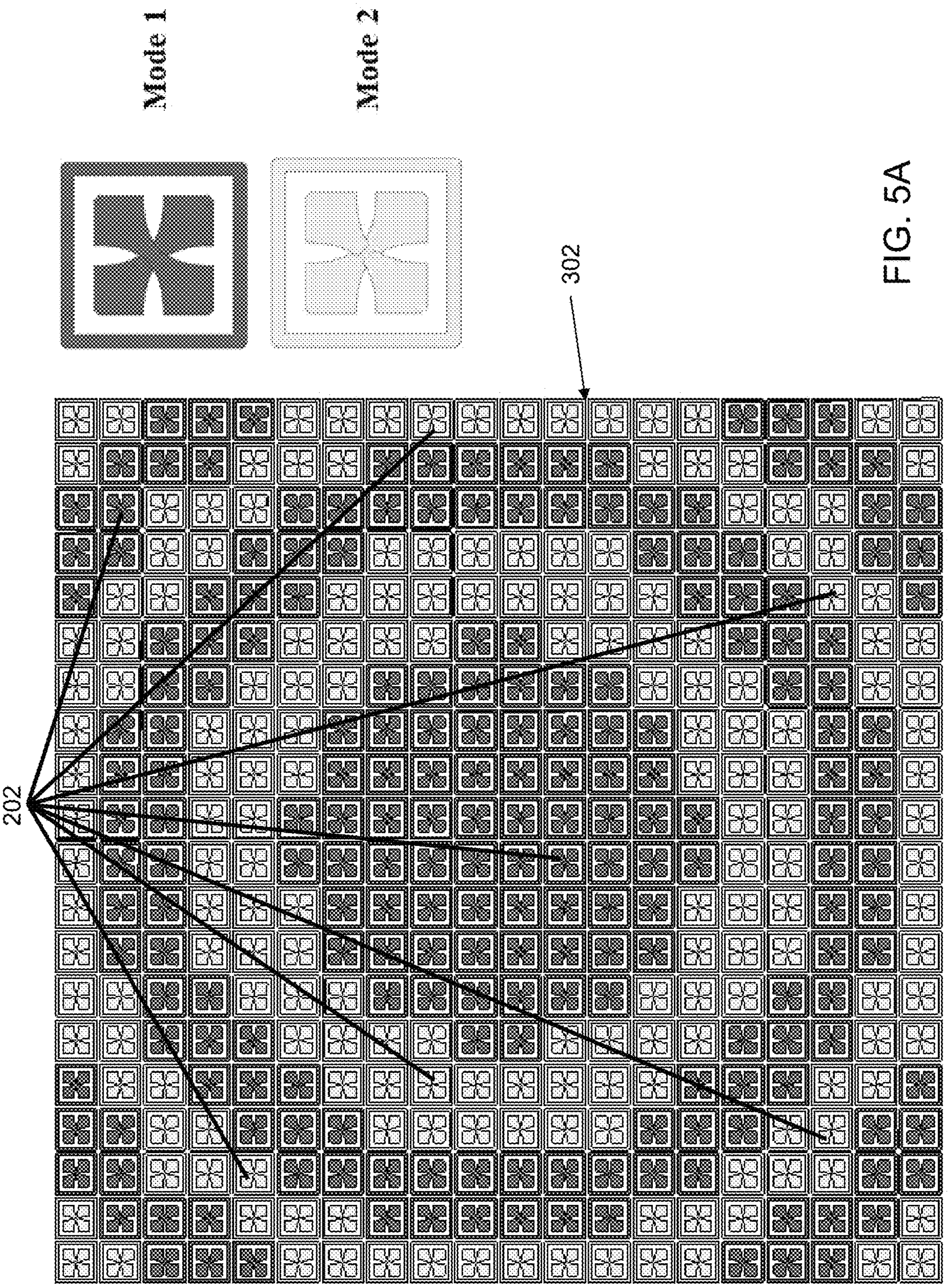
FIGS. 5A to 5E depict patterns of a distribution of switch modes for each polarization rotating element included in the polarization rotating element layer of FIG. 4 to generate a beam steered to 0°, 15°, 30°, 45°, 60°, respectively, in accordance with an illustrative embodiment.
Figure 5B:
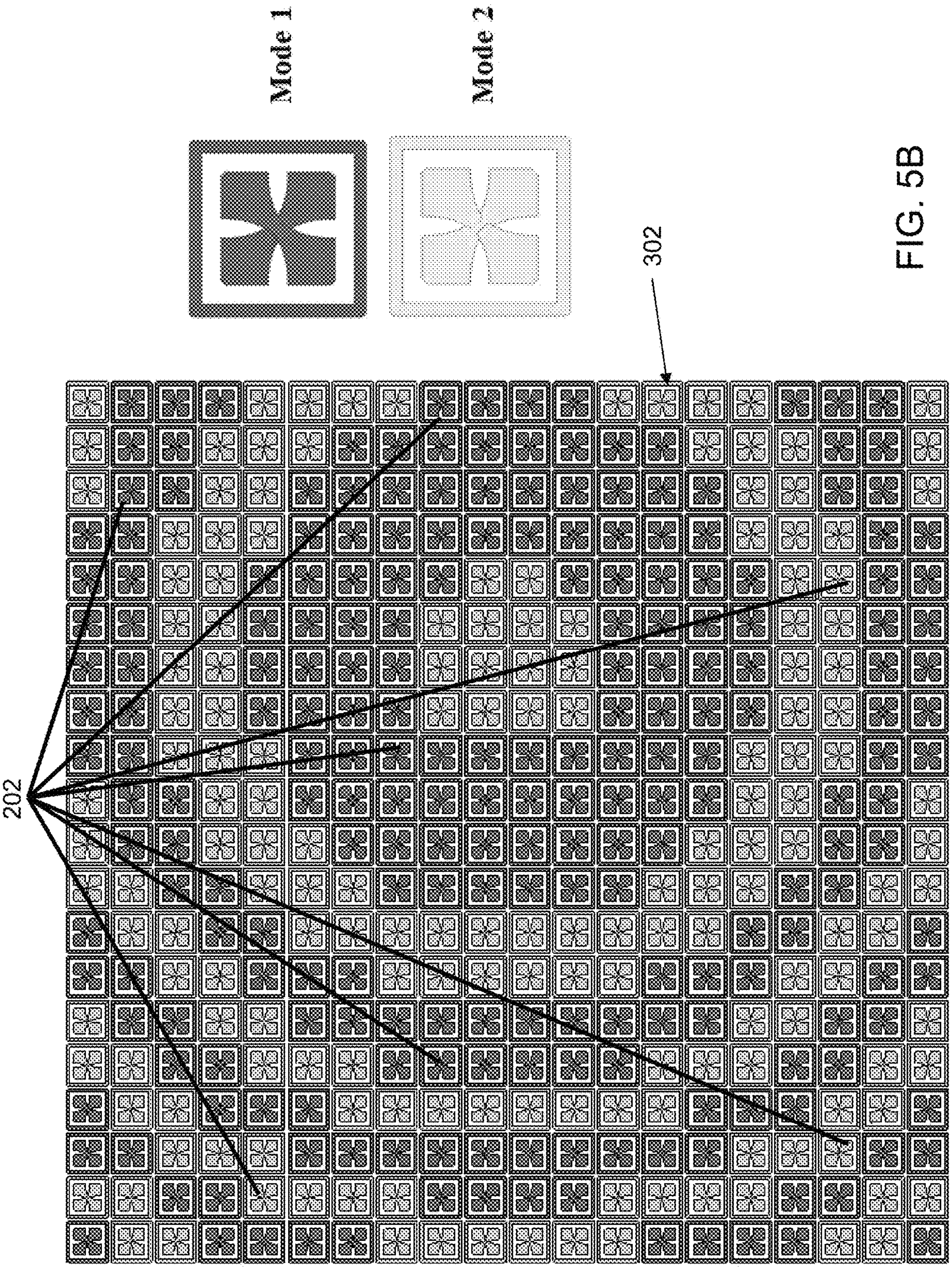
Figure 5C:
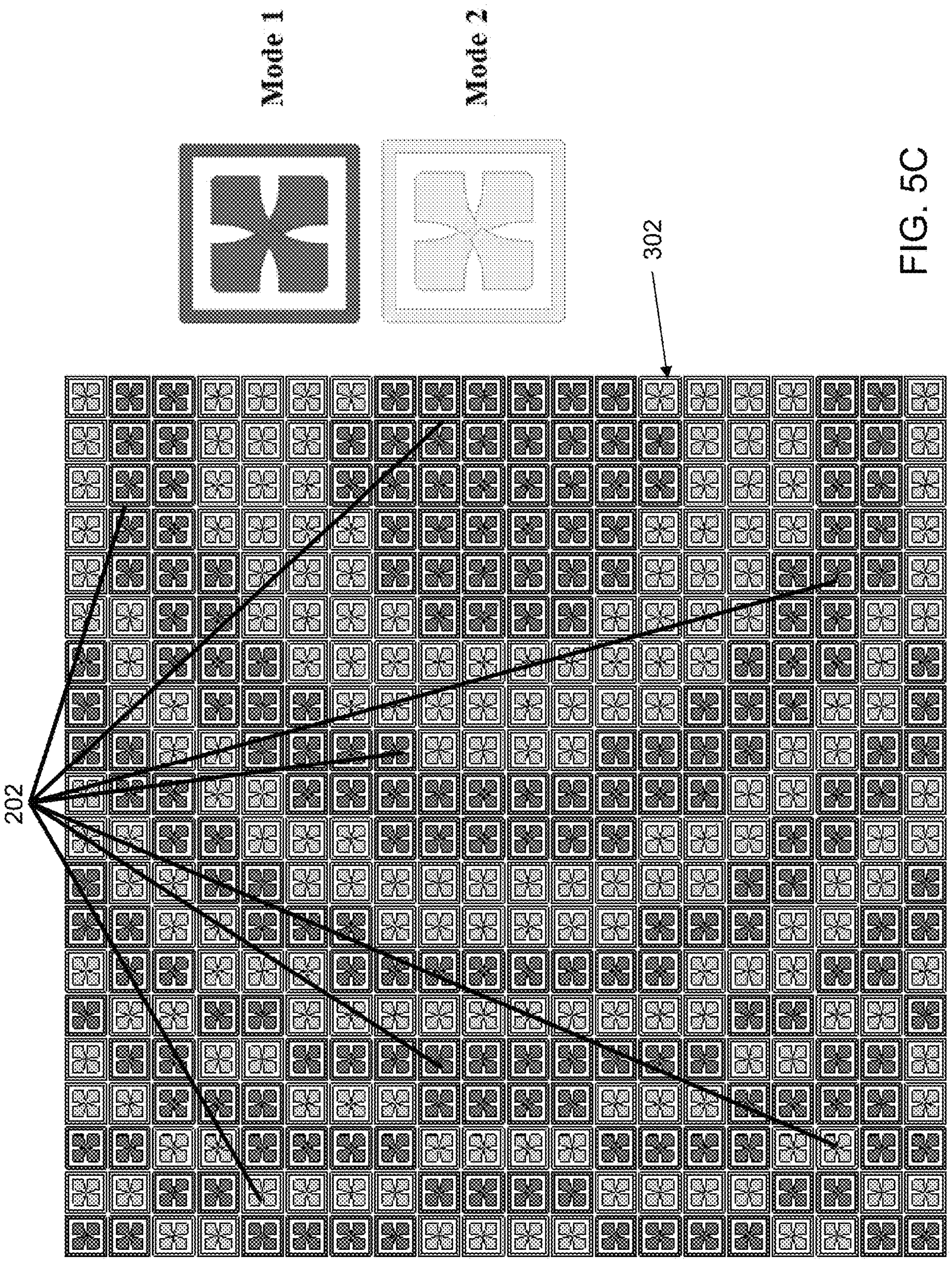
Figure 5D:
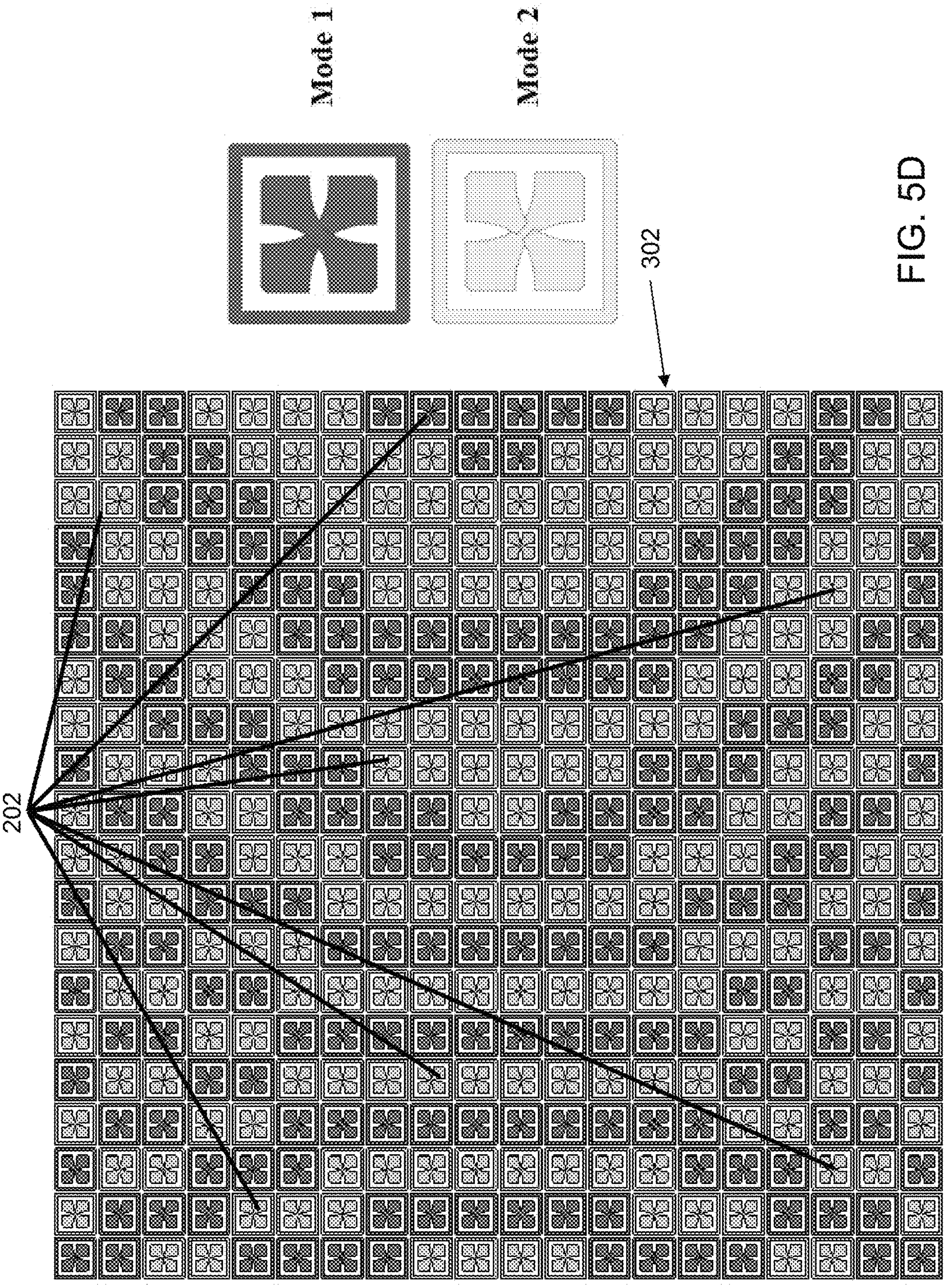
Figure 5E:
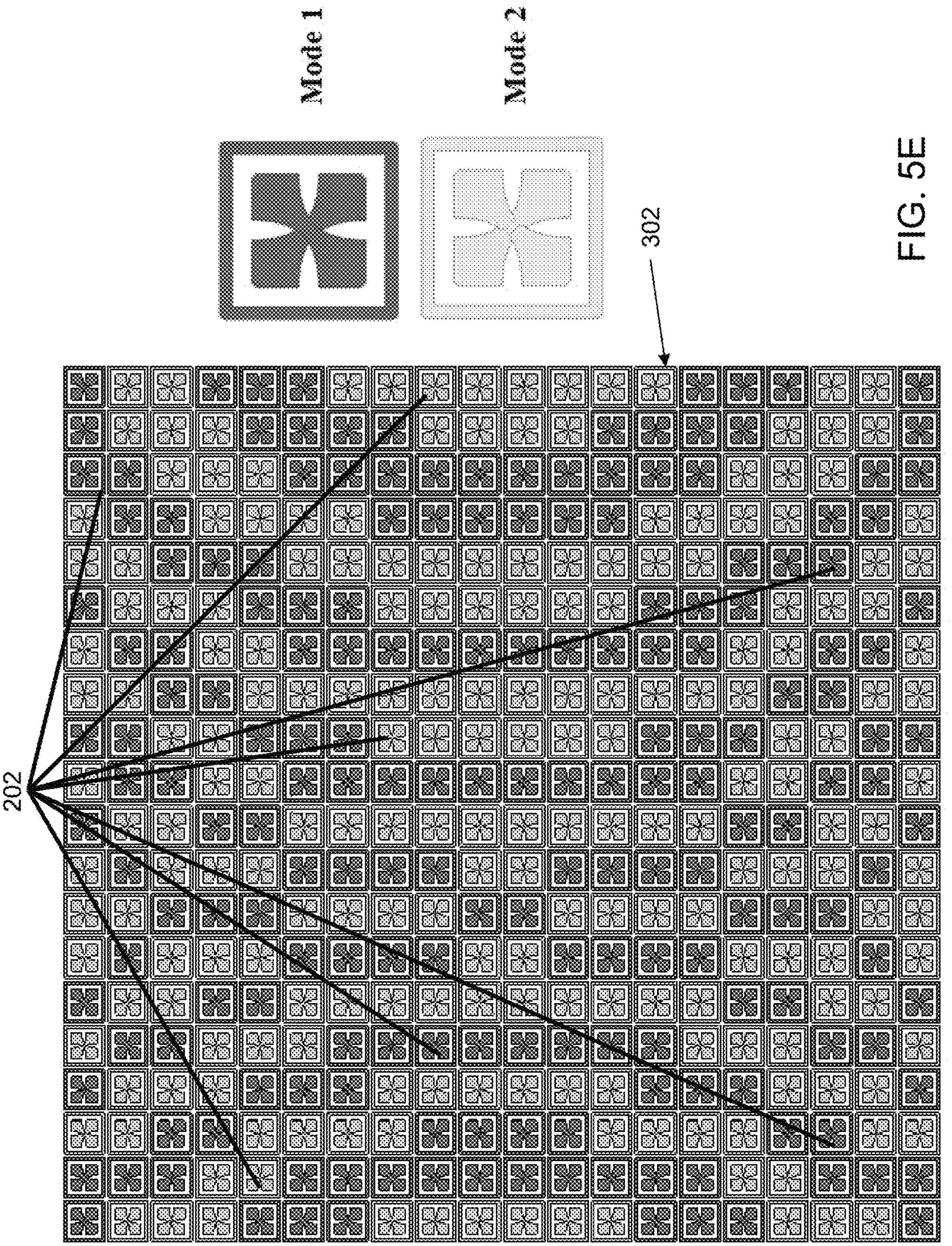

Referring to FIG. 3, a perspective side view of transceiver system 100 is shown in accordance with an illustrative embodiment. Referring to FIG. 4, a perspective back view of transceiver system 100 is shown in accordance with an illustrative embodiment. In the illustrative embodiment, phased array antenna 104 is a 2D array of 400 polarization rotating antenna elements arranged to form a 20×20 rectangle. First antenna 200, polarization rotating element 202, and second antenna 204 are mounted adjacent to each other in an axial direction parallel to a z-axis of an orthogonal coordinate reference frame 308 with polarization rotating element 202 between first antenna 200 that is closest to transceiver antenna 102 and second antenna 204. The z-axis of orthogonal coordinate reference frame 308 is parallel to the direction of propagation $K_{inc}$ of the incoming electric field $E_{inc}$ and the incoming magnetic field $H_{inc}$. Based on this arrangement, phased array antenna 104 can be described as including a first antenna element grid 300, a polarization rotating antenna layer 302, and a second antenna element grid 304. First antenna element grid 300 includes 400 first antennas 200. Polarization rotating antenna layer 302 includes 400 polarization rotating elements 202. Second antenna element grid 304 includes 400 second antennas 204. Phased array antenna 104 has an aperture length 400 direction parallel to an x-axis of orthogonal coordinate reference frame 308, an aperture width 402 direction parallel to a y-axis of first EM orthogonal system 208, and an aperture depth 306 direction parallel to the z-axis. Orthogonal coordinate reference frame 308 includes an x-axis, a y-axis, and the z-axis to form a right-handed coordinate reference frame.

Distribution patterns for the switch positions of each polarization rotating element 202 of polarization rotating antenna layer 302 to generate a beam steered to scan angles at 0°, 15°, 30°, 45°, and 60° relative to boresight axis 114 are shown in FIGS. 5A to 5E, respectively, in accordance with an illustrative embodiment, where "Mode 1" indicates a first pair of switch positions for a respective polarization rotating element 202, "and "Mode 2" indicates a second pair of switch positions for a respective polarization rotating element 202, where each pixel represents a distinct polarization rotating element 202.

Figure 6:
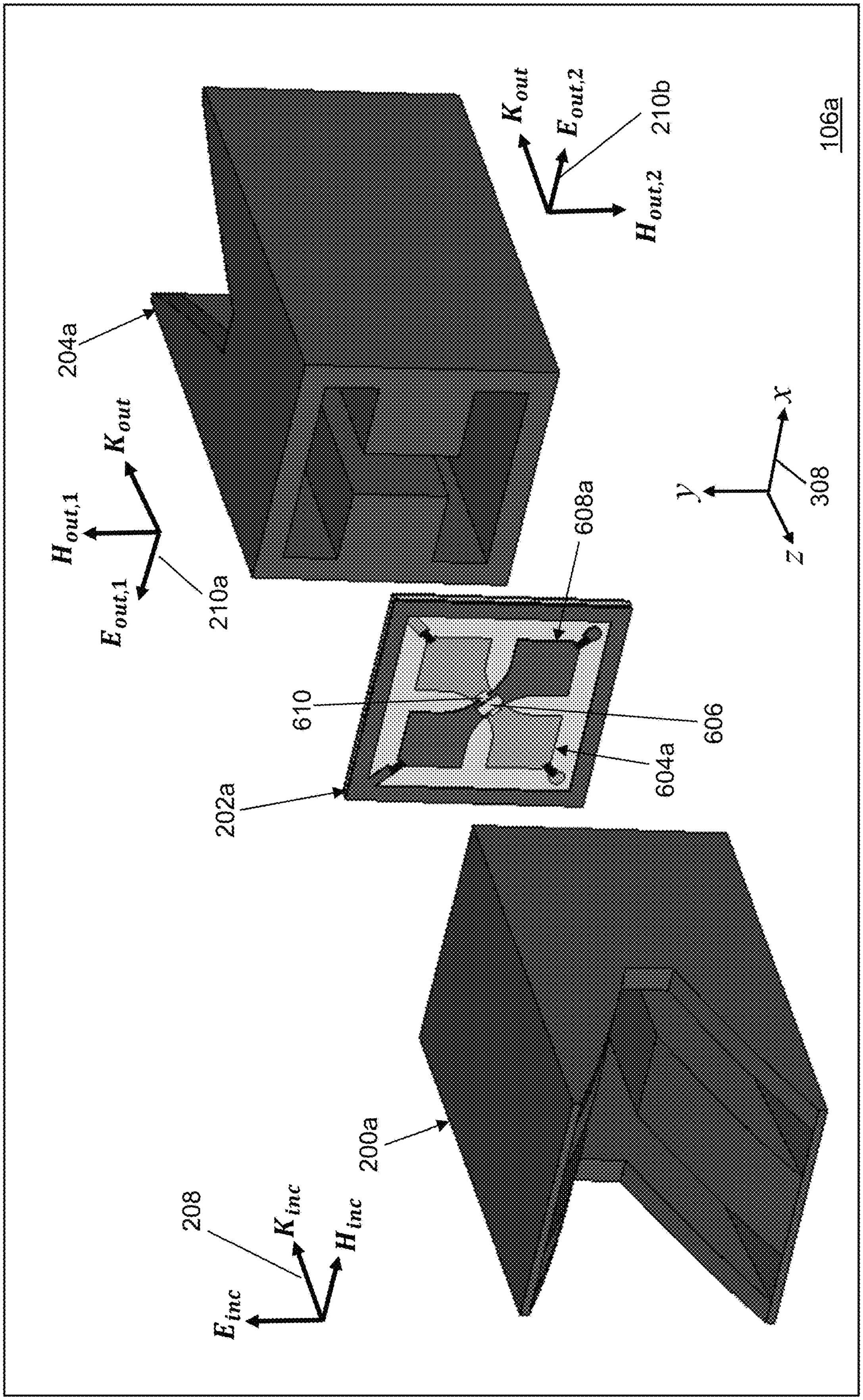
FIG. 6 depicts a perspective view of a polarization rotating antenna element comprised of two ridge horn antennas in accordance with an illustrative embodiment.

Referring to FIG. 6, an exploded perspective view of a first polarization rotating antenna element 106*a* is shown in accordance with an illustrative embodiment. First polarization rotating antenna element 106*a* includes a first ridge horn antenna 200*a*, a first polarization rotating element 202*a*, and a second ridge horn antenna 204*a*. Each of first ridge horn antenna 200*a*, first polarization rotating element 202*a*, and second ridge horn antenna 204*a* has a square shaped cross-section in the x-y plane defined by orthogonal coordinate reference frame 308 though other cross-sectional shapes may be used in alternative embodiments. Each of first ridge horn antenna 200*a*, first polarization rotating element 202*a*, and second ridge horn antenna 204*a* further have common widths and lengths in the x-y plane. As understood by a person of skill in the art, dimensions of first ridge horn antenna 200*a* and second ridge horn antenna 204*a* may be defined based on a desired center frequency of the incoming electromagnetic wave. First ridge horn antenna 200*a* and second ridge horn antenna 204*a* are identical except that second ridge horn antenna 204*a* is rotated 90° in the x-y plane relative to first ridge horn antenna 200*a* and is rotated 180° in the x-z plane relative to first ridge horn antenna 200*a*.

First polarization rotating element 202*a* is shown as transparent and includes a first back dipole 604*a*, a first switch 606, a first front dipole 608*a*, and a second switch 610. Polarization rotating antenna element 202 is a conduit with a frame formed of electrically conductive material to confine and direct radio signals such that polarization rotating antenna element 202 acts as a resonator. First back dipole 604*a* and first switch 606 are separated from first front dipole 608*a* and second switch 610 by a dielectric material such that first back dipole 604*a* and first switch 606 do not contact first front dipole 608*a* and second switch 610. The dielectric material may include one or more dielectric materials such as foamed polyethylene, solid polyethylene, polyethylene foam, polytetrafluoroethylene, air, air space polyethylene, vacuum, etc.

Figure 7B:
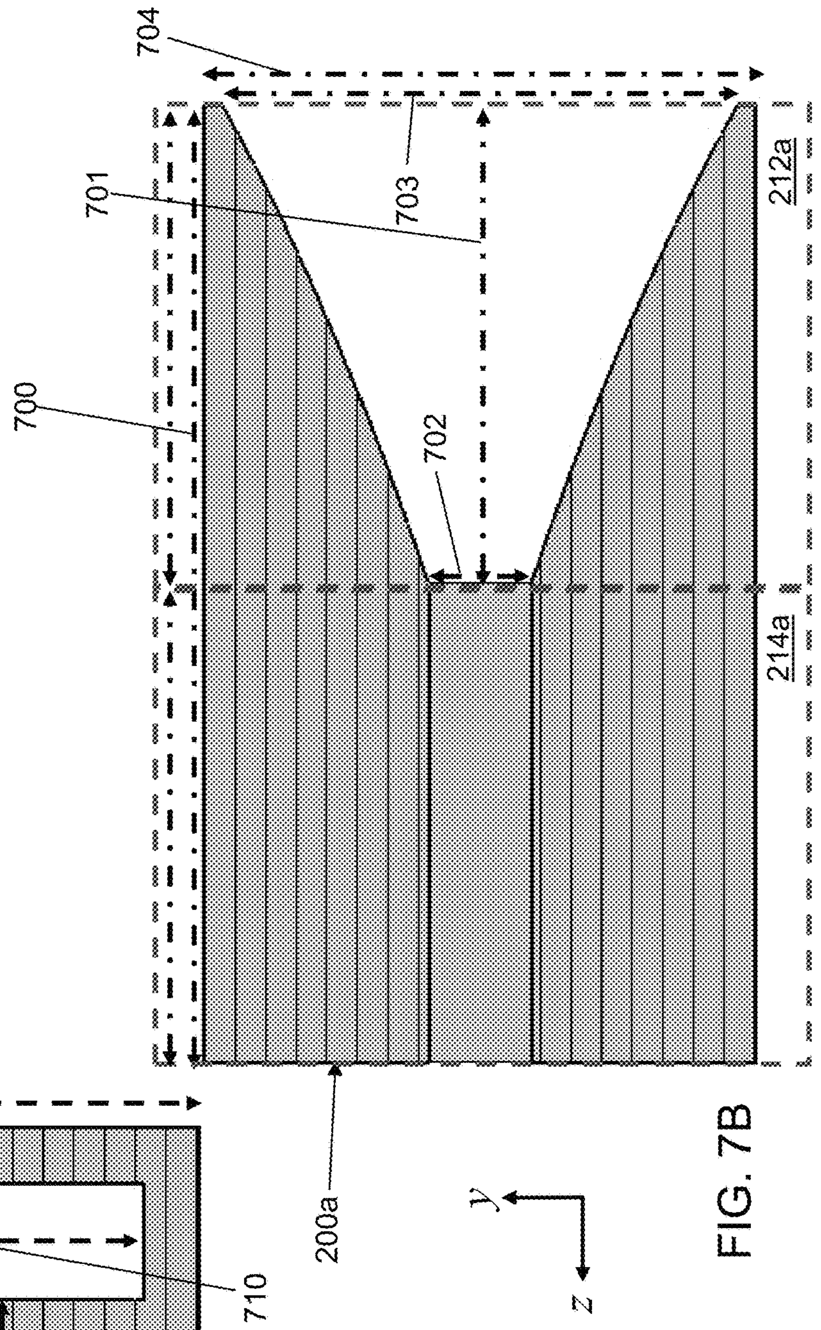
FIG. 7B depicts a side cross-section view of the ridge horn antenna of FIG. 6 in accordance with an illustrative embodiment.
Figure 7A:
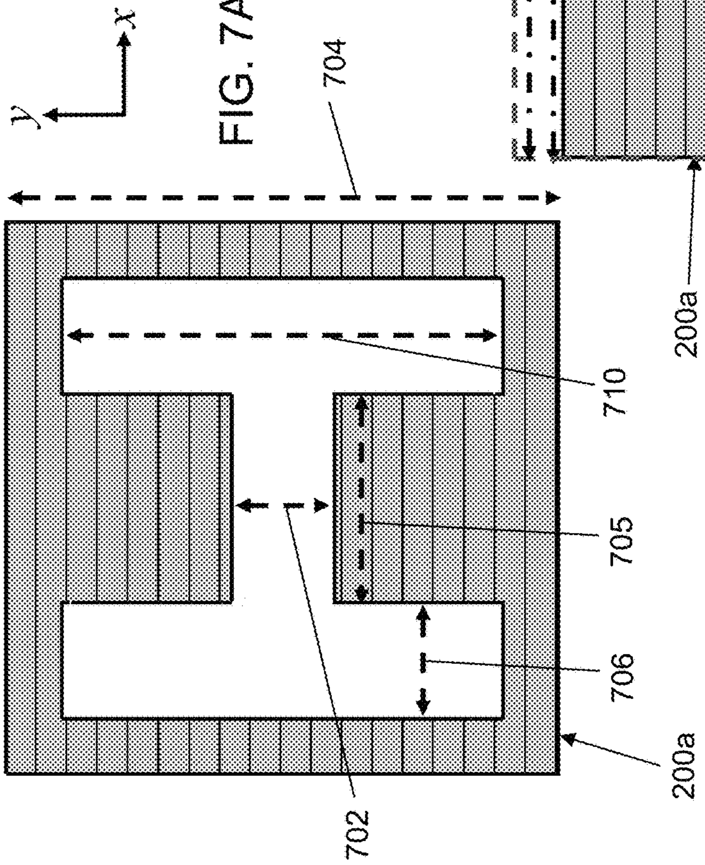
FIG. 7A depicts a front cross-section view of the ridge horn antenna of FIG. 6 in accordance with an illustrative embodiment.

FIG. 7A depicts a front cross-section view of first ridge horn antenna 200*a* in accordance with an illustrative embodiment. FIG. 7B depicts a side cross-section view of first ridge horn antenna 200*a* in accordance with an illustrative embodiment. First ridge horn antenna 200*a* includes first impedance matching section 212*a* and first waveguide section 214*a*. First waveguide section 214*a* is a double-ridge waveguide comprised of sidewalls that form a frame and two ridges that face each other with a gap between end faces of the pair of ridges. First impedance matching section 212*a* includes legs that taper toward the sidewalls and ridges of first waveguide section 214*a*.

First ridge horn antenna 200*a* has a total depth 700 parallel to the z-axis of orthogonal coordinate reference frame 308, a tapered leg depth 701 parallel to the z-axis of orthogonal coordinate reference frame 308, a center channel length 702 parallel to the y-axis of orthogonal coordinate reference frame 308, a tapered leg length 703 parallel to the y-axis of orthogonal coordinate reference frame 308, a conductor length 704 parallel to the y-axis of orthogonal coordinate reference frame 308, a leg length 710 parallel to the y-axis of orthogonal coordinate reference frame 308, a center channel width 705 parallel to the x-axis of orthogonal coordinate reference frame 308, and a tapered leg width 706 parallel to the x-axis of orthogonal coordinate reference frame 308. A conductor width parallel to the x-axis of orthogonal coordinate reference frame 308 is equal to conductor length 704 in the illustrative embodiment to form a square cross-section shape. As understood by a person of skill in the art, dimensions of first ridge horn antenna 200*a* and second ridge horn antenna 204*a* may be defined based on the desired center frequency of the incoming electromagnetic wave.

Figure 8A:
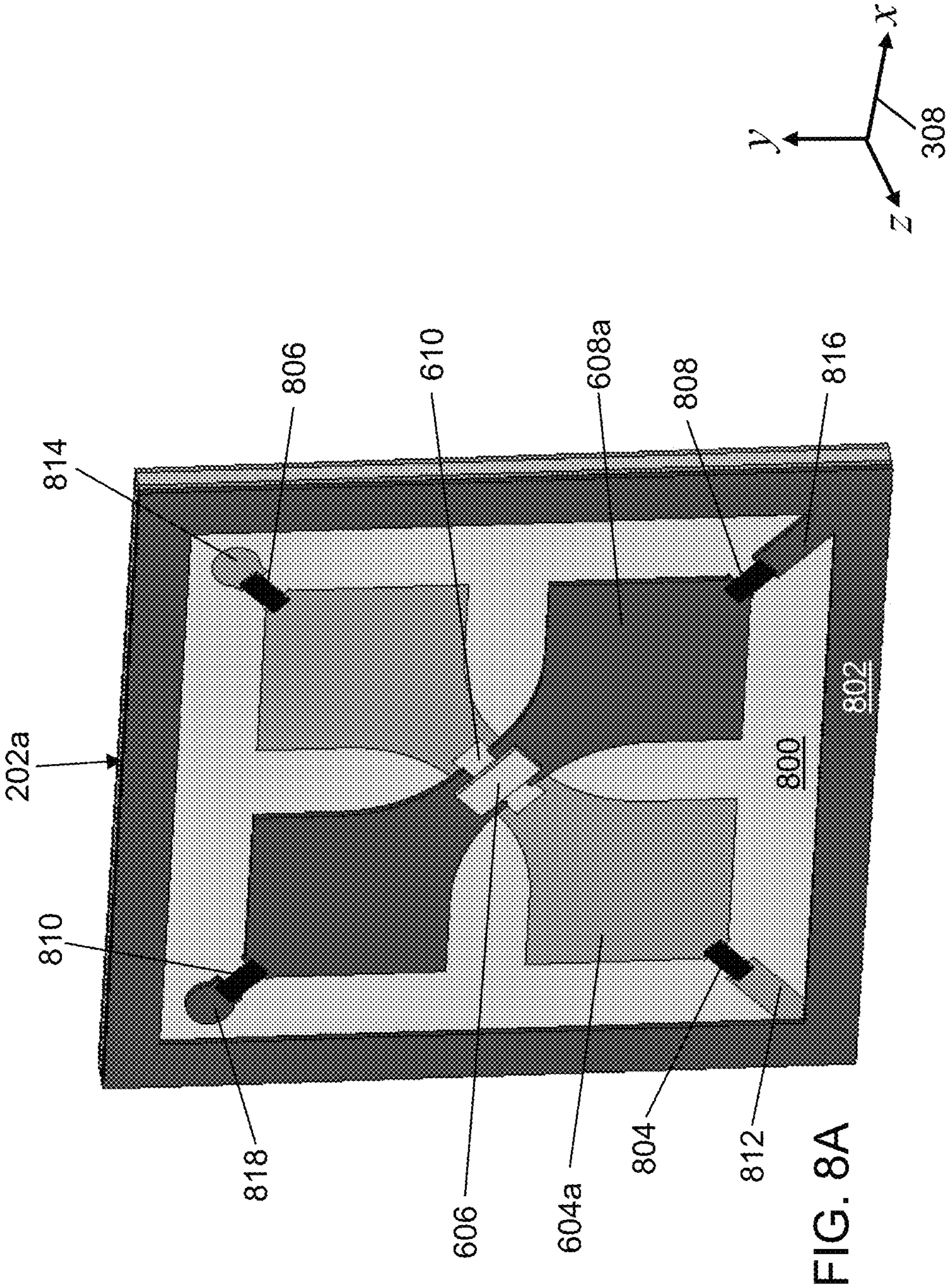
FIG. 8A depicts a transparent perspective view of a polarization rotating element of the polarization rotating antenna element of FIG. 6 in accordance with an illustrative embodiment.
Figure 8C:
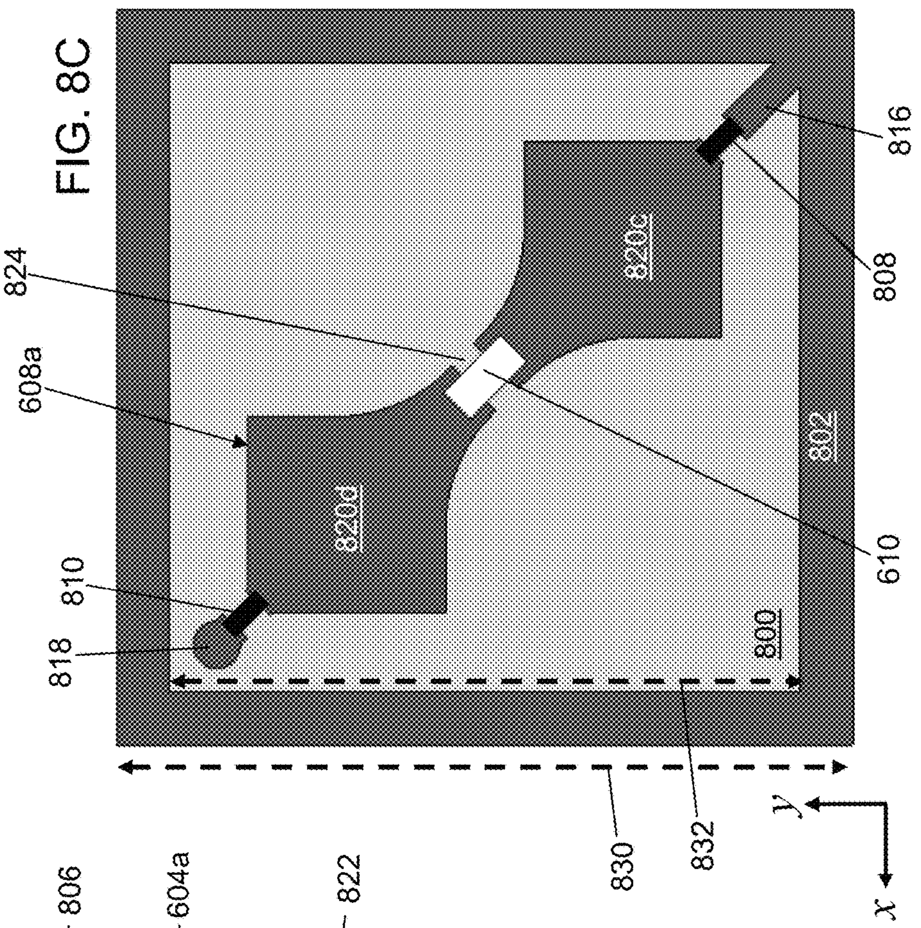
FIG. 8C depicts a front view of the polarization rotating element of FIG. 8A in accordance with an illustrative embodiment.
Figure 8B:
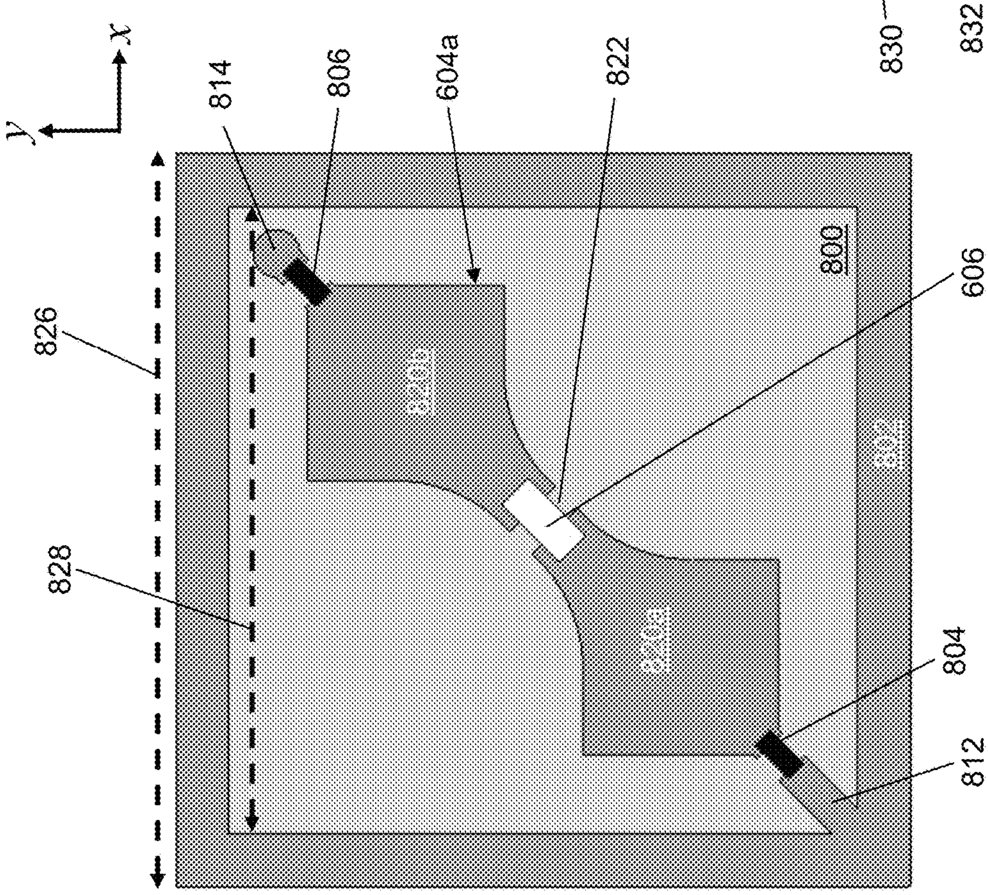
FIG. 8B depicts a back view of the polarization rotating element of FIG. 8A in accordance with an illustrative embodiment.

FIG. 8A depicts a transparent perspective view of first polarization rotating element 202*a* in accordance with an illustrative embodiment. FIG. 8B depicts a back view of first polarization rotating element 202*a* in accordance with an illustrative embodiment. FIG. 8C depicts a front view of first polarization rotating element 202_a_ in accordance with an illustrative embodiment. First polarization rotating element 202_a_ further may include a dielectric layer 800 formed of a dielectric material surrounded by a conductive frame 802 formed of a conductive material. The electrically conductive material may be copper plated steel, silver plated steel, silver plated copper, silver plated copper clad steel, copper, copper clad aluminum, steel, etc. Conductive frame 802 has a conductive layer width 826 parallel to the x-axis of orthogonal coordinate reference frame 308, a conductive layer length 830 parallel to the y-axis of orthogonal coordinate reference frame 308, and a rotator depth (not shown) parallel to the z-axis of orthogonal coordinate reference frame 308. Dielectric layer 800 has a dielectric layer width 828 parallel to the x-axis of orthogonal coordinate reference frame 308 and a dielectric layer length 832 parallel to the y-axis of orthogonal coordinate reference frame 308.

First back dipole 604_a_ includes a first conductor 820_a_ and a second conductor 820_b_ formed on a back surface of dielectric layer 800. First switch 606 is mounted to the back surface of dielectric layer 800 to electrically connect first conductor 820_a_ and second conductor 820_b_. A first dielectric channel 822 is formed between first conductor 820_a_ and second conductor 820_b_. First front dipole 608_a_ includes a third conductor 820_c_ and a fourth conductor 820_d_ formed on a front surface of dielectric layer 800. Second switch 610 is mounted to the front surface of dielectric layer 800 to electrically connect third conductor 820_c_ and fourth conductor 820_d_. A second dielectric channel 824 is formed between third conductor 820_c_ and fourth conductor 820_d_.

First back dipole 604_a_ defines a conducting pattern layer mounted to the back surface of dielectric layer 800, and first front dipole 608_a_ defines an identical conducting pattern layer mounted to the front surface of dielectric layer 800. Each of first conductor 820_a_, second conductor 820_b_, third conductor 820_c_, and fourth conductor 820_d_ is oriented ±45° relative to the incoming electric field $E_{inc}$ and to first outgoing electromagnetic wave $E_{out,1}$ and to second outgoing electromagnetic wave $E_{out,2}$. Because first polarization rotating element 202_a_ is a resonant structure, there is no loss of power at steady-state due to internal reflections of the incoming electric field $E_{inc}$ regardless of the orientation of ±45° relative to the incoming electric field $E_{inc}$.

First conductor 820_a_, second conductor 820_b_, third conductor 820_c_, and fourth conductor 820_d_ have a common shape and size though each is oriented toward a different corner of dielectric layer 800. In the illustrative embodiment of FIGS. 8A, 8B, and 8C, first conductor 820_a_, second conductor 820_b_, third conductor 820_c_, and fourth conductor 820_d_ each have an arrow shape with a tip of the arrow pointed toward a different corner of dielectric layer 800 and a shaft of the arrow pointed toward either first switch 606 or second switch 610. First conductor 820_a_, second conductor 820_b_, third conductor 820_c_, and fourth conductor 820_d_ may have other shapes and configurations in alternative embodiments as shown with reference to FIGS. 12A through 12L.

First switch 606 and second switch 610 may be mechanical switches, a microelectromechanical system (MEMS) switches, commercially available single-pole, single-throw switches, one or more PIN diodes, photoconductive switches, photoelectric switches, etc. Each of first switch 606 and second switch 610 form a switchable connection between two states: a conducting or closed state and a non-conducting or open state. First switch 606 and second switch 610 are connected to receive a signal from switch controller 108 to determine switching state. When first switch 606 is controlled to the conducting or closed state, second switch 610 is controlled to the non-conducting or open state such that only one of first back dipole 604_a_ and first front dipole 608_a_ is in the conducting or closed state at a time.

When first switch 606 is in the conducting or closed state and second switch 610 is in the non-conducting or open state, first conductor 820_a_ and second conductor 820_b_ of first back dipole 604_a_ are connected to form a dipole to rotate the incoming electric field $E_{inc}$−90° such that first polarization rotating element 202_a_ forms first outgoing electromagnetic wave $E_{out,1}$ as illustrated by second EM orthogonal system 210_a_. "Mode 1" may be defined as first switch 606 in the conducting or closed state and second switch 610 in the non-conducting or open state.

When first switch 606 is in the non-conducting or open state and second switch 610 is in the conducting or closed state, third conductor 820_c_ and fourth conductor 820_d_ of first front dipole 608_a_ are connected to form a dipole to rotate the incoming electric field $E_{inc}$+90° such that first polarization rotating element 202_a_ forms second outgoing electromagnetic wave $E_{out,2}$ as illustrated by third EM orthogonal system 210_b_. "Mode 2" may be defined as first switch 606 in the non-conducting or open state and second switch 610 in the conducting or closed state. Thus, each mode defines a pair of switch states that each define a state of first switch 606 and of second switch 610.

In the illustrative embodiment, first switch 606 and second switch 610 are each PIN diodes. To provide radio frequency (RF) direct current (DC) isolation, a DC bias voltage is provided through the inductors. For example, a first inductor 804 is connected between an edge of first conductor 820_a_ generally opposite first switch 606 and a first conductive channel 812, and a second inductor 806 is connected between an edge of second conductor 820_b_ generally opposite first switch 606 and a first conductive via 814. First conductive channel 812 is connected to conductive frame 802. In an illustrative embodiment, conductive frame 802 may be maintained at a ground level voltage; whereas, a DC bias voltage may be provided through first conductive via 814 to thereby provide the DC bias voltage across first conductor 820_a_ and second conductor 820_b_ and thereby across first switch 606. First conductor 820_a_ and second conductor 820_b_ are electrically connected when first switch 606 is forward biased and electrically isolated when first switch 606 is reverse biased.

Similarly, a third inductor 808 is connected between an edge of third conductor 820_c_ generally opposite second switch 610 and a second conductive channel 816, and a fourth inductor 810 is connected between an edge of fourth conductor 820_d_ generally opposite second switch 610 and a second conductive via 818. Second conductive channel 816 is connected to conductive frame 802. The DC bias voltage may be provided through second conductive via 818 to thereby provide the DC bias voltage across third inductor 808 and fourth inductor 810 and thereby across second switch 610. Third conductor 820_c_ and fourth conductor 820_d_ are electrically connected when second switch 610 is forward biased and electrically isolated when second switch 610 is reverse biased.

For illustration, first polarization rotating antenna element 106_a_ was designed to operate over a broad frequency band that covered the range of 6-12 gigahertz (GHz) and to support fast switching and high-power. First switch 606 and second switch 610 were implemented as high-power capable PIN diodes. Dielectric layer 800 was formed of a high-temperature-tolerant ceramic substrate with a relative permittivity of 7.5, a loss tangent of 0.005, and a thermal conductivity of 170 Watts per meter Kelvin (W/mK). Conductive frame 802 was formed of copper. Conductive layer width 826 was 15 millimeters (mm), conductive layer length 830 was 15 mm, and the rotator depth was 0.63 mm. Dielectric layer width 828 was 12 mm and dielectric layer length 832 was 12 mm.

First ridge horn antenna 200*a* and second ridge horn antenna 204*a* were defined as small aperture, ridged, exponentially flared, horn antennas to simultaneously provide high-power handling capability and broad bandwidth. First ridge horn antenna 200*a* and second ridge horn antenna 204*a* were formed of copper. Total depth 700 was 41 mm, tapered leg depth 701 was 21.3 mm, center channel length 702 was 2.2 mm, tapered leg length 703 was 14 mm, leg length 710 was 12 mm, conductor length 704 was 15 mm, center channel width 705 was 5.5 mm, and tapered leg width 706 was 3.25 mm. The aperture size was a square with dimensions of 14 mm×14 mm. To improve the impedance matching of first polarization rotating antenna element 106*a* to free space, a smooth exponential taper of the ridge was used for both first impedance matching section 212*a* and second impedance matching section 212*b*.

Figure 9A:
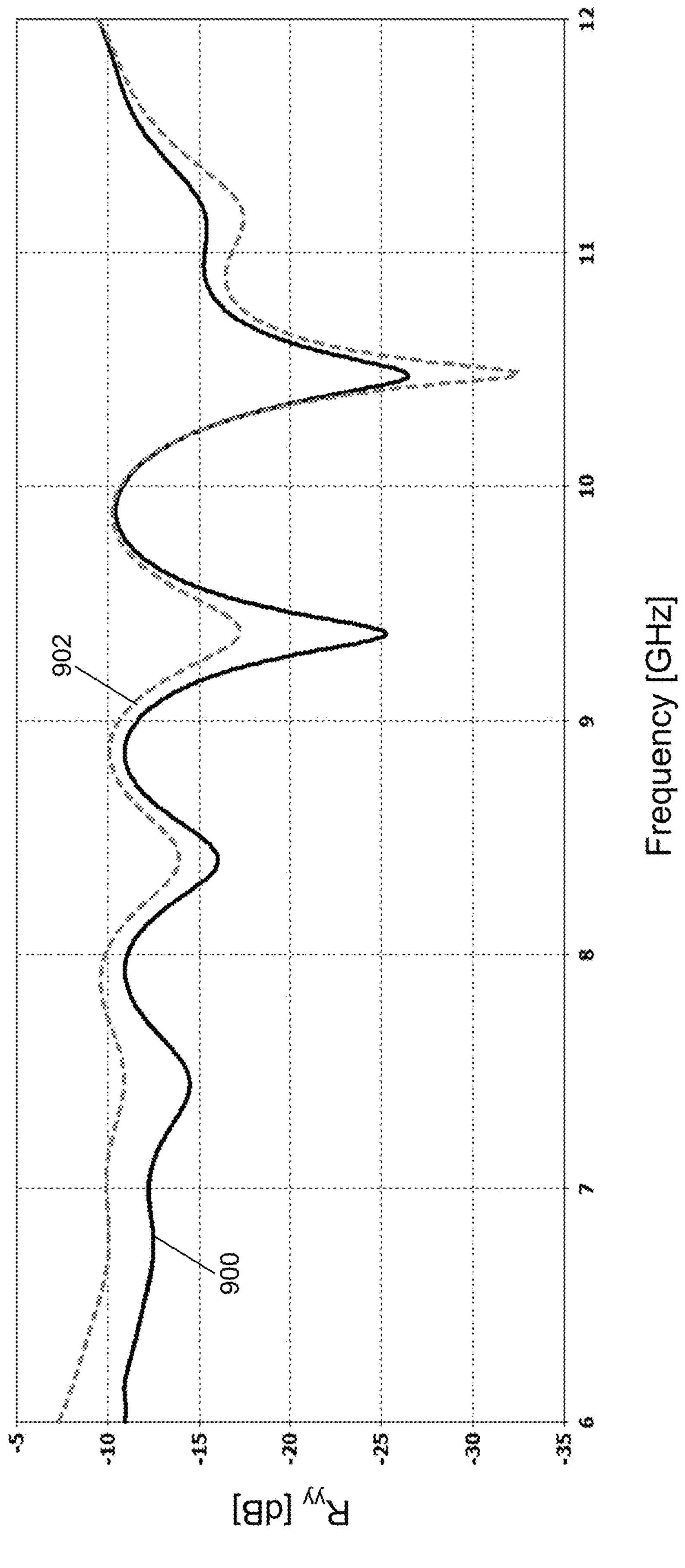
FIG. 9A depicts a simulated y-y reflection coefficient from the polarization rotating antenna element of FIG. 6 as a function of frequency for each switch mode in accordance with an illustrative embodiment.

The designed first polarization rotating antenna element 106*a* was simulated and optimized by three-dimensional full-wave electromagnetic software and scattering parameters of the structure were extracted. Referring to FIG. 9A, a simulated y-y reflection coefficient resulting from the designed implementation of first polarization rotating antenna element 106*a* is shown as a function of frequency for each switch mode in accordance with an illustrative embodiment. A first reflection coefficient curve 900 shows the simulated y-y reflection coefficient when first polarization rotating element 202*a* of first polarization rotating antenna element 106*a* is in the Mode 1 state. A second reflection coefficient curve 902 shows the simulated y-y reflection coefficient when first polarization rotating element 202*a* of first polarization rotating antenna element 106*a* is in the Mode 2 state.

Figure 9B:
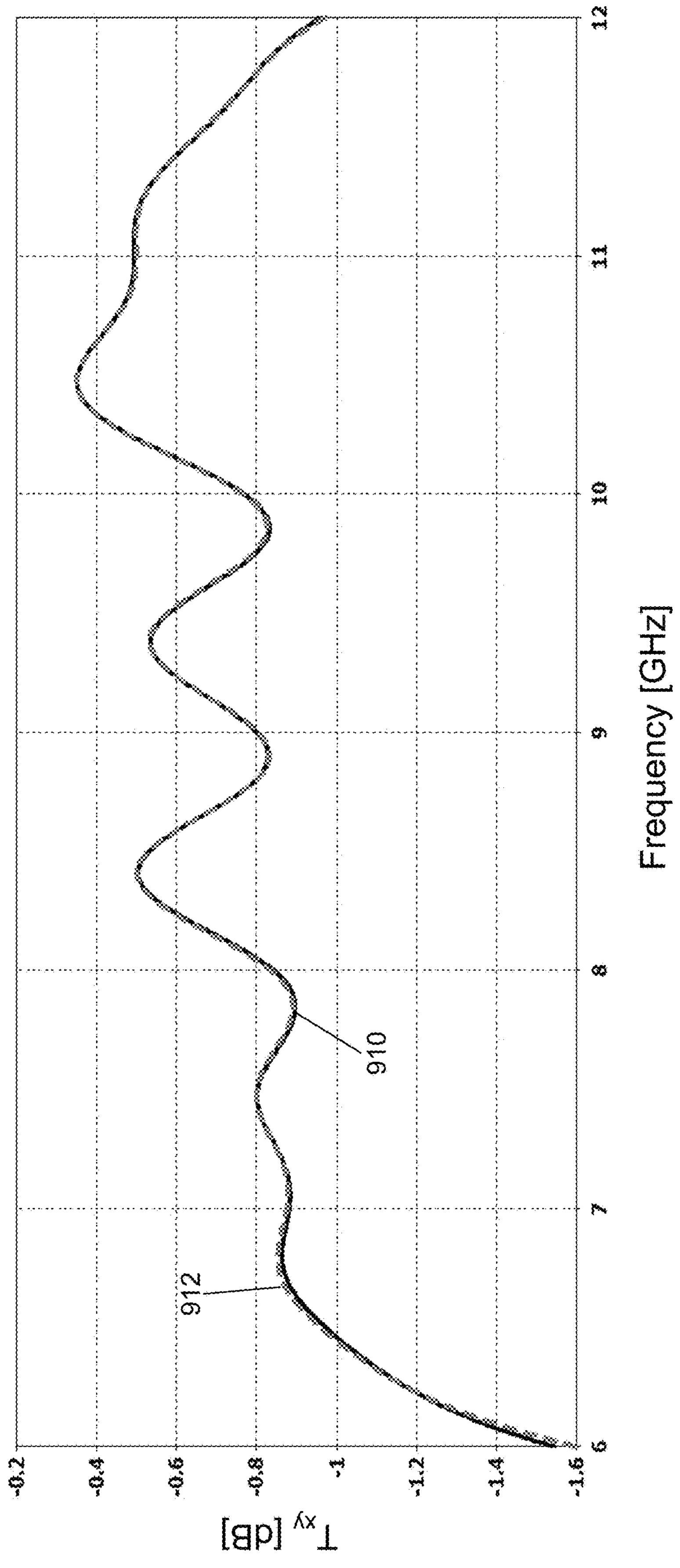
FIG. 9B depicts a simulated x-y transmission coefficient from the polarization rotating antenna element of FIG. 6 as a function of frequency for each switch mode in accordance with an illustrative embodiment.

Referring to FIG. 9B, a simulated x-y transmission coefficient resulting from the designed implementation of first polarization rotating antenna element 106*a* is shown as a function of frequency for each switch mode in accordance with an illustrative embodiment. A first transmission coefficient curve 910 shows the simulated x-y transmission coefficient when first polarization rotating element 202*a* of first polarization rotating antenna element 106*a* is in the Mode 1 state. A second transmission coefficient curve 912 shows the simulated x-y transmission coefficient when first polarization rotating element 202*a* of first polarization rotating antenna element 106*a* is in the Mode 2 state.

Figure 9C:
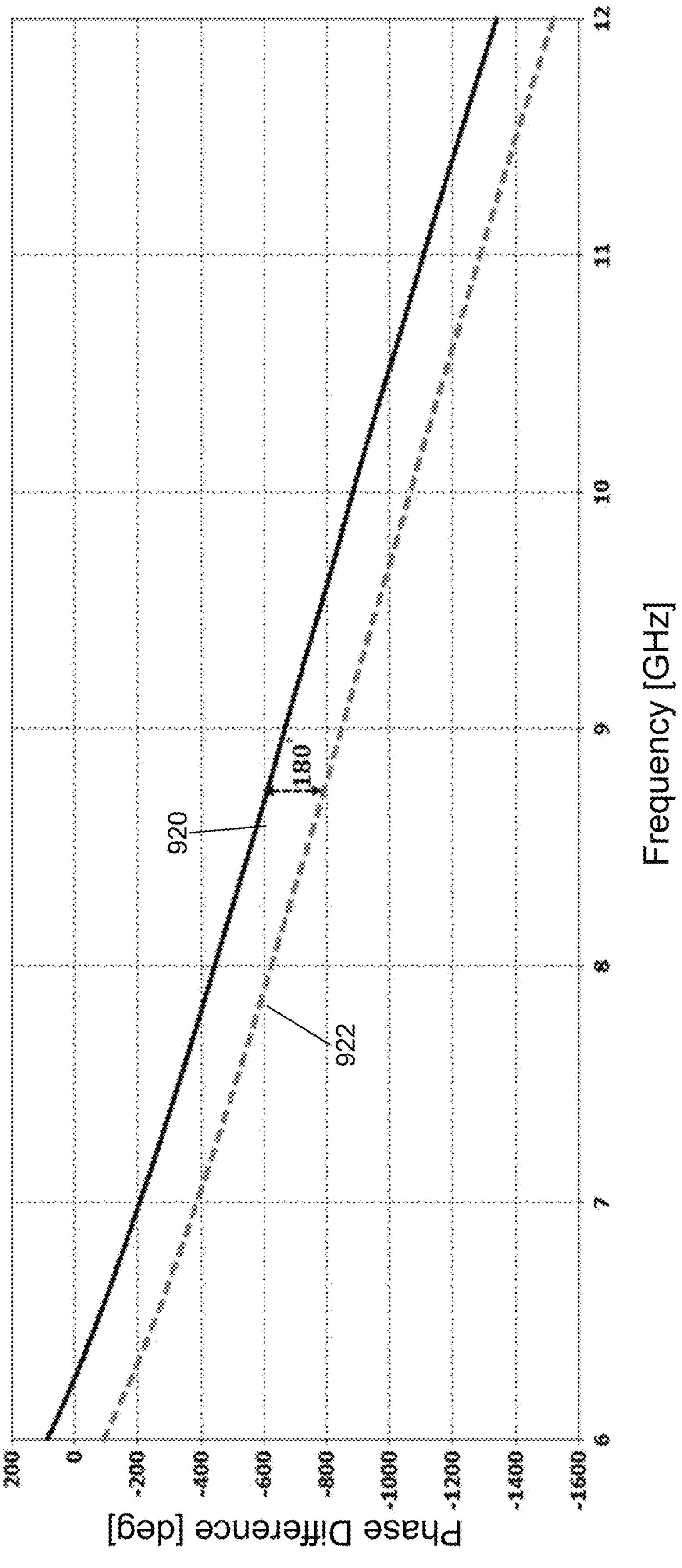
FIG. 9C depicts a simulated phase of each switch mode from the polarization rotating antenna element of FIG. 6 as a function of frequency in accordance with an illustrative embodiment.

Referring to FIG. 9C, a simulated phase resulting from the designed implementation of first polarization rotating antenna element 106*a* is shown as a function of frequency for each switch mode in accordance with an illustrative embodiment. A first phase curve 920 shows the simulated phase when first polarization rotating element 202*a* of first polarization rotating antenna element 106*a* is in the Mode 1 state. A second phase curve 922 shows the simulated phase when first polarization rotating element 202*a* of first polarization rotating antenna element 106*a* is in the Mode 2 state.

Figure 9D:
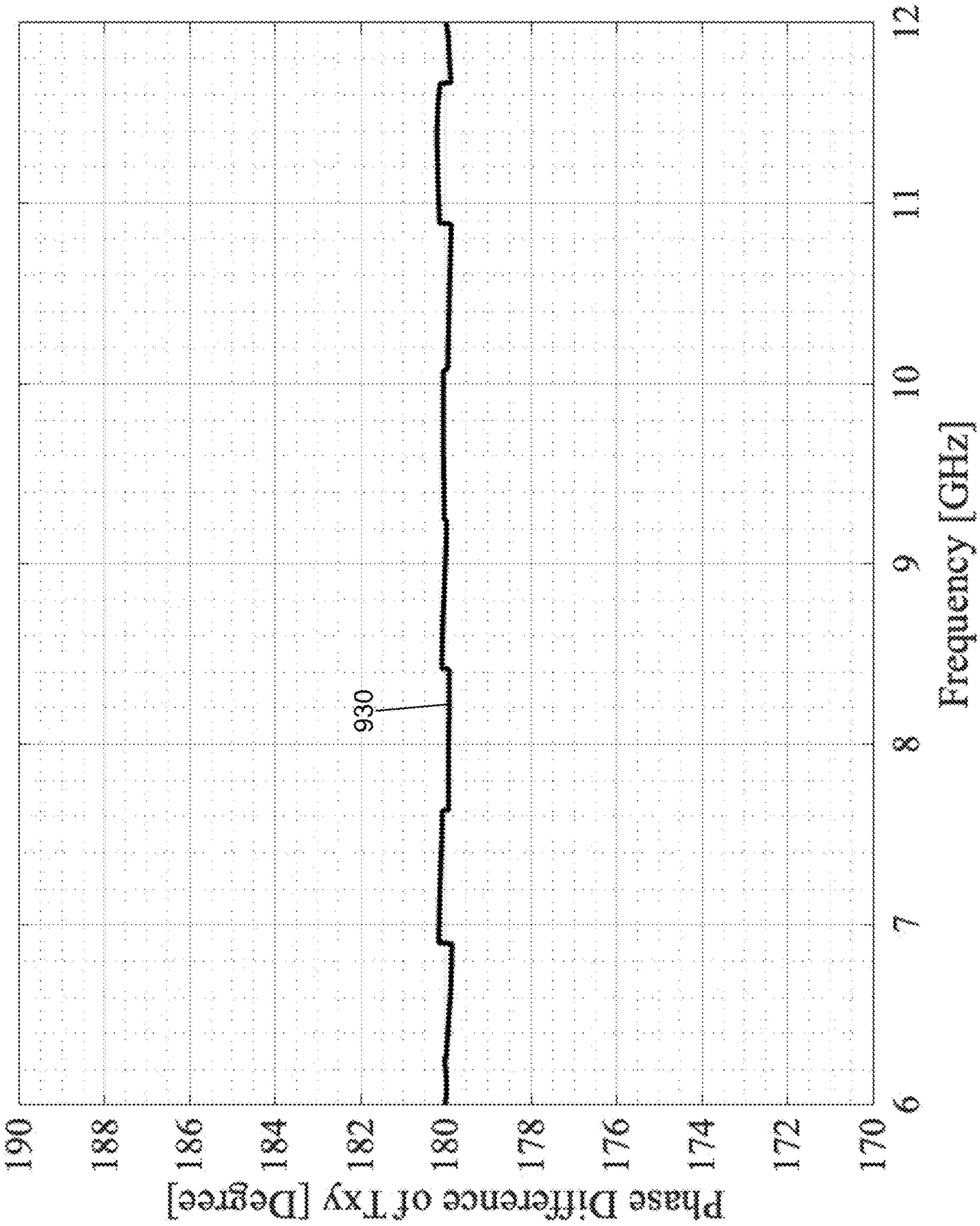
FIG. 9D depicts a simulated phase difference between the two switch modes of the polarization rotating antenna element of FIG. 6 as a function of frequency in accordance with an illustrative embodiment.

Referring to FIG. 9D, a simulated phase difference between the two switch modes of the designed implementation of first polarization rotating antenna element 106*a* is shown as a function of frequency in accordance with an illustrative embodiment. A phase difference curve 930 shows the simulated phase difference between the two states. The phase difference is approximately 180° across the entire frequency band of interest.

Figure 10:
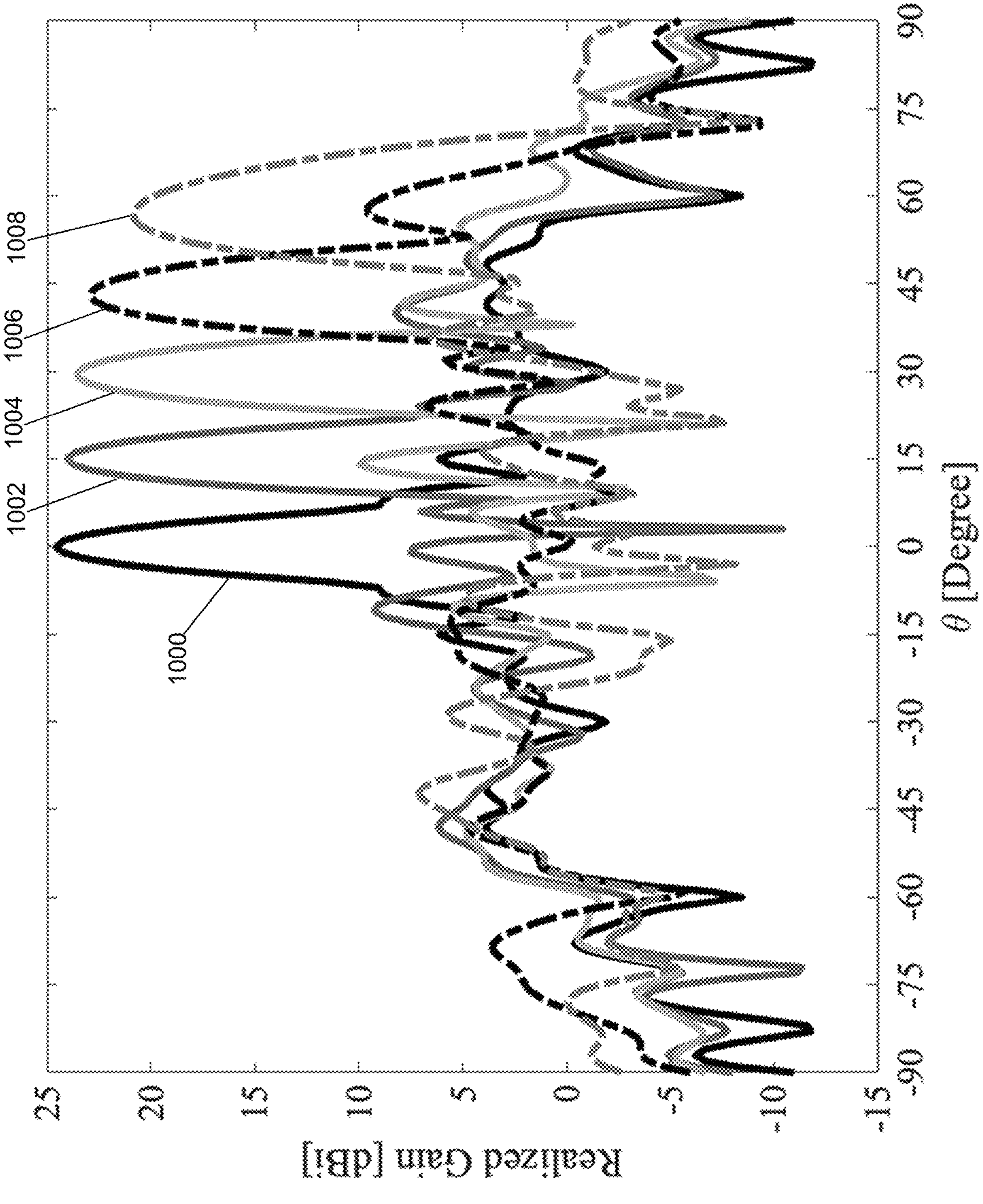
FIG. 10 depicts a simulated realized gain for the distribution patterns of FIGS. 5A to 5E as a function of scan angle at 10.0 gigahertz (GHz) in accordance with an illustrative embodiment.

Full-wave simulations of phased array antenna 104 with the 400 polarization rotating antenna elements shown referring to FIGS. 3 and 4 using the distribution patterns configured for each scan angle 0° (FIG. 5A), 15° (FIG. 5B), 30° (FIG. 5C), 45° (FIG. 5D), 60° (FIG. 5E) relative to the boresight axis at 10 GHz were performed. Referring to FIG. 10, a simulated realized gain for the five different scan angles is shown in accordance with an illustrative embodiment. A first gain curve 1000 shows the simulated realized gain for a scan angle of 0° based on the distribution pattern shown in FIG. 5A. A second gain curve 1002 shows the simulated realized gain for a scan angle of 15° based on the distribution pattern shown in FIG. 5B. A third gain curve 1004 shows the simulated realized gain for a scan angle of 30° based on the distribution pattern shown in FIG. 5C. A fourth gain curve 1006 shows the simulated realized gain for a scan angle of 45° based on the distribution pattern shown in FIG. 5D. A fifth gain curve 1008 shows the simulated realized gain for a scan angle of 60° based on the distribution pattern shown in FIG. 5E.

The simulated co-polarized peak gain is 24.6 decibels with respect to an isotropic radiator (dBi), 24 dBi, 23.5 dBi, 22.9 dBi and 20.9 dBi for the scan angles of 0°, 15°, 30°, 45°, and 60°, respectively. As a result, the scan losses for steering the beam from broadside to scan angles of 30°, 45°, and 60° are about 1.1, 1.7, and 3.7 dB, respectively. Moreover, the simulated sidelobe level is −18.4 decibels (dB), −14.8 dB, −13.6 dB, −13.3 dB, and −13.8 dB for the scan angles of 0°, 15°, 30°, 45°, and 60°, respectively.

Figure 11A:
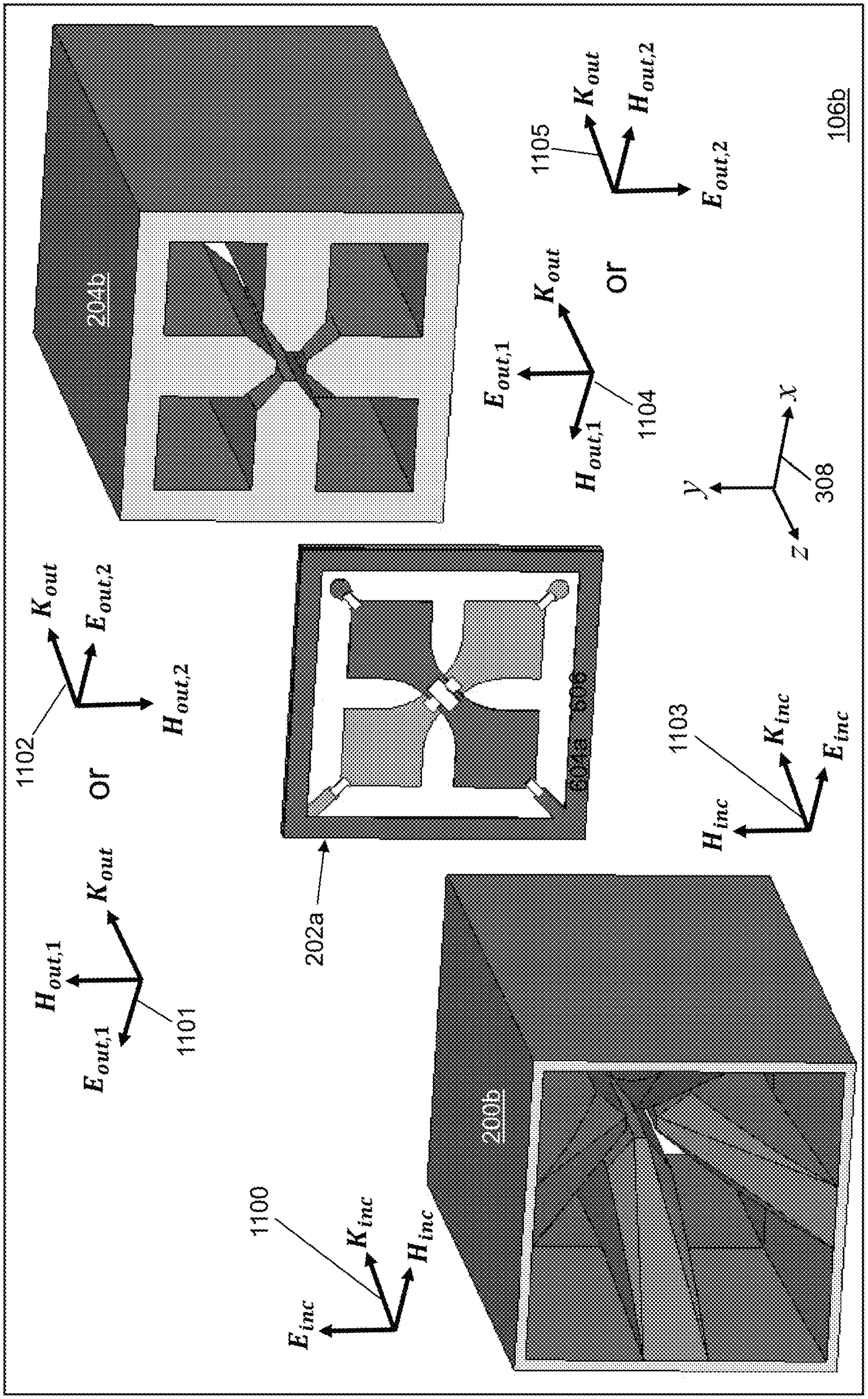
FIG. 11A depicts a perspective view of a second polarization rotating antenna element comprised of two quad-ridge horn antennas in accordance with an illustrative embodiment.

Referring to FIG. 11A, a perspective view is shown of a second polarization rotating antenna element 106*b* in accordance with an illustrative embodiment. Second polarization rotating antenna element 106*b* includes a first quad-ridge horn antenna 200*b*, first polarization rotating element 202*a*, and a second quad-ridge horn antenna 204*b*. First quad-ridge horn antenna 200*b* and second quad-ridge horn antenna 204*b* are identical except that second quad-ridge horn antenna 204*b* is rotated 90° in the x-y plane relative to first quad-ridge horn antenna 200*b* and is rotated 180° in the x-z plane relative to first quad-ridge horn antenna 200*b*.

Figure 11B:
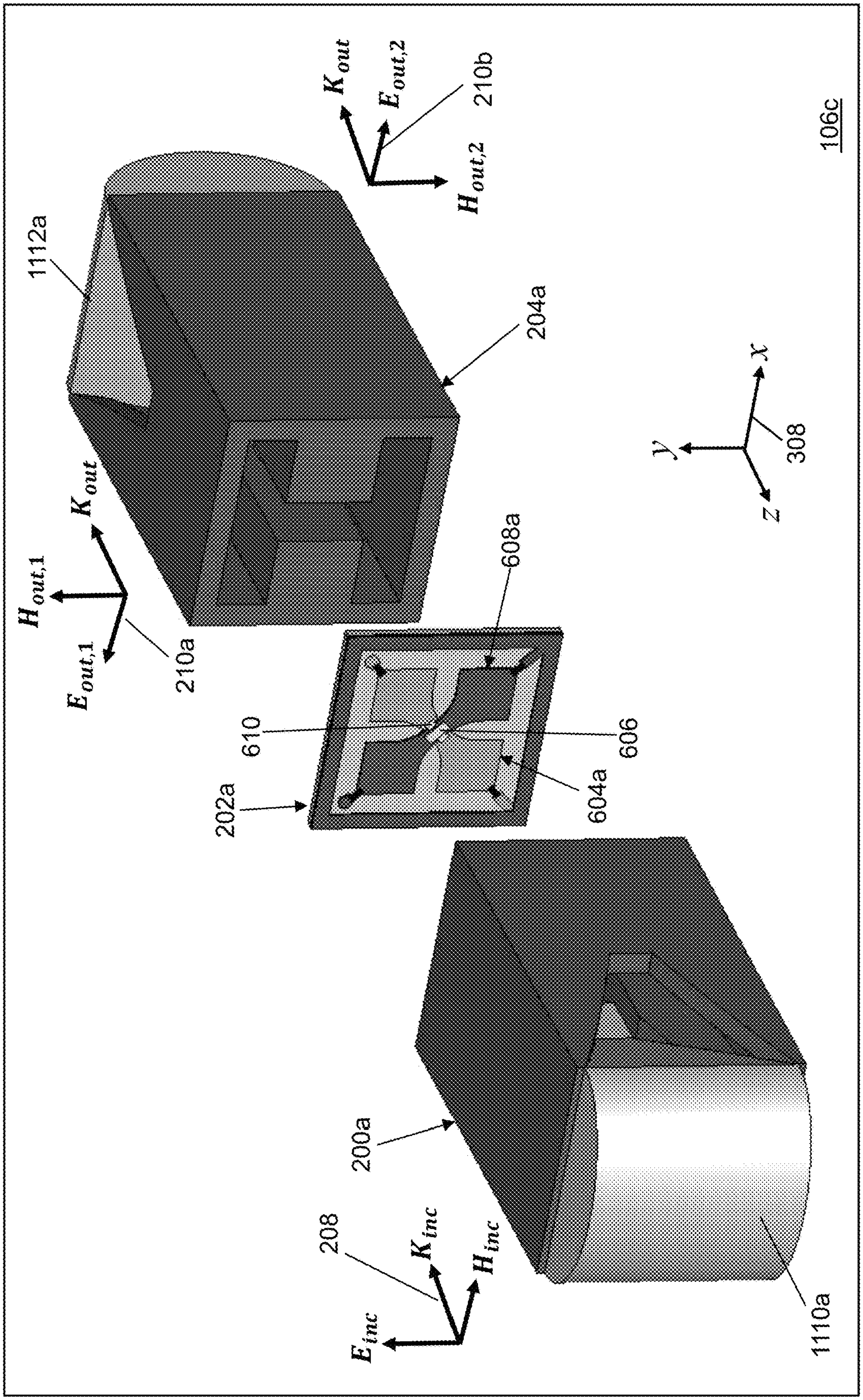
FIG. 11B depicts a perspective view of a third polarization rotating antenna element comprised of the polarization rotating antenna element of FIG. 6 with a dielectric lens in accordance with an illustrative embodiment.

Referring to FIG. 11B, an exploded perspective view of a third polarization rotating antenna element 106*c* is shown in accordance with an illustrative embodiment. Third polarization rotating antenna element 106*c* includes a first spherical dielectric lens 1110*a*, first ridge horn antenna 200*a*, first polarization rotating element 202*a*, second ridge horn antenna 204*a*, and a second spherical dielectric lens 1112*a*. First spherical dielectric lens 1110*a* fills a space within first ridge horn antenna 200*a*, and second spherical dielectric lens 1112*a* fills a space within second ridge horn antenna 204*a*. In the illustrative embodiment, first spherical dielectric lens 1110*a* and second spherical dielectric lens 1112*a* may be identical. Each of first ridge horn antenna 200*a*, first polarization rotating element 202*a*, and second ridge horn antenna 204*a* has a square shaped cross-section in the x-y plane defined by orthogonal coordinate reference frame 308 though other cross-sectional shapes may be used in alternative embodiments.

Figures 11C, 11D:
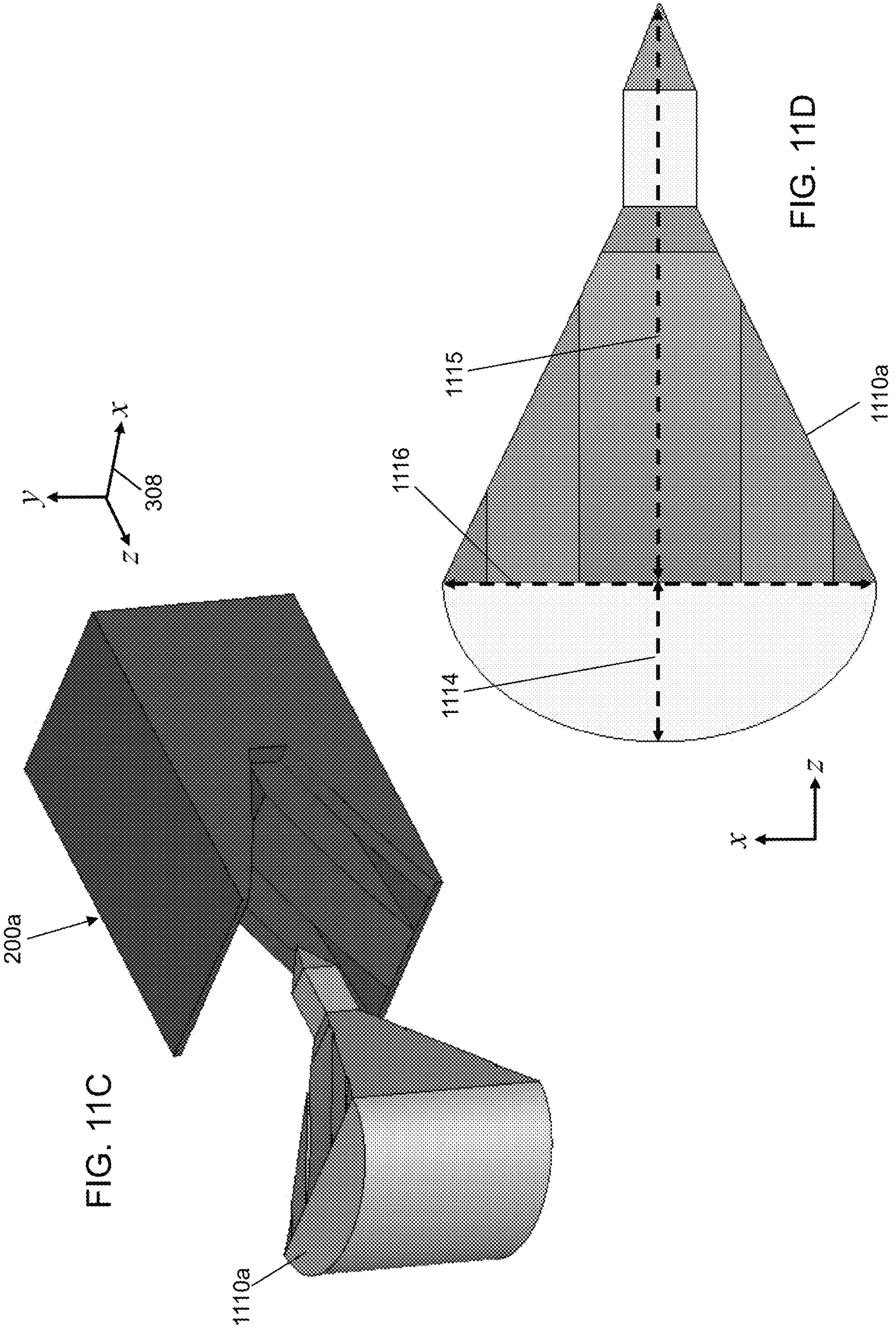
FIG. 11C depicts a perspective view of the third polarization rotating antenna element of FIG. 11B with the dielectric lens exploded from the ridge horn antenna in accordance with an illustrative embodiment.
FIG. 11D depicts a side cross-section view of the dielectric lens of FIG. 11B in accordance with an illustrative embodiment.

Referring to FIG. 11C, a perspective view of first ridge horn antenna 200*a* is shown with first spherical dielectric lens 1110*a* exploded from a body of first ridge horn antenna 200*a* in accordance with an illustrative embodiment. Referring to FIG. 11D, a side cross-section view of first spherical dielectric lens 1110*a* is shown in accordance with an illustrative embodiment. First spherical dielectric lens 1110*a* has a sphere depth 1114 parallel to the z-axis of orthogonal coordinate reference frame 308, a body depth 1115 parallel to the z-axis of orthogonal coordinate reference frame 308, and a sphere length 1116 parallel to the x-axis of orthogonal coordinate reference frame 308. First spherical dielectric lens 1110*a* is formed of a dielectric material to replace air or another gas that may fill the space within the body of first ridge horn antenna 200*a*.

First spherical dielectric lens 1110*a* completely filled the taper of first ridge horn antenna 200*a* to improve the aperture efficiency. In an illustrative embodiment, first spherical dielectric lens 1110*a* may be formed using a low loss and thermally stable customized dielectric material with a permittivity of 2.03 and a loss tangent of 0.0004 at 6 GHz. Sphere depth 1114 may be 7.5 mm, body depth 1115 may be 22 mm, and sphere length 1116 may be 15 mm.

Figure 11E:
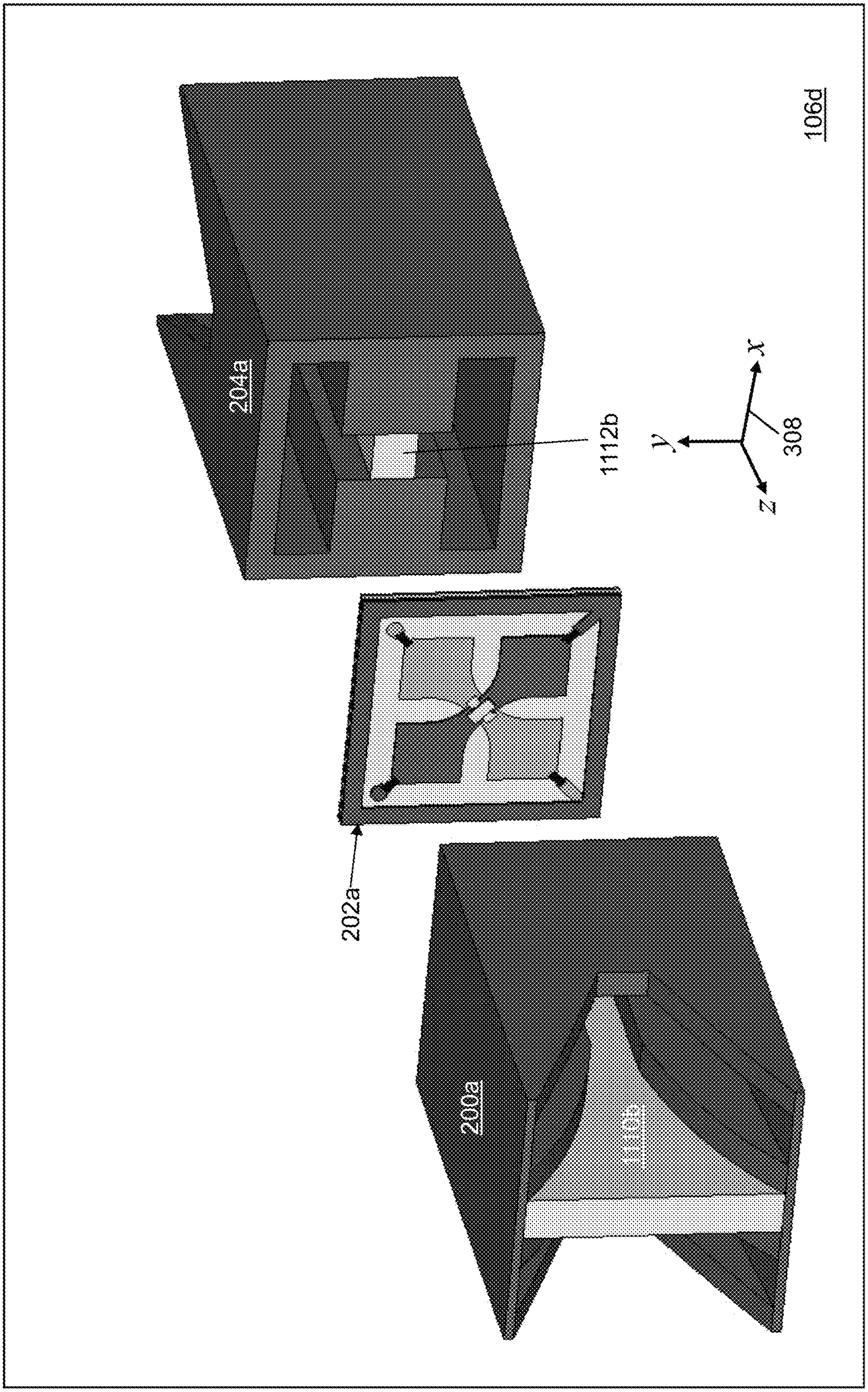
FIG. 11E depicts a perspective view of a fourth polarization rotating antenna element comprised of the polarization rotating antenna element of FIG. 6 with a second dielectric lens in accordance with an illustrative embodiment.

Referring to FIG. 11E, a perspective view is shown of a fourth polarization rotating antenna element 106*d* in accordance with an illustrative embodiment. Fourth polarization rotating antenna element 106*d* includes a first funnel-shaped dielectric lens 1110*b*, first ridge horn antenna 200*a*, first polarization rotating element 202*a*, second ridge horn antenna 204*a*, and a second funnel-shaped dielectric lens 1112*b*. First funnel-shaped dielectric lens 1110*b* fills a center channel space within first ridge horn antenna 200*a*, and second funnel-shaped dielectric lens 1112*b* fills a center channel space within second ridge horn antenna 204*a*. First funnel-shaped dielectric lens 1110*b* and second funnel-shaped dielectric lens 1112*b* are identical though rotated 180° relative to each other and include a dielectric plate with a funnel shape that extends within a center channel of first ridge horn antenna 200*a* or second ridge horn antenna 204*a*, respectively. In the illustrative embodiment, each plate of first funnel-shaped dielectric lens 1110*b* and second funnel-shaped dielectric lens 1112*b* has a length and a width in the x-y plane defined by center channel length 702 at a center of each ridge in a face closest to first polarization rotating element 202*a*. In the illustrative embodiment, each plate of first funnel-shaped dielectric lens 1110*b* and second funnel-shaped dielectric lens 1112*b* has a length parallel to the z-axis defined by body depth 1115, a length parallel to the x-axis defined by sphere length 1116, and a length parallel to the y-axis defined by center channel length 702. In the illustrative embodiment, the funnel walls are tapered to fill the tapered legs of each respective ridge horn antenna 200*a* or 204*a*.

Figure 11F:
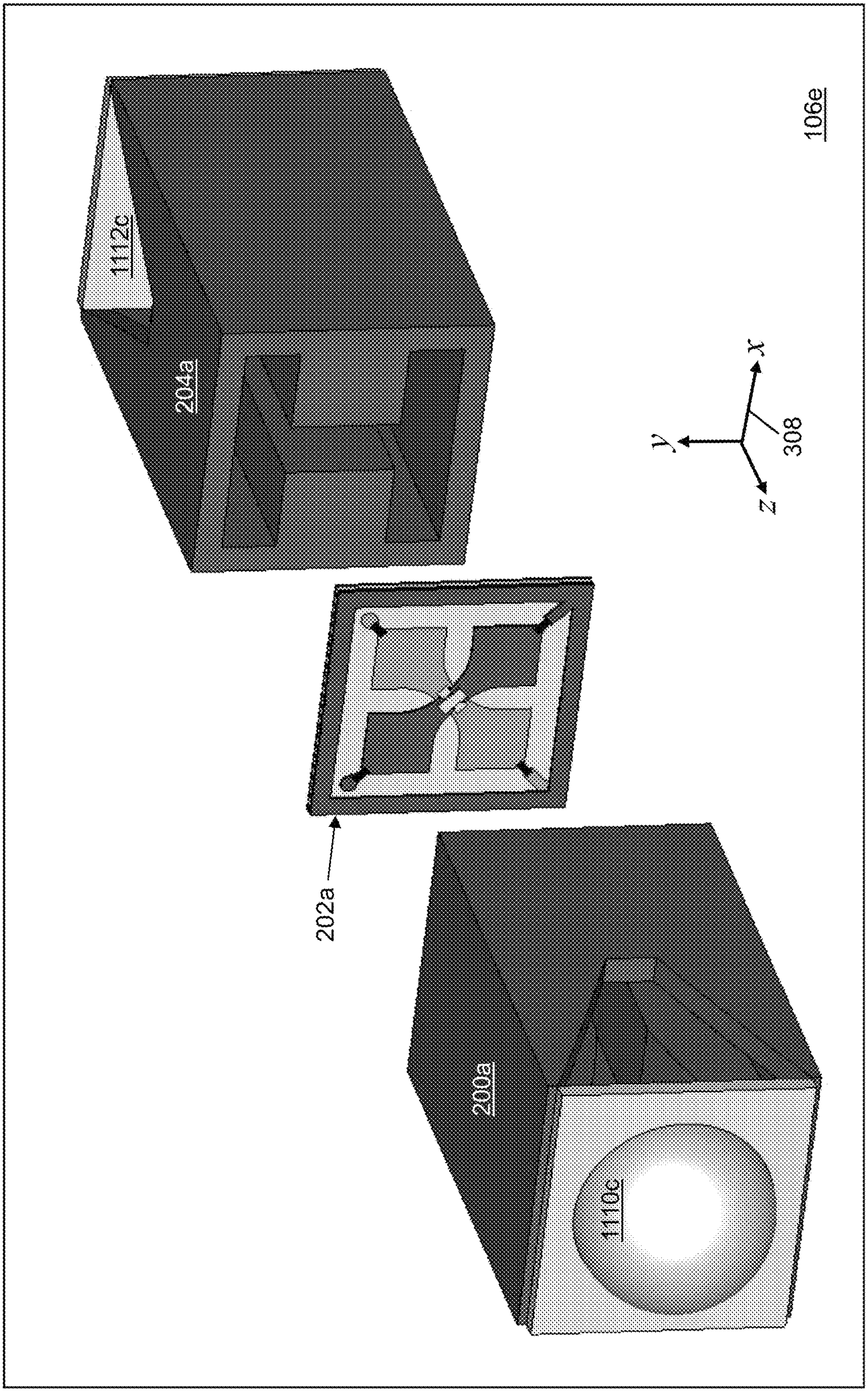
FIG. 11F depicts a perspective view of a fifth polarization rotating antenna element comprised of the polarization rotating antenna element of FIG. 6 with a third dielectric lens in accordance with an illustrative embodiment.

Referring to FIG. 11F, a perspective view is shown of a fifth polarization rotating antenna element 106*e* in accordance with an illustrative embodiment. Twentieth polarization rotating antenna element 106*e* includes a first bulb-shaped dielectric lens 1110*c*, first ridge horn antenna 200*a*, first polarization rotating element 202*a*, second ridge horn antenna 204*a*, and a second bulb-shaped dielectric lens 1112*c*. First bulb-shaped dielectric lens 1110*c* fills a back face space within first ridge horn antenna 200*a*, and second bulb-shaped dielectric lens 1112*c* fills a front face space within second ridge horn antenna 204*a*. First bulb-shaped dielectric lens 1110*c* and second bulb-shaped dielectric lens 1112*c* are identical though rotated 180° relative to each other and include a dielectric plate with a center bulb protruding outward away from a respective ridge horn antenna 200*a* or 204*a*. In the illustrative embodiment, each plate of first bulb-shaped dielectric lens 1110*c* and second bulb-shaped dielectric lens 1112*c* has a length and a width in the x-y plane defined by tapered leg length 703.

Figure 11G:
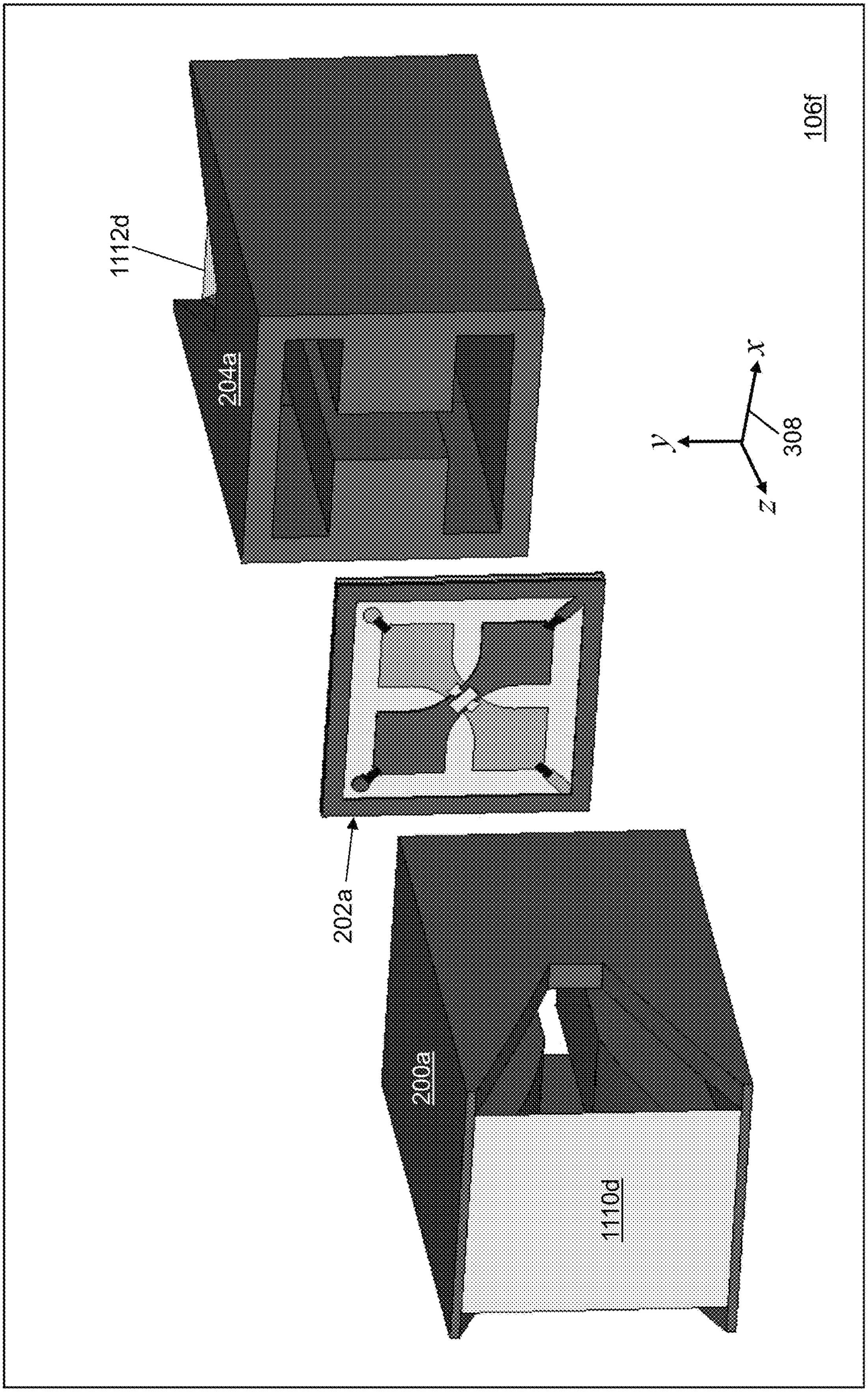
FIG. 11G depicts a perspective view of a sixth polarization rotating antenna element comprised of the polarization rotating antenna element of FIG. 6 with a fourth dielectric lens in accordance with an illustrative embodiment.

Referring to FIG. 11G, a perspective view is shown of a sixth polarization rotating antenna element 106*f* in accordance with an illustrative embodiment. Sixth polarization rotating antenna element 106*f* includes a first plate-shaped dielectric lens 1110*d*, first ridge horn antenna 200*a*, first polarization rotating element 202*a*, second ridge horn antenna 204*a*, and a second plate-shaped dielectric lens 1112*d*. First plate-shaped dielectric lens 1110*d* fills a back face space within first ridge horn antenna 200*a*, and second plate-shaped dielectric lens 1112*d* fills a front face space within second ridge horn antenna 204*a*. First plate-shaped dielectric lens 1110*d* and second plate-shaped dielectric lens 1112*d* are identical though rotated 180° relative to each other and include a dielectric plate. In the illustrative embodiment, each of first plate-shaped dielectric lens 1110*d* and second plate-shaped dielectric lens 1112*d* has a length and a width in the x-y plane defined by tapered leg length 703.

Figure 11H:
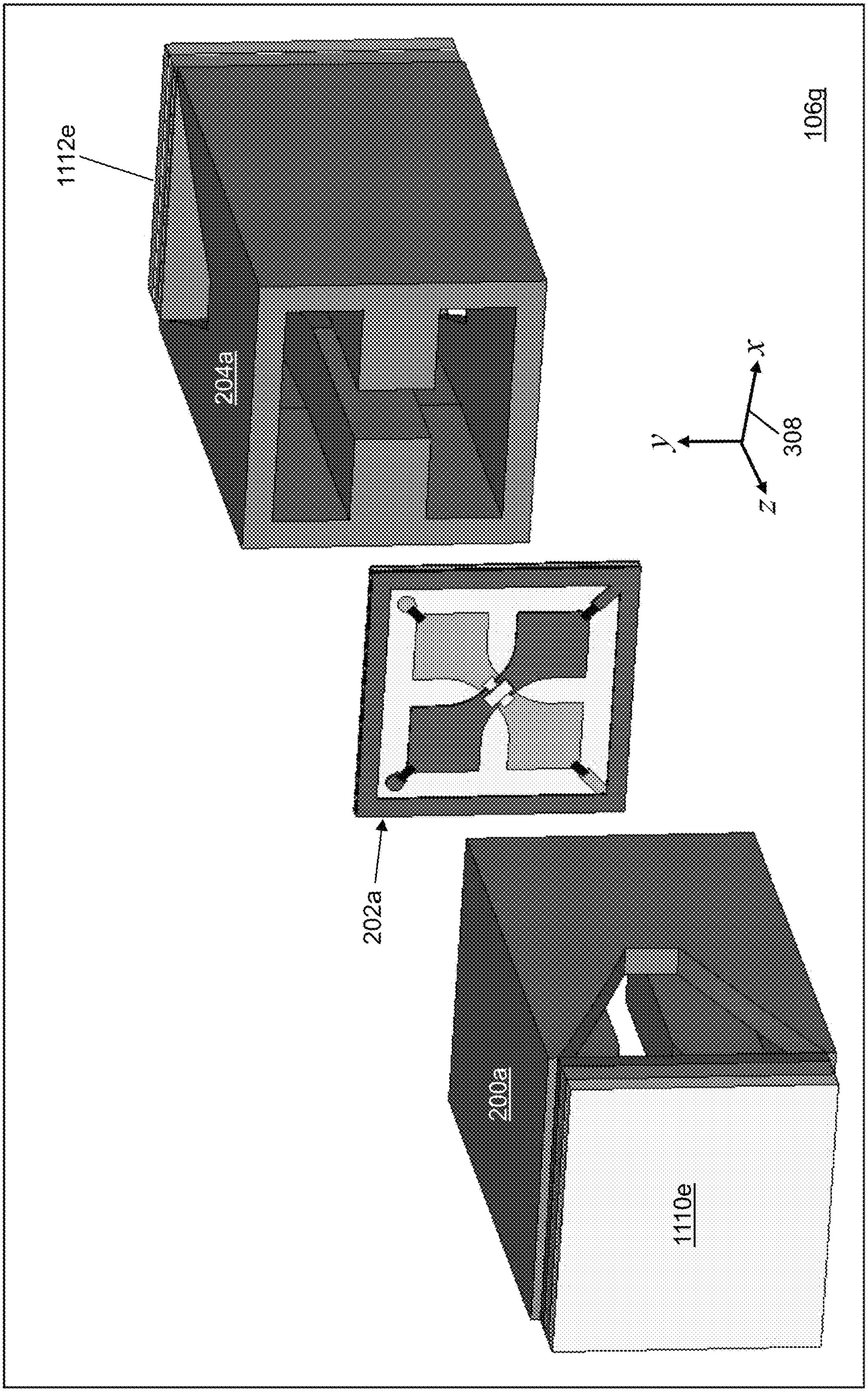
FIG. 11H depicts a perspective view of a seventh polarization rotating antenna element comprised of the polarization rotating antenna element of FIG. 6 with a fifth dielectric lens in accordance with an illustrative embodiment.

Referring to FIG. 11H, a perspective view is shown of a seventh polarization rotating antenna element 106*g* in accordance with an illustrative embodiment. Seventh polarization rotating antenna element 106*g* includes a first stacked plate-shaped dielectric lens 1110*e*, first ridge horn antenna 200*a*, first polarization rotating element 202*a*, second ridge horn antenna 204*a*, and a second stacked plate-shaped dielectric lens 1112*e*. First stacked plate-shaped dielectric lens 1110*e* fills a back face space within first ridge horn antenna 200*a*, and second stacked plate-shaped dielectric lens 1112*e* fills a front face space within second ridge horn antenna 204*a*. First stacked plate-shaped dielectric lens 1110*e* and second stacked plate-shaped dielectric lens 1112*e* are identical though rotated 180° relative to each other and include a plurality of dielectric plates having different dielectric constants that are stacked successively parallel to the z-axis. In the illustrative embodiment, each plate has a length and a width in the x-y plane defined by tapered leg length 703.

Figure 11I:
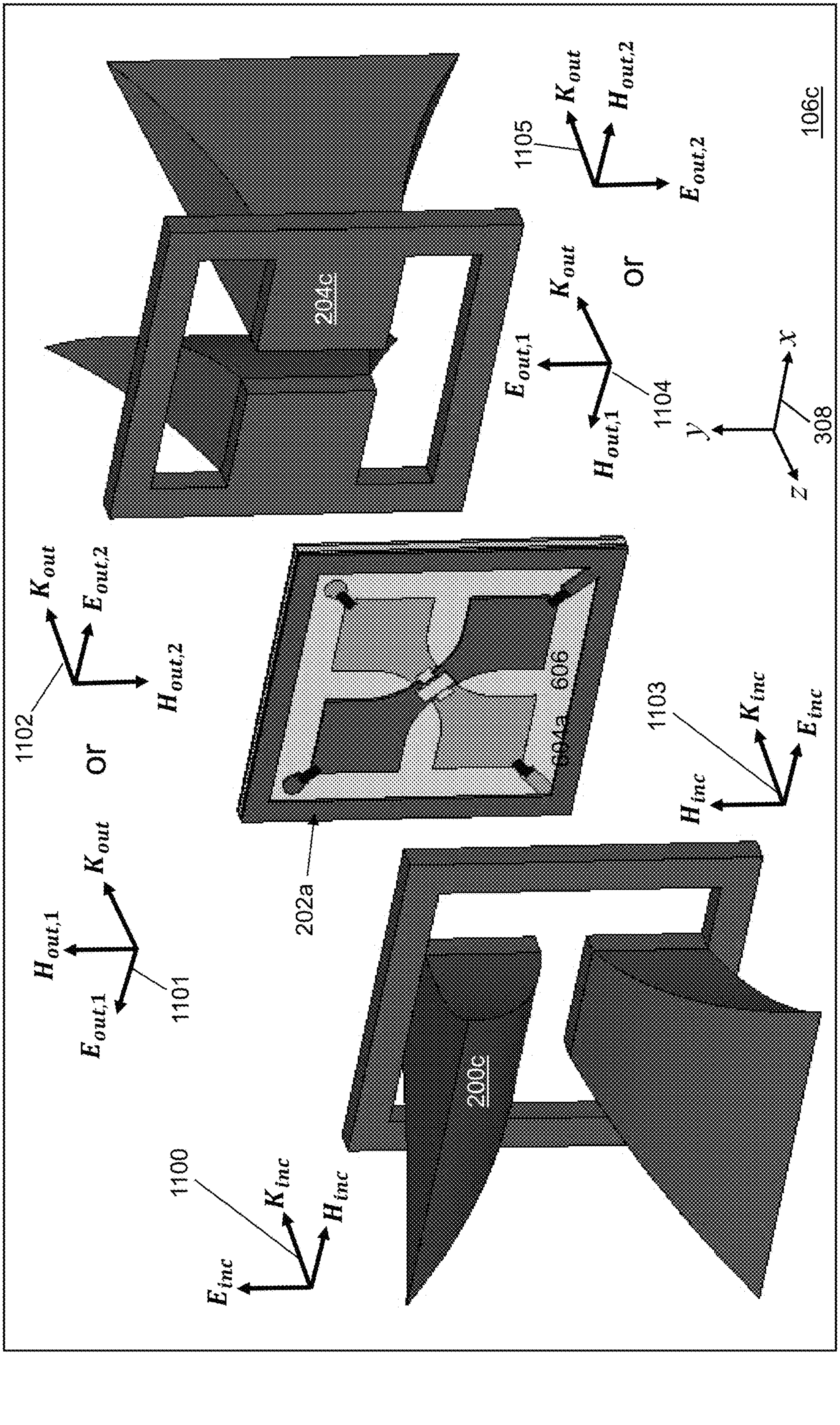
FIG. 11I depicts a perspective view of a third polarization rotating antenna element comprised of two double-ridged antennas in accordance with an illustrative embodiment.

Referring to FIG. 11I, a perspective view is shown of a third polarization rotating antenna element 106*c* in accordance with an illustrative embodiment. Third polarization rotating antenna element 106*c* includes a first double-ridge antenna 200*c*, first polarization rotating element 202*a*, and a second double-ridge antenna 204*c*. First double-ridge antenna 200*c* and second double-ridge antenna 204*c* are identical except that second double-ridge antenna 204*c* is rotated 90° in the x-y plane relative to first double-ridge antenna 200*c* and is rotated 180° in the x-z plane relative to first double-ridge antenna 200*c*.

Figure 12B:
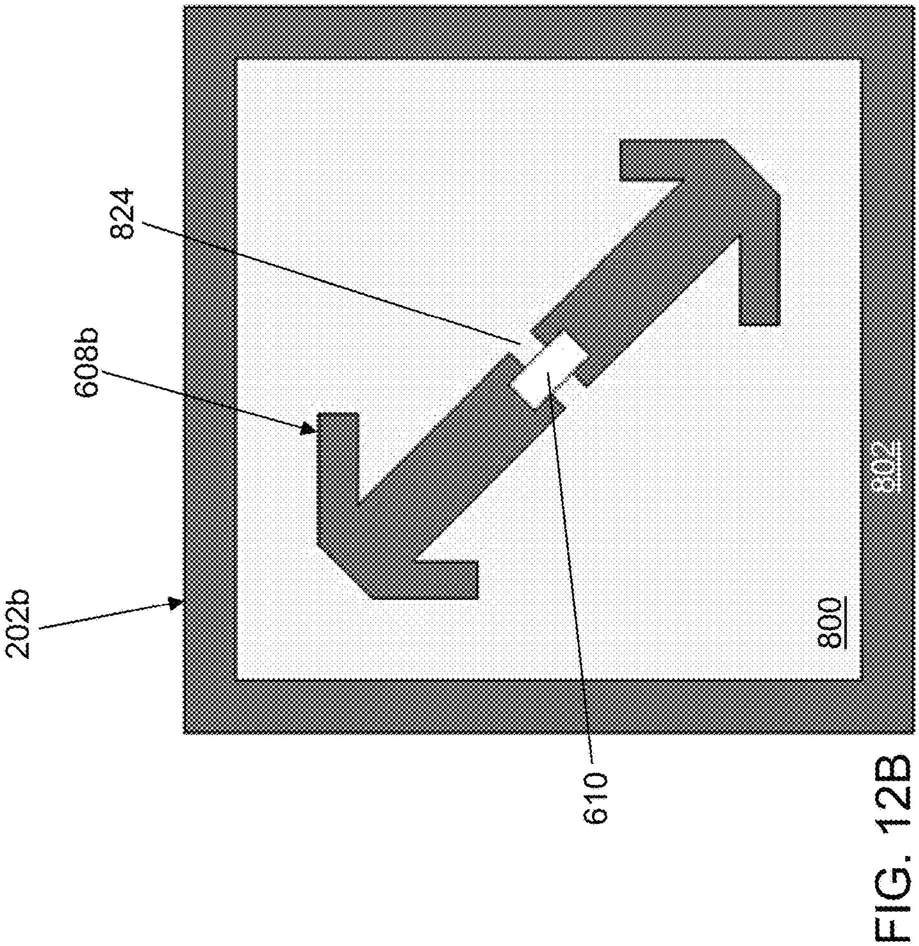
FIG. 12B depicts a front view of the second polarization rotating element of FIG. 12A in accordance with an illustrative embodiment.
Figure 12A:
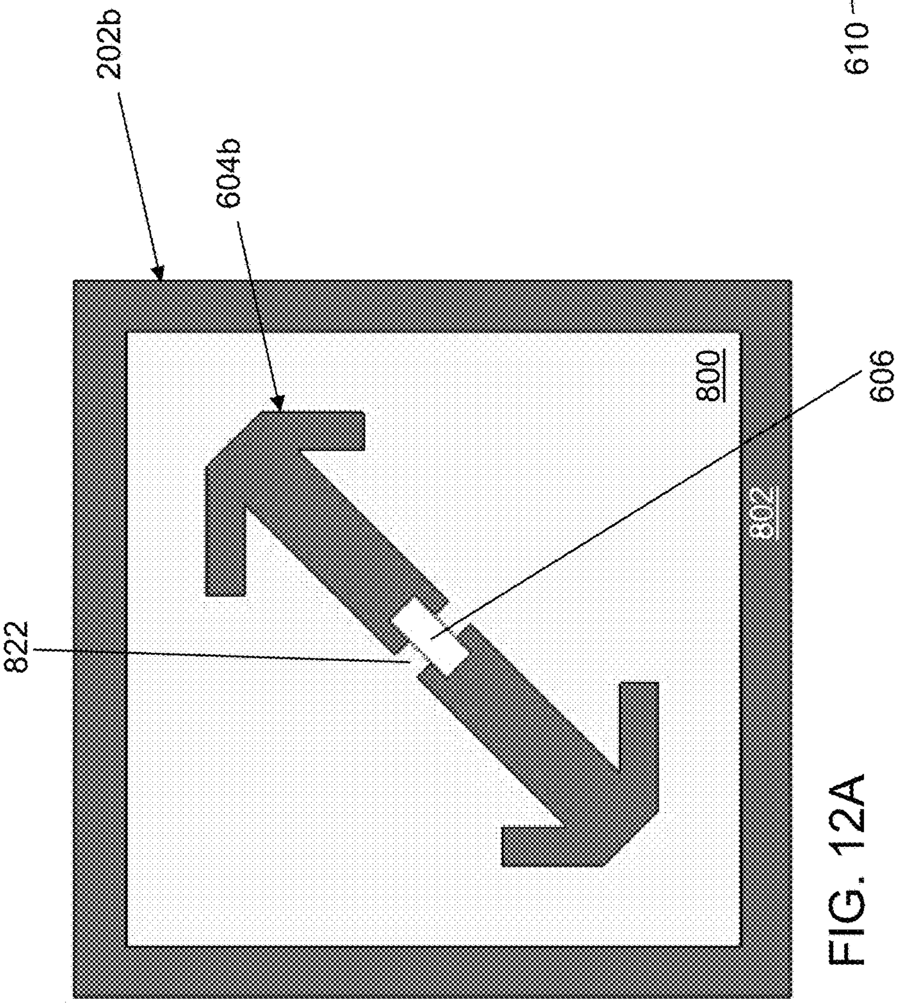
FIG. 12A depicts a back view of a second polarization rotating element in accordance with an illustrative embodiment.

Referring to FIG. 12A, a back view is shown of a second polarization rotating element 202*b* in accordance with an illustrative embodiment. Referring to FIG. 12B, a front view is shown of second polarization rotating element 202*b* in accordance with an illustrative embodiment. Second polarization rotating element 202*b* is shown as transparent and includes a second back dipole 604*b*, first switch 606, a second front dipole 608*b*, and second switch 610. Second back dipole 604*b* and second front dipole 608*b* are formed as arrows pointed to each corner of dielectric layer 800. Each dipole of second polarization rotating element 202*b* defines a conducting pattern layer mounted to either the back surface or the front surface of dielectric layer 800. Again, each half of each dipole of second polarization rotating element 202*b* is rotated ±45° relative to the incoming electric field $E_{inc}$.

Figure 12D:
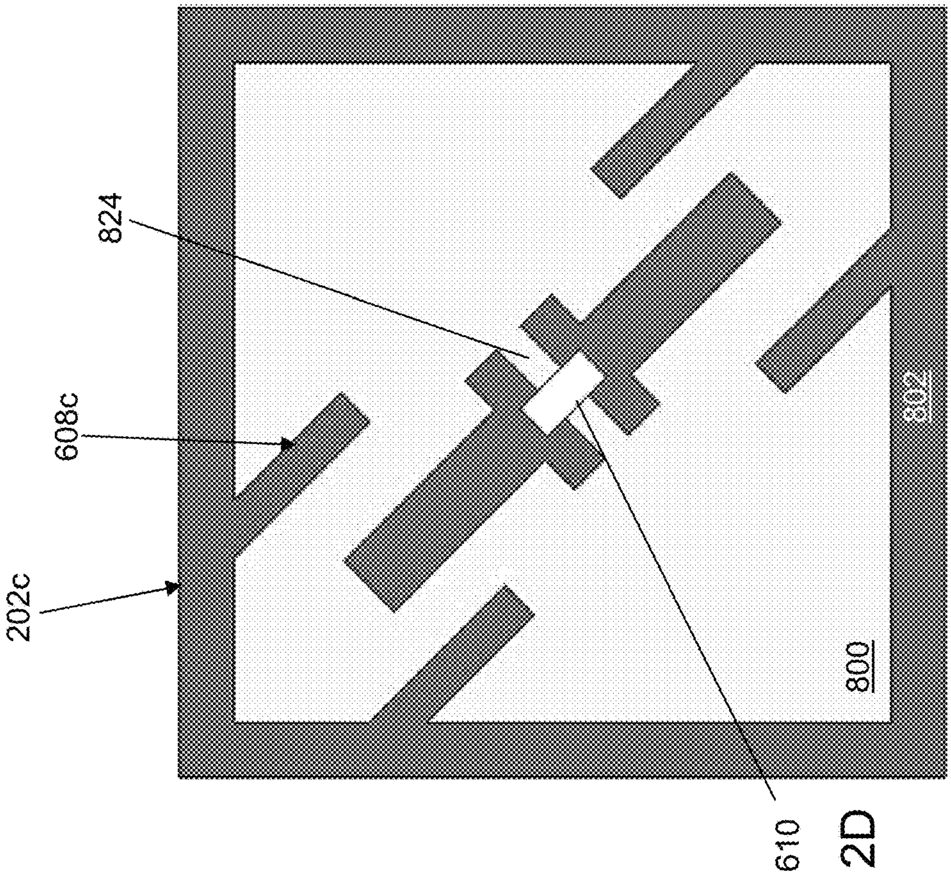
FIG. 12D depicts a front view of the third polarization rotating element of FIG. 12C in accordance with an illustrative embodiment.
Figure 12C:
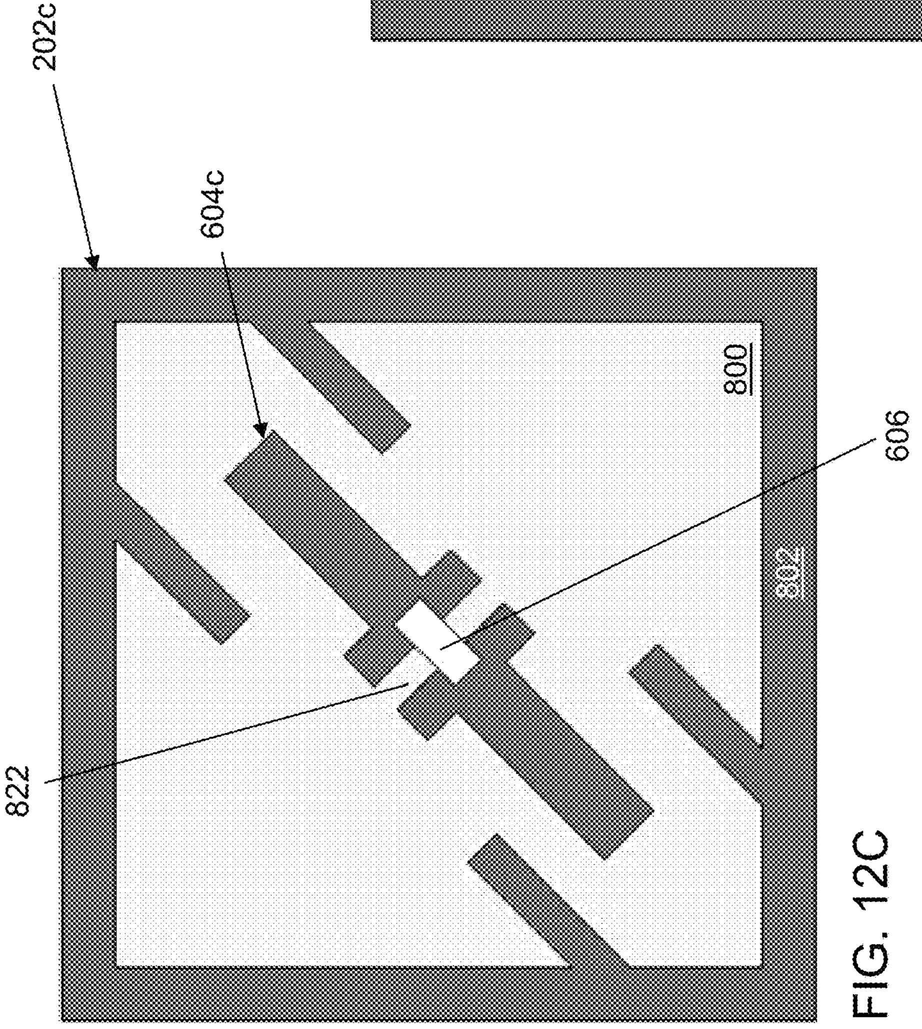
FIG. 12C depicts a back view of a third polarization rotating element in accordance with an illustrative embodiment.

Referring to FIG. 12C, a back view is shown of a third polarization rotating element 202*c* in accordance with an illustrative embodiment. Referring to FIG. 12D, a front view is shown of third polarization rotating element 202*c* in accordance with an illustrative embodiment. Third polarization rotating element 202*c* is shown as transparent and includes a third back dipole 604*c*, first switch 606, a third front dipole 608*c*, and second switch 610. Third back dipole 604*c* and third front dipole 608*c* are formed as three sections extending toward a distinct corner of dielectric layer 800. The three sections include two rectangular bars separated from a central T-shaped center conductor pointed toward a center of each corner. First switch 606 or second switch 610 is connected between a top head of each central T-shaped center conductor. Each dipole of third polarization rotating element 202*c* defines a conducting pattern layer mounted to either the back surface or the front surface of dielectric layer 800. Again, each half of each dipole of third polarization rotating antenna element 604*c* is rotated ±45° relative to the incoming electric field $E_{inc}$.

Figure 12F:
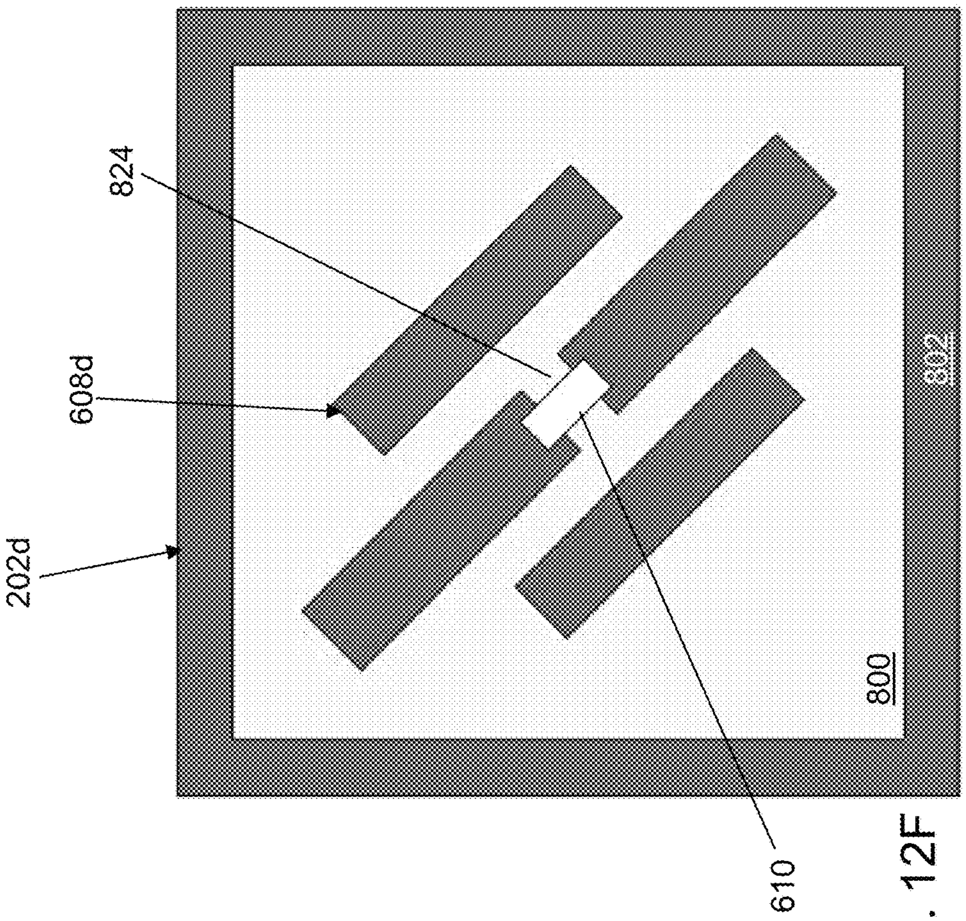
FIG. 12F depicts a front view of the fourth polarization rotating element of FIG. 12E in accordance with an illustrative embodiment.
Figure 12E:
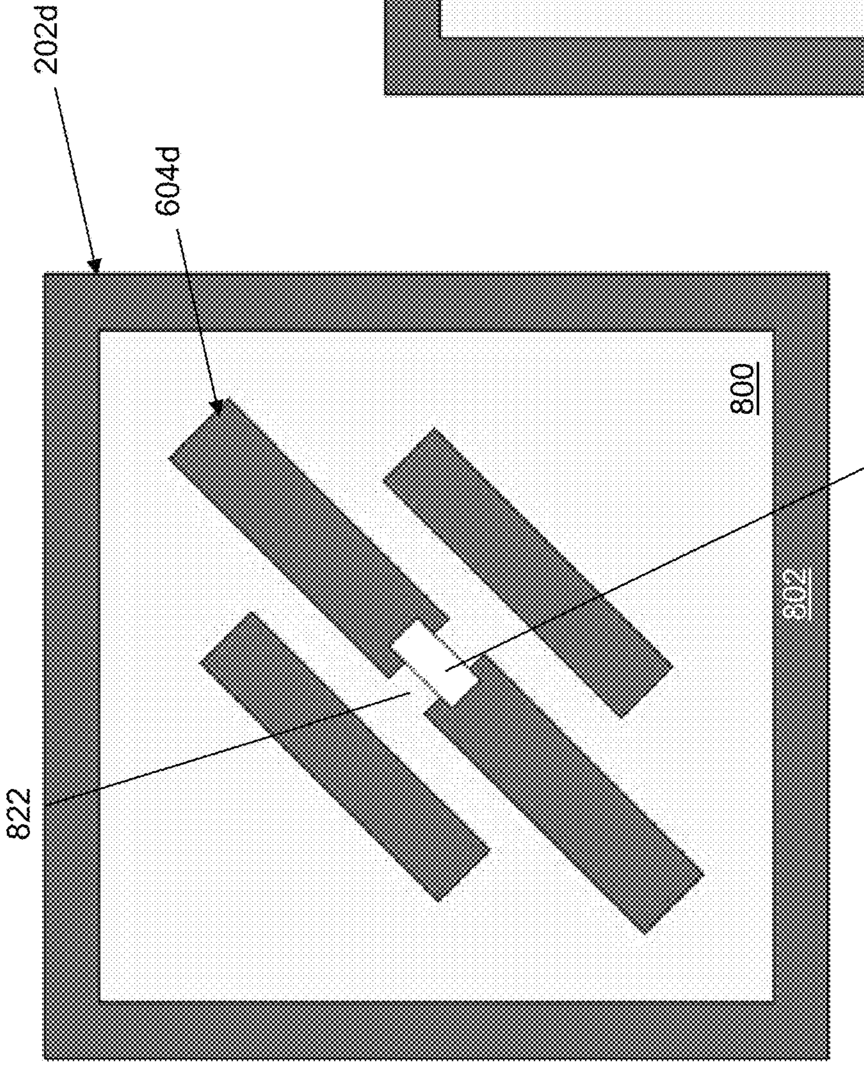
FIG. 12E depicts a back view of a fourth polarization rotating element in accordance with an illustrative embodiment.

Referring to FIG. 12E, a back view is shown of a fourth polarization rotating element 202*d* in accordance with an illustrative embodiment. Referring to FIG. 12F, a front view is shown of fourth polarization rotating element 202*d* in accordance with an illustrative embodiment. Fourth polarization rotating element 202*d* is shown as transparent and includes a fourth back dipole 604*d*, first switch 606, a fourth front dipole 608*d*, and second switch 610. Fourth back dipole 604*d* and fourth front dipole 608*d* are formed as three sections extending toward a distinct corner of dielectric layer 800. The three sections include two rectangular bars separated from a central rectangular conductor pointed toward a center of each corner. First switch 606 or second switch 610 is connected between the central rectangular conductor. The two rectangular bars on either side of the central rectangular conductor are joined for each dipole half to form a single conductor on either side of the pair of central rectangular conductors. Each dipole of fourth polarization rotating element 202*d* defines a conducting pattern layer mounted to either the back surface or the front surface of dielectric layer 800. Again, each half of each dipole of fourth polarization rotating antenna element 604*d* is rotated ±45° relative to the incoming electric field $E_{inc}$.

Figure 12H:
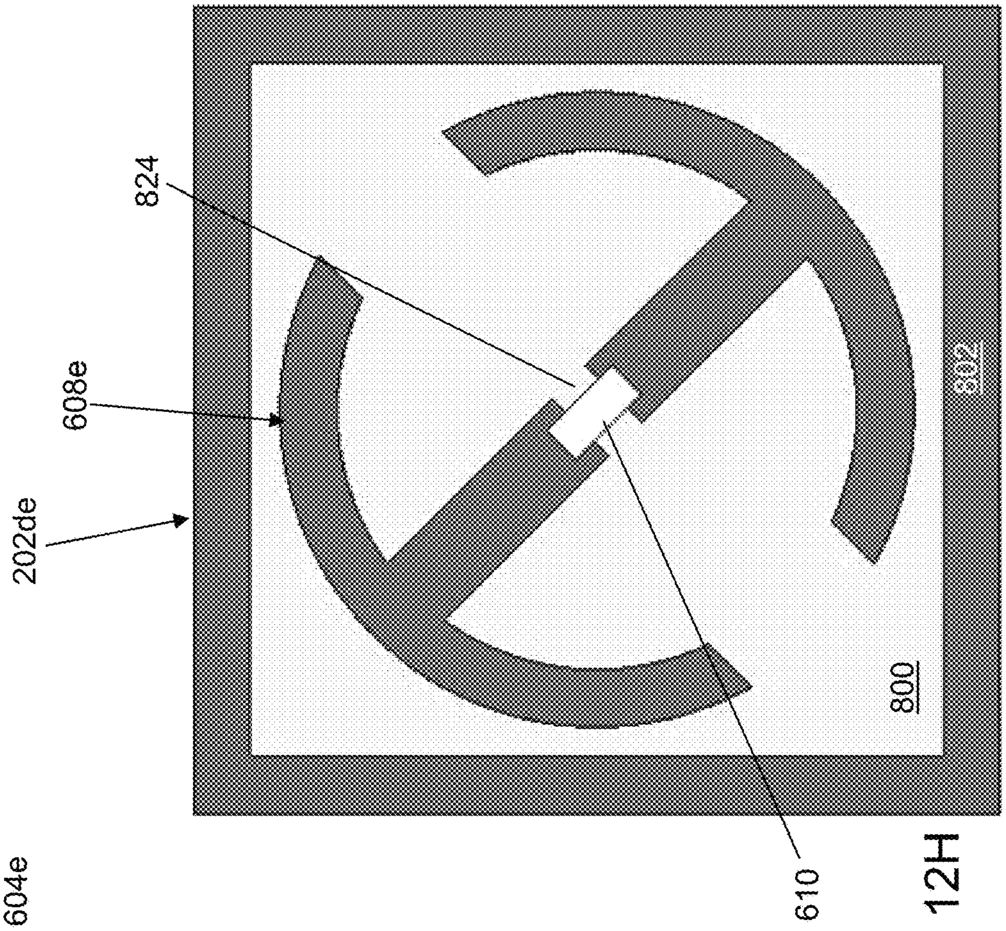
FIG. 12H depicts a front view of the fifth polarization rotating element of FIG. 12G in accordance with an illustrative embodiment.
Figure 12G:
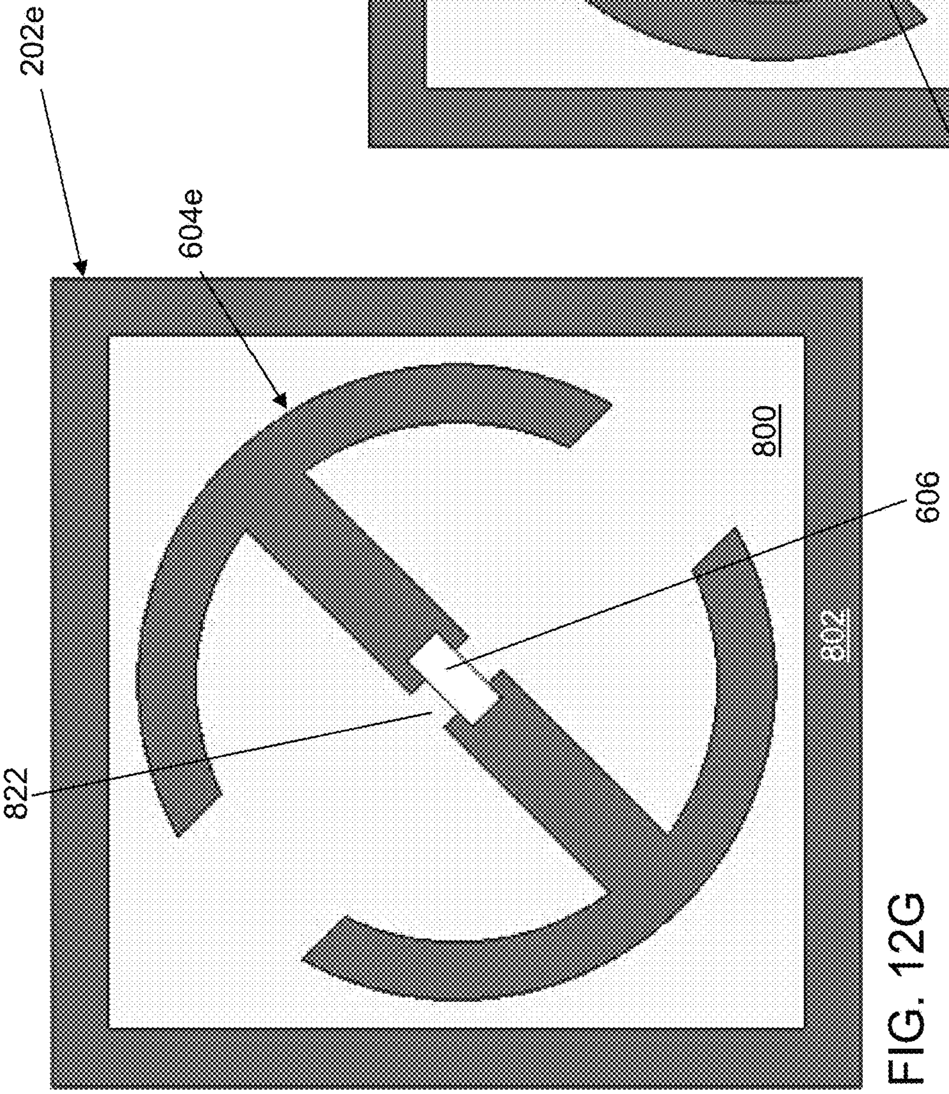
FIG. 12G depicts a back view of a fifth polarization rotating element in accordance with an illustrative embodiment.

Referring to FIG. 12G, a back view is shown of a fifth polarization rotating element 202*e* in accordance with an illustrative embodiment. Referring to FIG. 12H, a front view is shown of fifth polarization rotating element 202*e* in accordance with an illustrative embodiment. Fifth polarization rotating element 202*e* is shown as transparent and includes a fifth back dipole 604*e*, first switch 606, a fifth front dipole 608*e*, and second switch 610. Fifth back dipole 604*e* and fifth front dipole 608*e* are formed as split rings with a shaft of each split ring extending toward a distinct corner of dielectric layer 800. First switch 606 or second switch 610 is connected between the shafts of each split ring. Each dipole of fifth polarization rotating element 202*e* defines a conducting pattern layer mounted to either the back surface or the front surface of dielectric layer 800. Again, each half of each dipole of fifth polarization rotating element 202*e* is rotated ±45° relative to the incoming electric field $E_{inc}$.

Figure 12J:
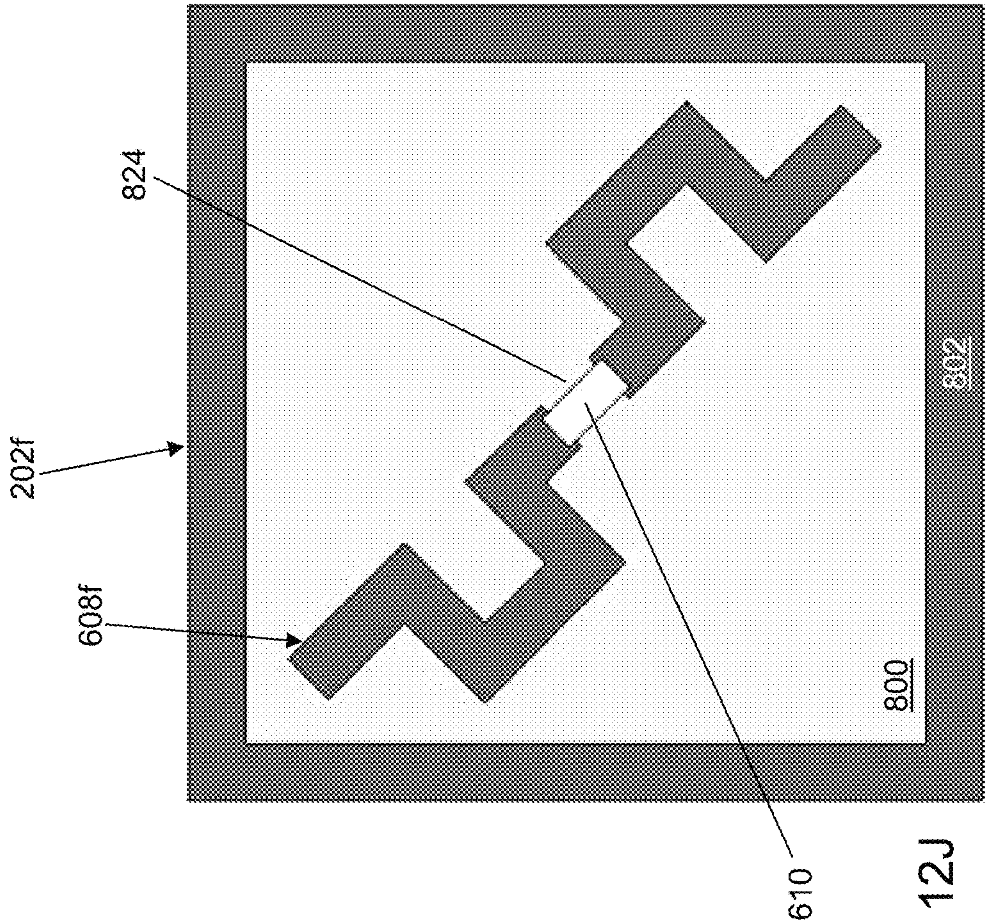
FIG. 12J depicts a front view of the sixth polarization rotating element of FIG. 12I in accordance with an illustrative embodiment.
Figure 12I:
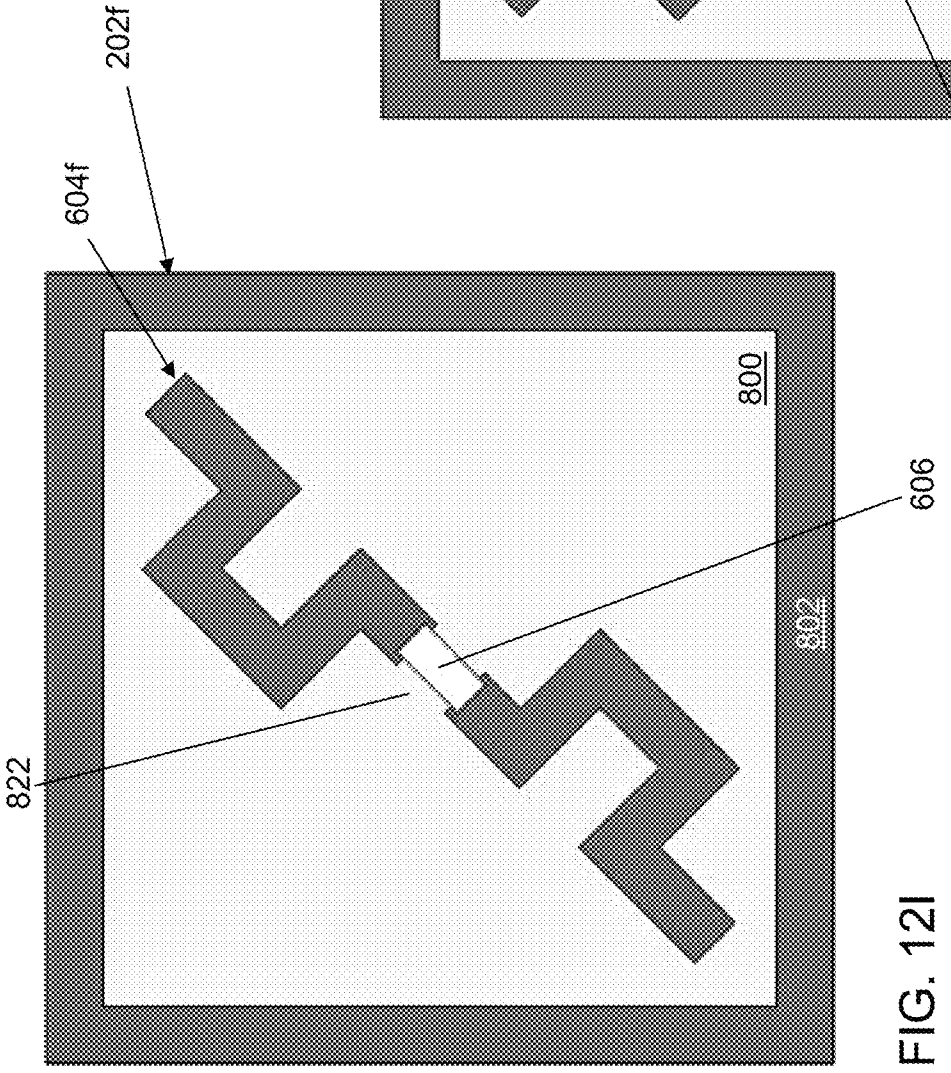
FIG. 12I depicts a back view of a sixth polarization rotating element in accordance with an illustrative embodiment.

Referring to FIG. 12I, a back view is shown of a sixth polarization rotating element 202*f* in accordance with an illustrative embodiment. Referring to FIG. 12J, a front view is shown of sixth polarization rotating element 202*f* in accordance with an illustrative embodiment. Sixth polarization rotating element 202*f* is shown as transparent and includes a sixth back dipole 604*f*, first switch 606, a sixth front dipole 608*f*, and second switch 610. Sixth back dipole 604*f* and sixth front dipole 608*f* are formed as meander line dipoles with a first end of each square wave extending toward a distinct corner of dielectric layer 800. First switch 606 or second switch 610 is connected between a second end of each square wave opposite the first end. Each dipole of sixth polarization rotating element 202*f* defines a conducting pattern layer mounted to either the back surface or the front surface of dielectric layer 800. Again, each half of each dipole of sixth polarization rotating element 202*f* is rotated ±45° relative to the incoming electric field $E_{inc}$.

Figure 12L:
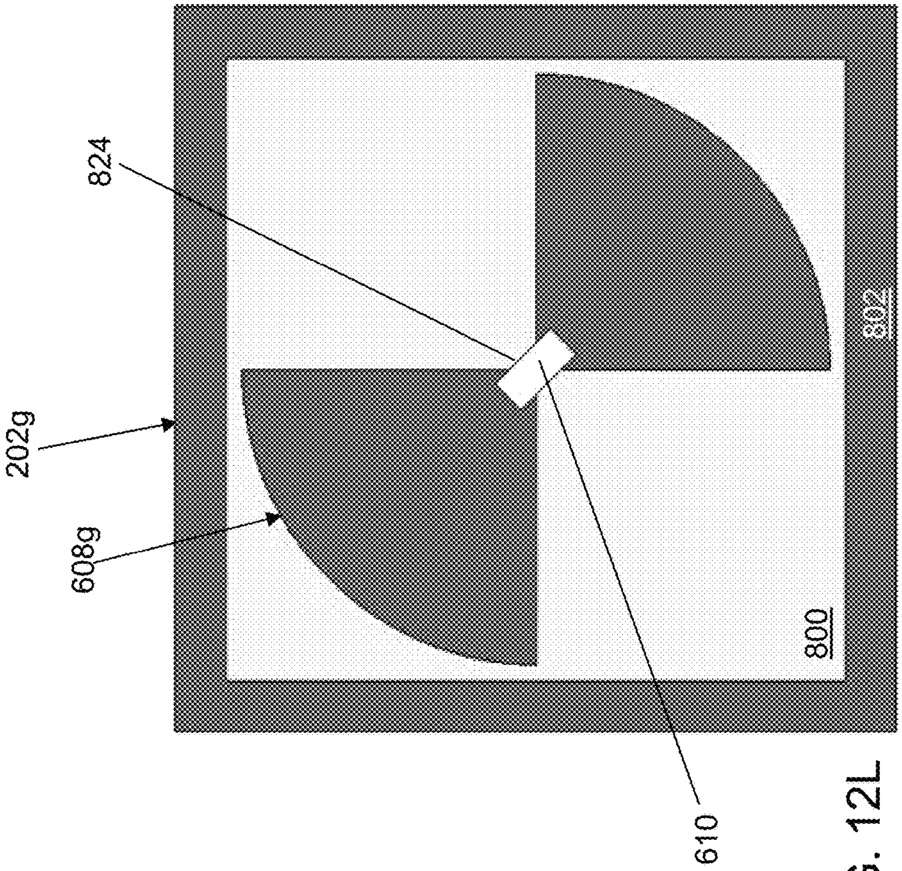
FIG. 12L depicts a front view of the seventh polarization rotating element of FIG. 12K in accordance with an illustrative embodiment.
Figure 12K:
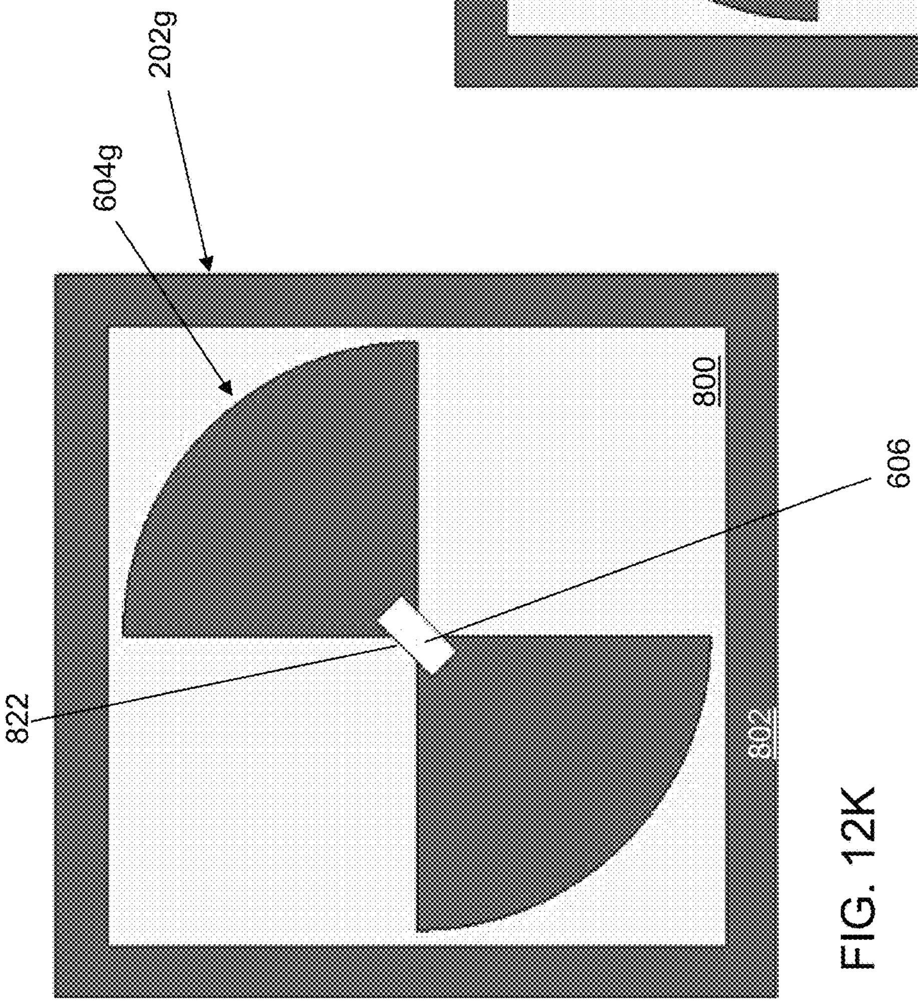
FIG. 12K depicts a back view of a seventh polarization rotating element in accordance with an illustrative embodiment.

Referring to FIG. 12K, a back view is shown of a seventh polarization rotating element 202*g* in accordance with an illustrative embodiment. Referring to FIG. 12L, a front view is shown of seventh polarization rotating element 202*g* in accordance with an illustrative embodiment. Seventh polarization rotating element 202*g* is shown as transparent and includes a seventh back dipole 604*g*, first switch 606, a seventh front dipole 608*g*, and second switch 610. Seventh back dipole 604*g* and seventh front dipole 608*g* are formed as fans with a pointed tip of each fan extending toward a center of dielectric layer 800 and the fan centered toward a distinct corner of dielectric layer 800. First switch 606 or second switch 610 is connected between the pointed tips. Each dipole of seventh polarization rotating element 202*g* defines a conducting pattern layer mounted to either the back surface or the front surface of dielectric layer 800. Again, each half of each dipole of seventh polarization rotating element 202*g* is rotated ±45° relative to the incoming electric field $E_{inc}$.

As understood by a person of skill in the art, dimensions of each polarization rotating antenna element 106 may be defined based on a desired center frequency of the incoming electromagnetic wave. Any of second polarization rotating element 202*b*, third polarization rotating element 202*c*, fourth polarization rotating element 202*d*, fifth polarization rotating element 202*e*, sixth polarization rotating element 202*f*, and seventh polarization rotating element 202*g* may replace first polarization rotating element 202*a* in the illustrative embodiments of polarization rotating antenna element 106 provided herein.

Figure 13:
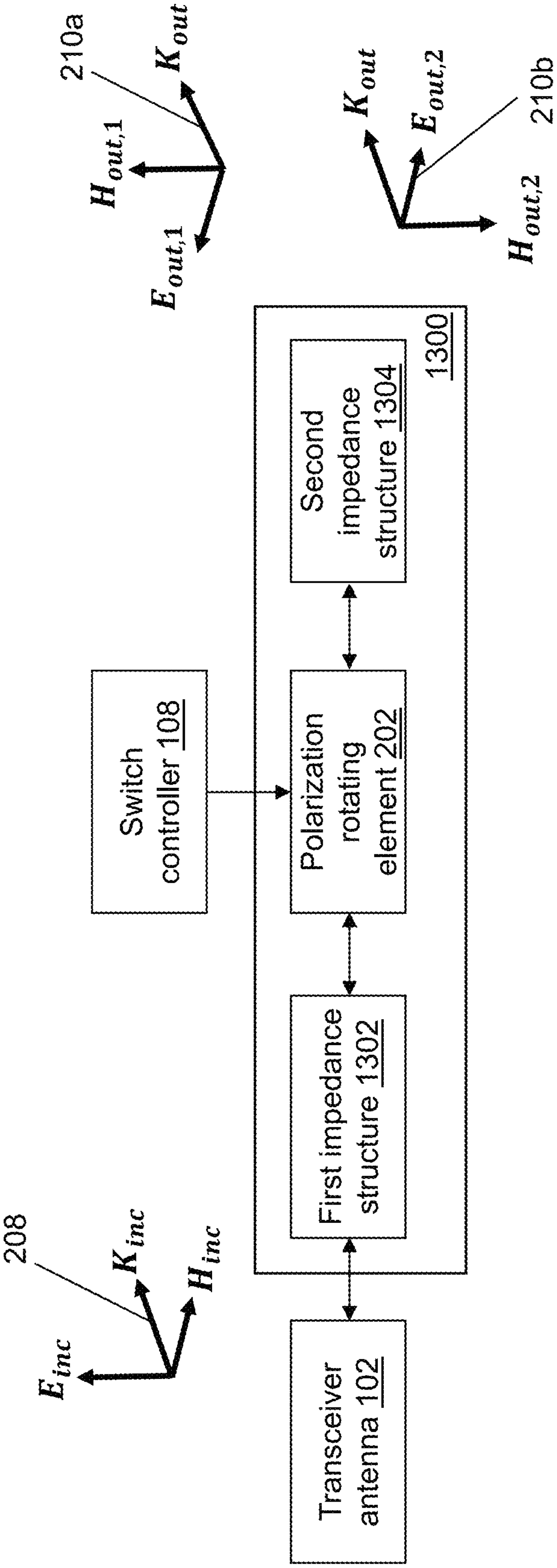
FIG. 13 depicts a block diagram of the transceiver system of FIG. 1 comprised of layer antennas in accordance with an illustrative embodiment.

Referring to FIG. 13, a block diagram of transceiver system 100 comprised of layer antennas is shown in accordance with an illustrative embodiment. A polarization rotating layer antenna element 1300 may include a first impedance structure 1302, polarization rotating element 202, and a second impedance structure 1304. Switch controller 108 is connected to control a switch state of polarization rotating element 202. When operating as a transmitter, transceiver antenna 102 may radiate electromagnetic wave 113 toward a conducting pattern layer of first impedance structure 1302. For illustration, electromagnetic wave 113 may be represented by first EM orthogonal system 208. The layers of polarization rotating layer antenna element 1300 propagate the received electromagnetic wave 113 to second impedance structure 1304. The conducting pattern layer of second impedance structure 1304 radiates first electromagnetic field output 112. Based on first EM orthogonal system 208 and a switch state of polarization rotating element 202, an orientation of first electromagnetic field output 112 radiated from the conducting pattern layer of second impedance structure 1304 is defined by either second EM orthogonal system 210*a* or third EM orthogonal system 210*b*. As a result, electromagnetic wave 113 is rotated by polarization rotating antenna element 106 by +90° or −90°.

When operating as a receiver, the first electromagnetic field input represented by first EM orthogonal system 208 is received by the conducting pattern layer of second impedance structure 1304 and propagated through polarization rotating layer antenna element 1300. The propagated first electromagnetic field input is radiated from the conducting pattern layer of first impedance structure 1302 toward transceiver antenna 102. The electromagnetic field radiated toward transceiver antenna 102 may be represented by either second EM orthogonal system 210*a* or third EM orthogonal system 210*b* depending on a switch state of polarization rotating element 202.

Figure 14A:
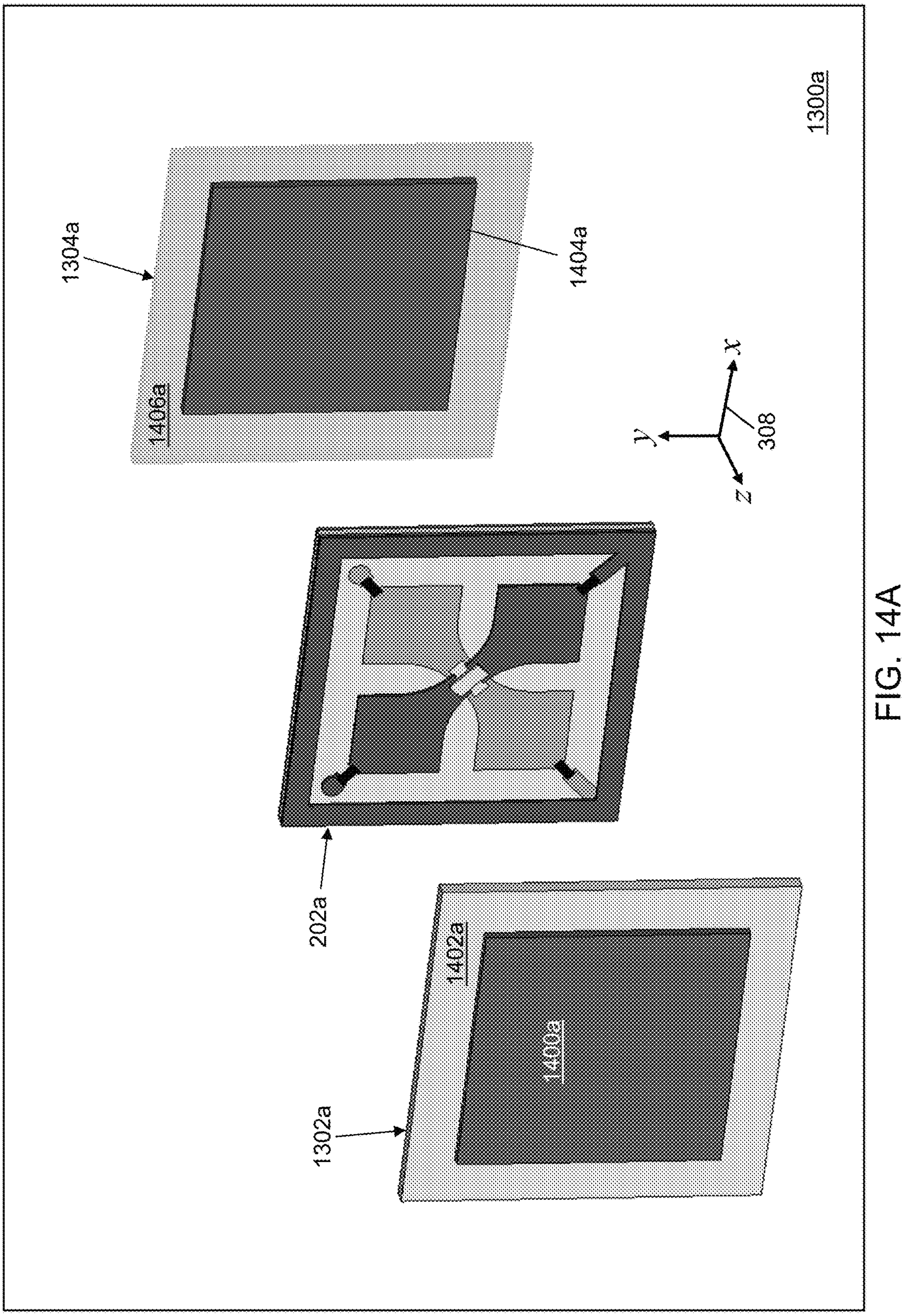
FIG. 14A depicts a perspective view of a first polarization rotating layer antenna element comprised of two patch conducting layers in accordance with an illustrative embodiment.

Referring to FIG. 14A, a perspective view is shown of a first polarization rotating layer antenna element 1300*a* in accordance with an illustrative embodiment. First polarization rotating layer antenna element 1300*a* includes a first patch impedance structure 1302*a*, first polarization rotating element 202*a*, and a second patch impedance structure 1304*a*. First patch impedance structure 1302*a* and second patch impedance structure 1304*a* are identical except that second patch impedance structure 1304*a* is rotated 90° in the x-y plane and 180° in the x-z plane relative to first patch impedance structure 1302*a*. First patch impedance structure 1302*a* may include a first conductive patch 1400*a* and a first dielectric slab 1402*a*. First conductive patch 1400*a* is a square patch of conductive material layered on, against, or adjacent to a center portion of first dielectric slab 1402*a*, which is formed of a dielectric material. Second patch impedance structure 1304*a* may include a second conductive patch 1404*a* and a second dielectric slab 1406*a*. Second conductive patch 1404*a* is a square patch of conductive material layered on, against, or adjacent on a center portion of second dielectric slab 1406*a*, which is formed of a dielectric material.

Figure 14B:
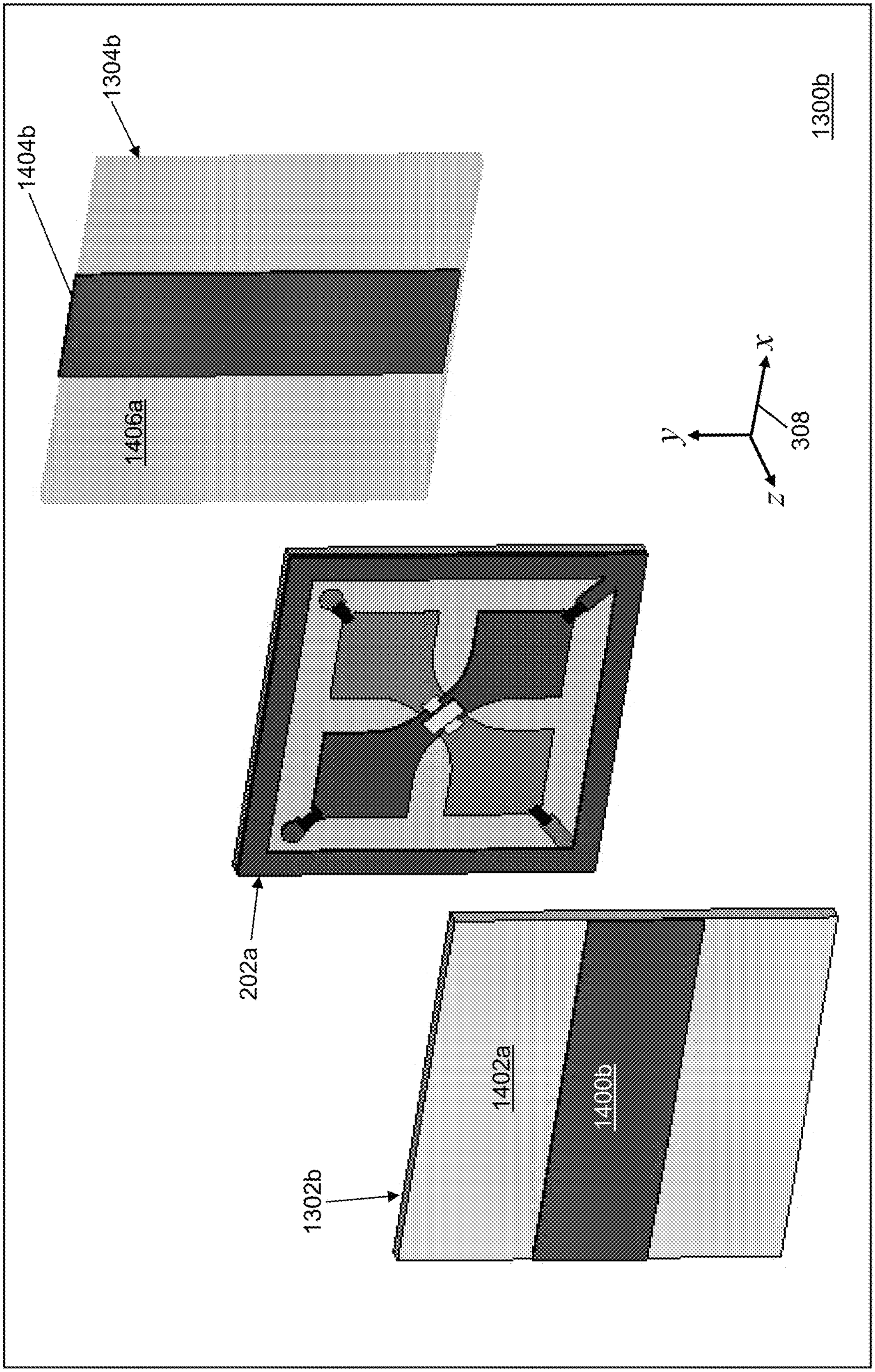
FIG. 14B depicts a perspective view of a second polarization rotating layer antenna element comprised of two strip conducting layers in accordance with an illustrative embodiment.

Referring to FIG. 14B, a perspective view is shown of a second polarization rotating layer antenna element 1300*b* in accordance with an illustrative embodiment. Second polarization rotating layer antenna element 1300*b* includes a first strip impedance structure 1302*b*, first polarization rotating element 202*a*, and a second strip impedance structure 1304*b*. First strip impedance structure 1302*b* and second strip impedance structure 1304*b* are identical except that second strip impedance structure 1304*b* is rotated 90° in the x-y plane and 180° in the x-z plane relative to first strip impedance structure 1302*b*. First strip impedance structure 1302*b* may include a first conductive strip 1400*b* and first dielectric slab 1402*a*. First conductive strip 1400*b* is a rectangular strip of conductive material layered on, against, or adjacent the center portion of first dielectric slab 1402*a*. Second strip impedance structure 1304*b* may include a second conductive strip 1404*b* and second dielectric slab 1406*a*. Second conductive strip 1404*b* is a rectangular strip of conductive material layered on, against, or adjacent the center portion of second dielectric slab 1406*a*.

Figure 14C:
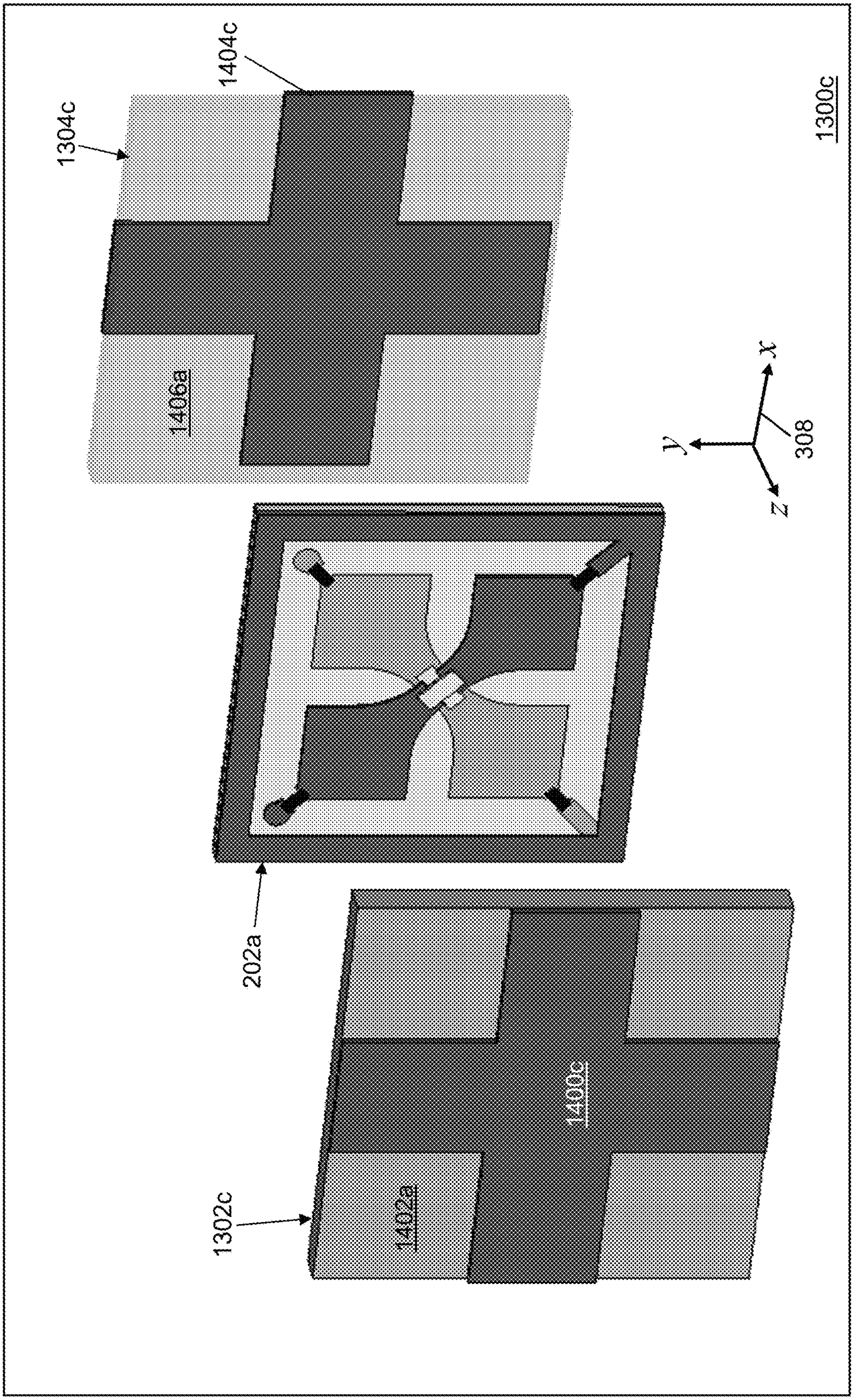
FIG. 14C depicts a perspective view of a third layered polarization rotating layer antenna element comprised of two cross conducting layers in accordance with an illustrative embodiment.

Referring to FIG. 14C, a perspective view is shown of a third polarization rotating layer antenna element 1300*c* in accordance with an illustrative embodiment. Third polarization rotating layer antenna element 1300*c* includes a first cross impedance structure 1302*c*, first polarization rotating element 202*a*, and a second cross impedance structure 1304*c*. First cross impedance structure 1302*c* and second cross impedance structure 1304*c* are identical except that second cross impedance structure 1304*c* is rotated 90° in the x-y plane and 180° in the x-z plane relative to first cross impedance structure 1302*c*. First cross impedance structure 1302*c* may include a first conductive cross 1400*c* and first dielectric slab 1402*a*. First conductive cross 1400*c* is a cross-shaped layer of conductive material layered on, against, or adjacent the center portion of first dielectric slab 1402*a*. Second cross impedance structure 1304*c* may include a second conductive cross 1404*c* and second dielectric slab 1406*a*. Second conductive cross 1404*c* is a cross-shaped layer of conductive material layered on, against, or adjacent the center portion of second dielectric slab 1406*a*.

Figure 14D:
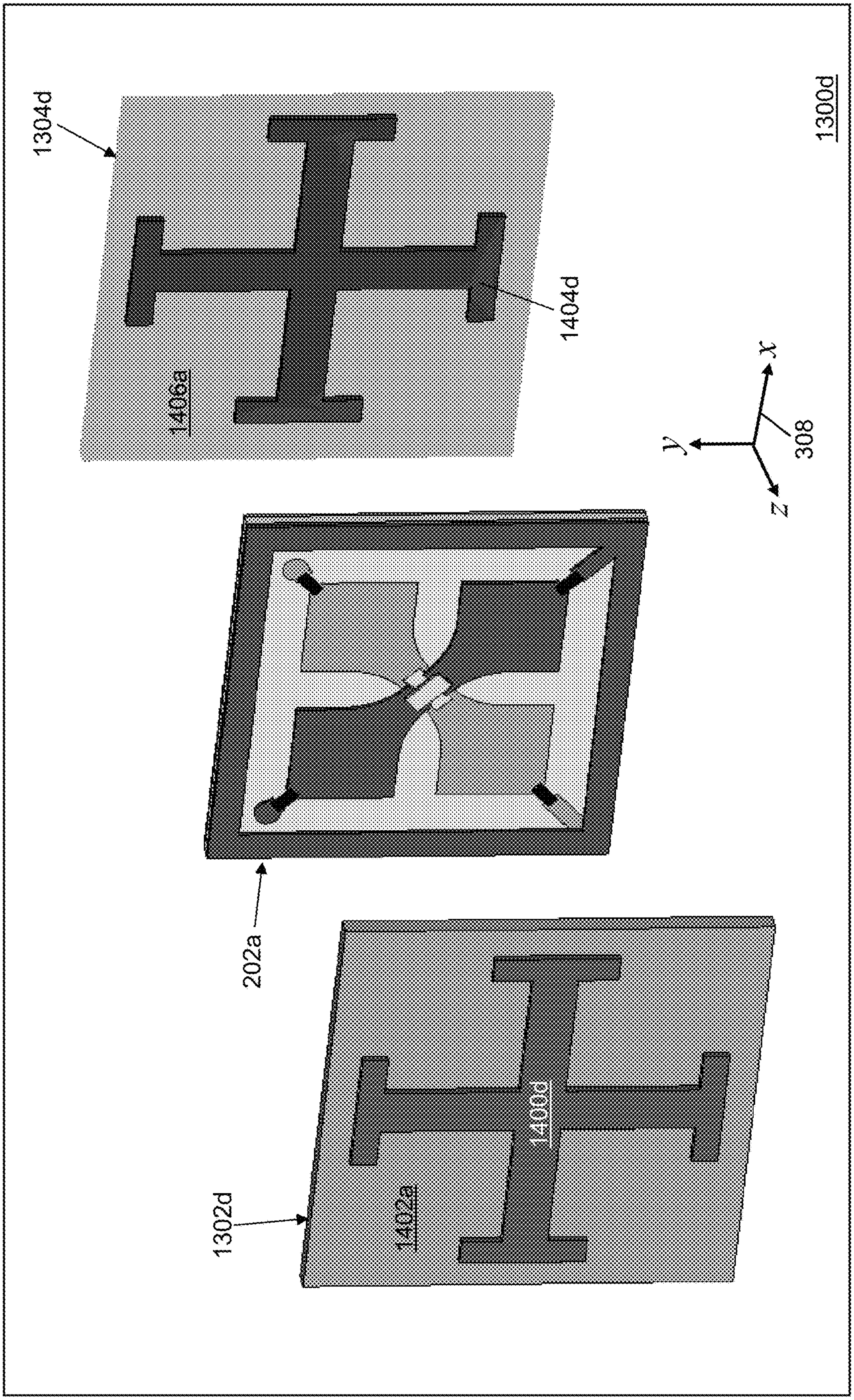
FIG. 14D depicts a perspective view of a fourth polarization rotating layer antenna element comprised of two Jerusalem cross conducting layers in accordance with an illustrative embodiment.

Referring to FIG. 14D, a perspective view is shown of a fourth polarization rotating layer antenna element 1300*d* in accordance with an illustrative embodiment. Fourth polarization rotating layer antenna element 1300*d* includes a first Jerusalem cross impedance structure 1302*d*, first polarization rotating element 202*a*, and a second Jerusalem cross impedance structure 1304*d*. First Jerusalem cross impedance structure 1302*d* and second Jerusalem cross impedance structure 1304*d* are identical except that second Jerusalem cross impedance structure 1304*d* is rotated 90° in the x-y plane and 180° in the x-z plane relative to first Jerusalem cross impedance structure 1302*d*. First Jerusalem cross impedance structure 1302*d* may include a first conductive Jerusalem cross 1400*d* and first dielectric slab 1402*a*. First conductive Jerusalem cross 1400*d* is a Jerusalem cross-shaped layer of conductive material layered on, against, or adjacent the center portion of first dielectric slab 1402*a*. Second cross impedance structure 1304*d* may include a second conductive Jerusalem cross 1404*d* and second dielectric slab 1406*a*. Second conductive Jerusalem cross 1404*d* is a cross-shaped layer of conductive material layered on, against, or adjacent the center portion of second dielectric slab 1406*a*.

Figure 14E:
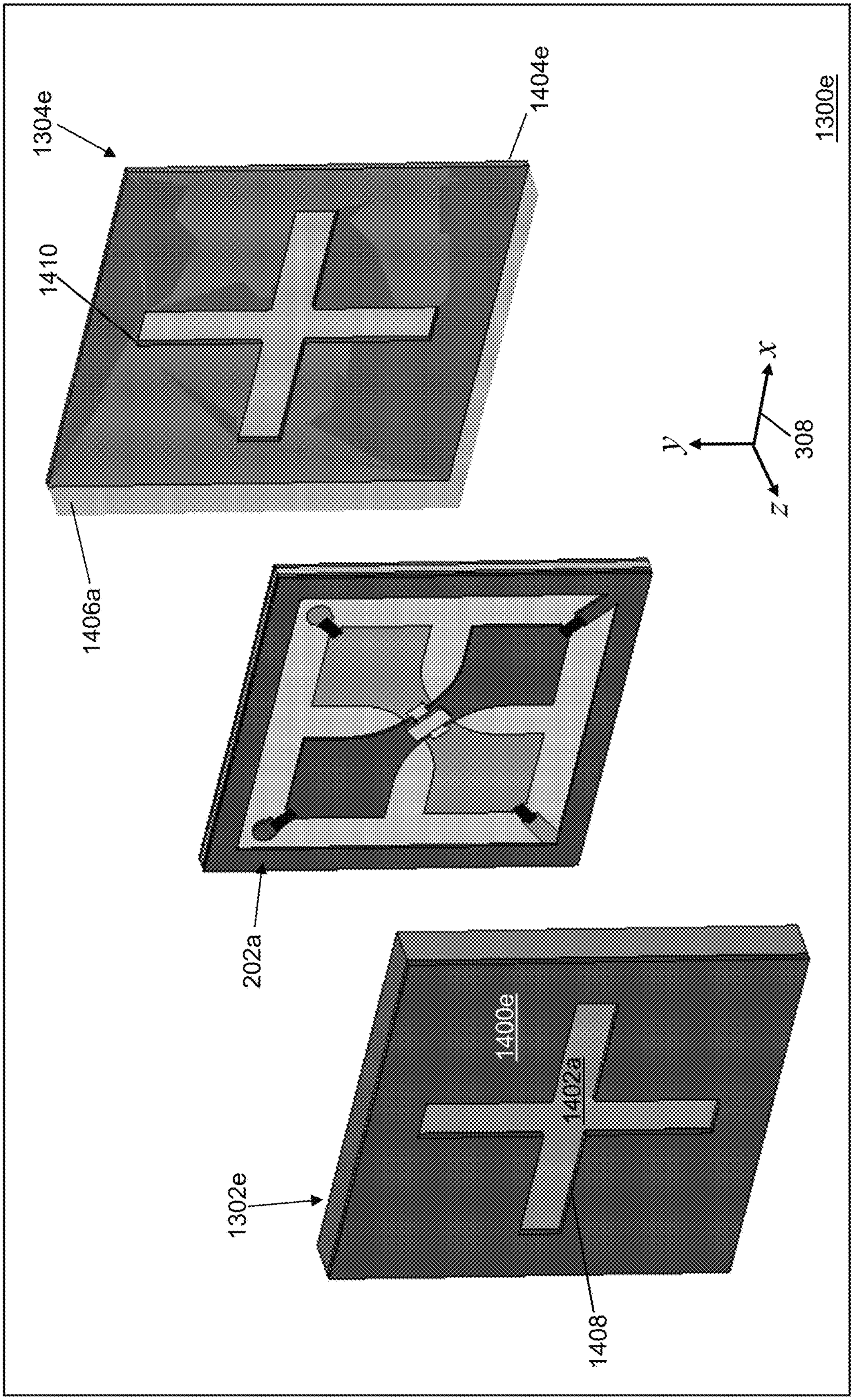
FIG. 14E depicts a perspective view of a fifth polarization rotating layer antenna element comprised of two cross slot conducting layers in accordance with an illustrative embodiment.

Referring to FIG. 14E, a perspective view is shown of a fifth polarization rotating layer antenna element 1300*e* in accordance with an illustrative embodiment. Fifth polarization rotating layer antenna element 1300*e* includes a first cross slot impedance structure 1302*e*, first polarization rotating element 202*a*, and a second cross slot impedance structure 1304*e*. First cross slot impedance structure 1302*e* and second cross slot impedance structure 1304*e* are identical except that second cross slot impedance structure 1304*e* is rotated 90° in the x-y plane and 180° in the x-z plane relative to first cross slot impedance structure 1302*e*. First cross slot impedance structure 1302*e* may include a first conductive cross slot slab 1400*e* and first dielectric slab 1402*a*. First conductive cross slot slab 1400*e* is a slab of conductive material with a first cross-shaped slot wall 1408 formed through a center portion of first conductive cross slot slab 1400*e*. First conductive cross slot slab 1400*e* is layered on, against, or adjacent first dielectric slab 1402*a*. Second conductive cross slot slab 1404*e* is a slab of conductive material with a second cross-shaped slot wall 1410 formed through a center portion of second conductive cross slot slab 1404*e*. Second conductive cross slot slab 1404*e* is layered on, against, or adjacent second dielectric slab 1406*a*.

Figure 15A:
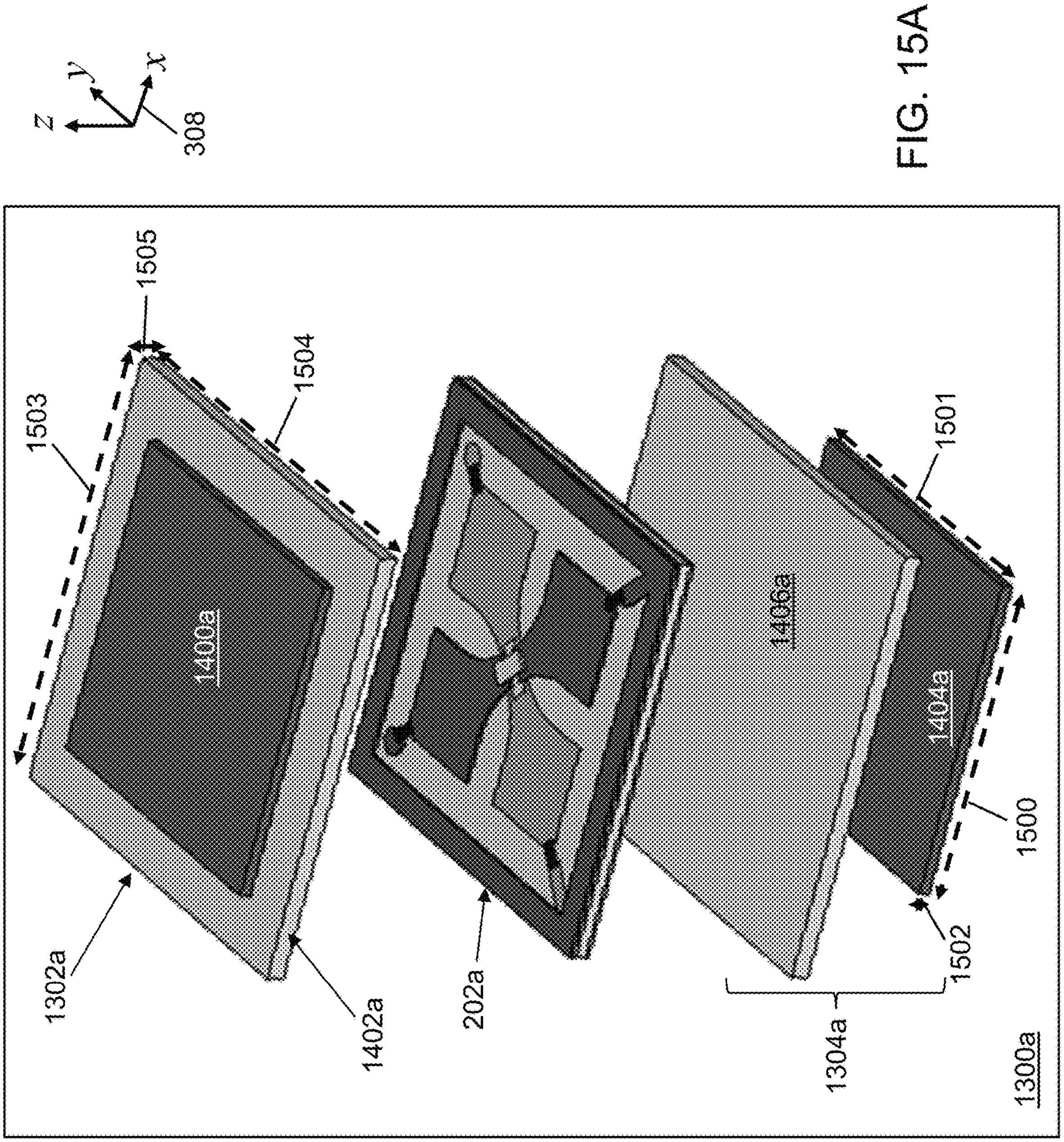
FIG. 15A depicts an exploded perspective view of the first polarization rotating layer antenna element of FIG. 14A in accordance with an illustrative embodiment.

Referring to FIG. 15A, an exploded perspective view of first polarization rotating layer antenna element 1300*a* is shown in accordance with an illustrative embodiment. In the illustrative embodiment of FIG. 15A, second conductive patch 1404*a* has a patch length 1500 in the direction parallel to the x-axis of orthogonal coordinate reference frame 308, a patch width 1501 in the direction parallel to the y-axis of first EM orthogonal system 208, and a patch depth 1502 in the direction parallel to the z-axis. In the illustrative embodiment of FIG. 15A, first dielectric slab 1402*a* has a slab length 1503 in the direction parallel to the x-axis of orthogonal coordinate reference frame 308, a slab width 1504 in the direction parallel to the y-axis of first EM orthogonal system 208, and a slab depth 1505 in the direction parallel to the z-axis.

Figure 15B:
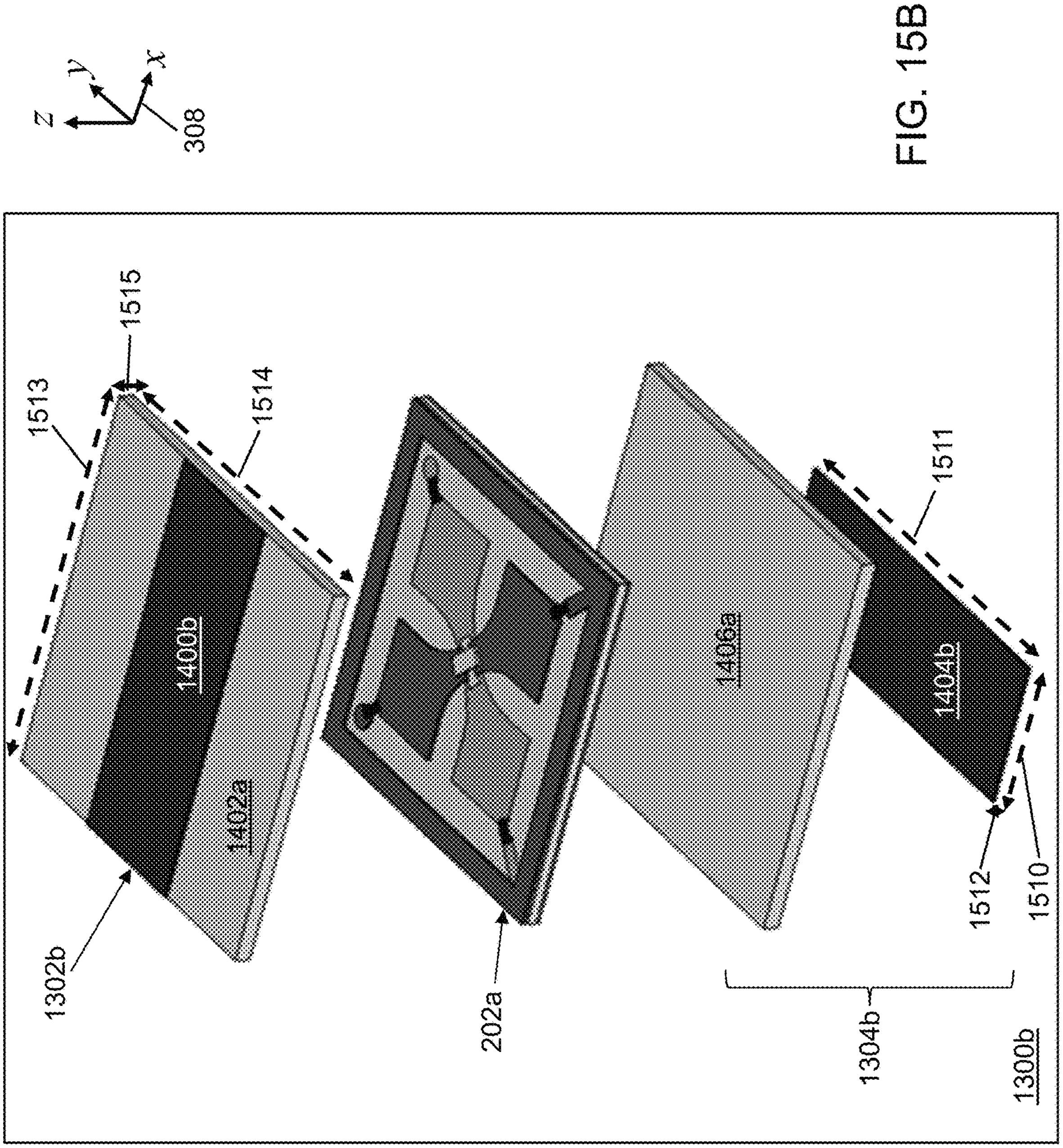
FIG. 15B depicts an exploded perspective view of the second polarization rotating layer antenna element of FIG. 14B in accordance with an illustrative embodiment.

Referring to FIG. 15B, an exploded perspective view of second polarization rotating layer antenna element 1300*b* is shown in accordance with an illustrative embodiment. In the illustrative embodiment of FIG. 15B, second conductive strip 1404*b* has a strip length 1510 in the direction parallel to the x-axis of orthogonal coordinate reference frame 308, a strip width 1511 in the direction parallel to the y-axis of first EM orthogonal system 208, and a strip depth 1512 in the direction parallel to the z-axis. In the illustrative embodiment of FIG. 15B, first dielectric slab 1402*a* has a slab length 1513 in the direction parallel to the x-axis of orthogonal coordinate reference frame 308, a slab width 1514 in the direction parallel to the y-axis of first EM orthogonal system 208, and a slab depth 1515 in the direction parallel to the z-axis.

Figure 15C:
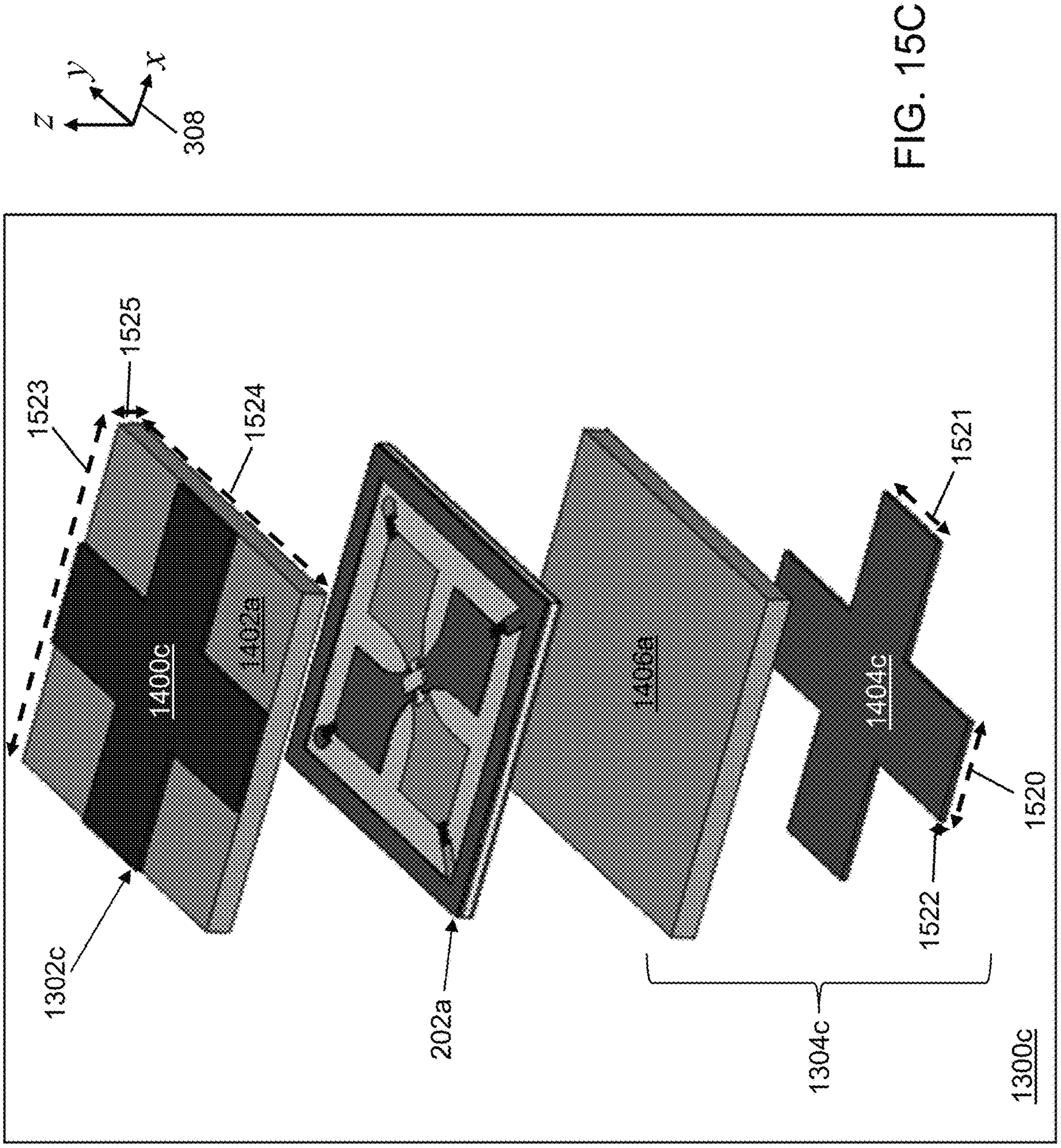
FIG. 15C depicts an exploded perspective view of the third polarization rotating layer antenna element of FIG. 14C in accordance with an illustrative embodiment.

Referring to FIG. 15C, an exploded perspective view of third polarization rotating layer antenna element 1300*c* is shown in accordance with an illustrative embodiment. In the illustrative embodiment of FIG. 15C, second conductive cross 1404*c* has a cross arm length 1520 in the direction parallel to the x-axis of orthogonal coordinate reference frame 308, a cross arm width 1521 in the direction parallel to the y-axis of first EM orthogonal system 208, and a cross depth 1522 in the direction parallel to the z-axis. In the illustrative embodiment of FIG. 15C, first dielectric slab 1402*a* has a slab length 1523 in the direction parallel to the x-axis of orthogonal coordinate reference frame 308, a slab width 1524 in the direction parallel to the y-axis of first EM orthogonal system 208, and a slab depth 1525 in the direction parallel to the z-axis.

Figure 15D:
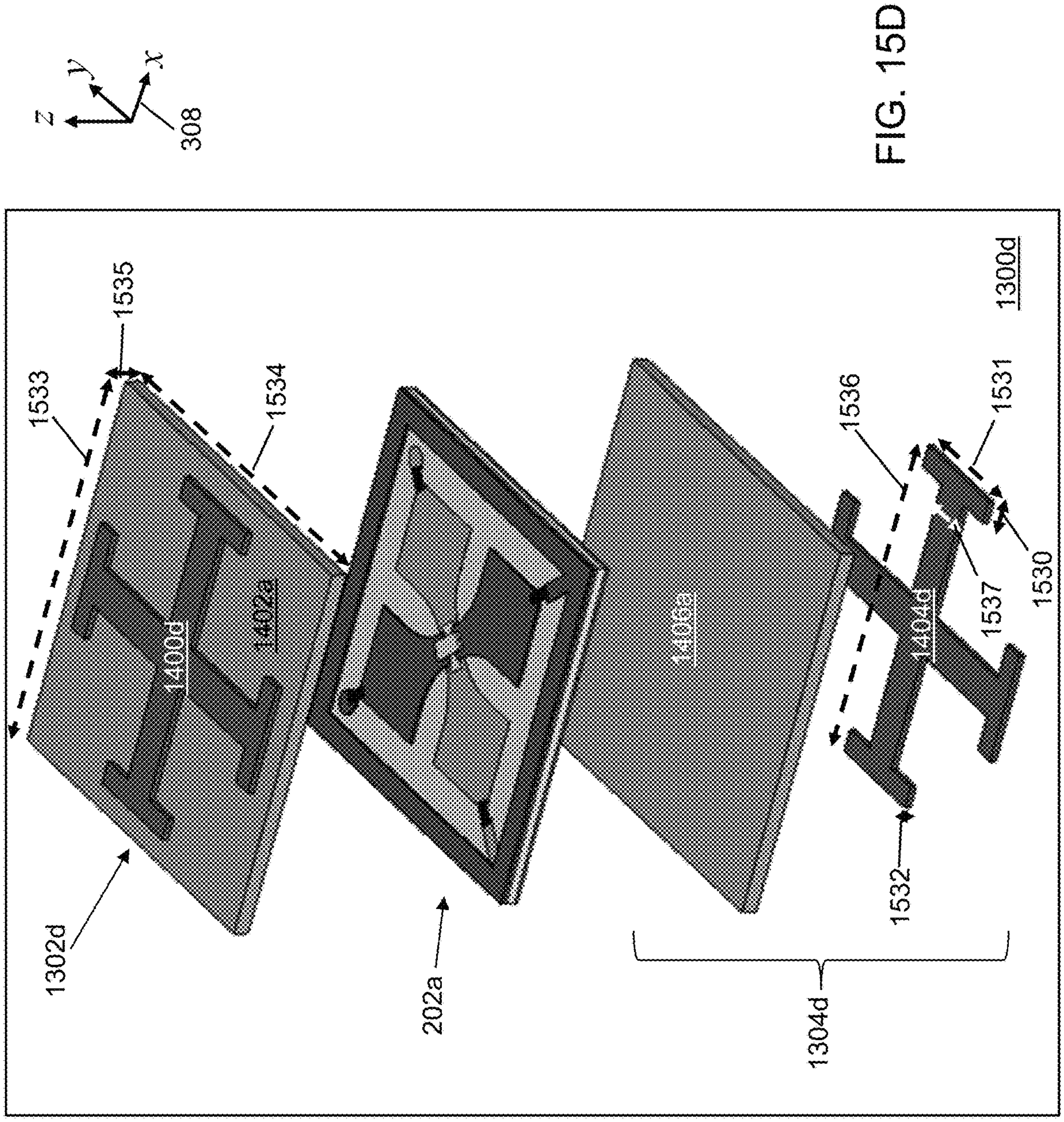
FIG. 15D depicts an exploded perspective view of the fourth polarization rotating layer antenna element of FIG. 14D in accordance with an illustrative embodiment.

Referring to FIG. 15D, an exploded perspective view of fourth polarization rotating layer antenna element 1300*d* is shown in accordance with an illustrative embodiment. In the illustrative embodiment of FIG. 15D, second conductive Jerusalem cross 1404*d* has a cross arm tip length 1530 in the direction parallel to the x-axis of orthogonal coordinate reference frame 308, a cross arm length 1536 in the direction parallel to the x-axis of orthogonal coordinate reference frame 308, a cross arm tip width 1531 in the direction parallel to the y-axis of first EM orthogonal system 208, a cross arm width 1537 in the direction parallel to the y-axis of first EM orthogonal system 208, and a cross depth 1532 in the direction parallel to the z-axis. In the illustrative embodiment of FIG. 15D, two arms are perpendicular to each other with identical dimensions. In the illustrative embodiment of FIG. 15D, first dielectric slab 1402*a* has a slab length 1533 in the direction parallel to the x-axis of orthogonal coordinate reference frame 308, a slab width 1534 in the direction parallel to the y-axis of first EM orthogonal system 208, and a slab depth 1535 in the direction parallel to the z-axis.

Figure 15E:
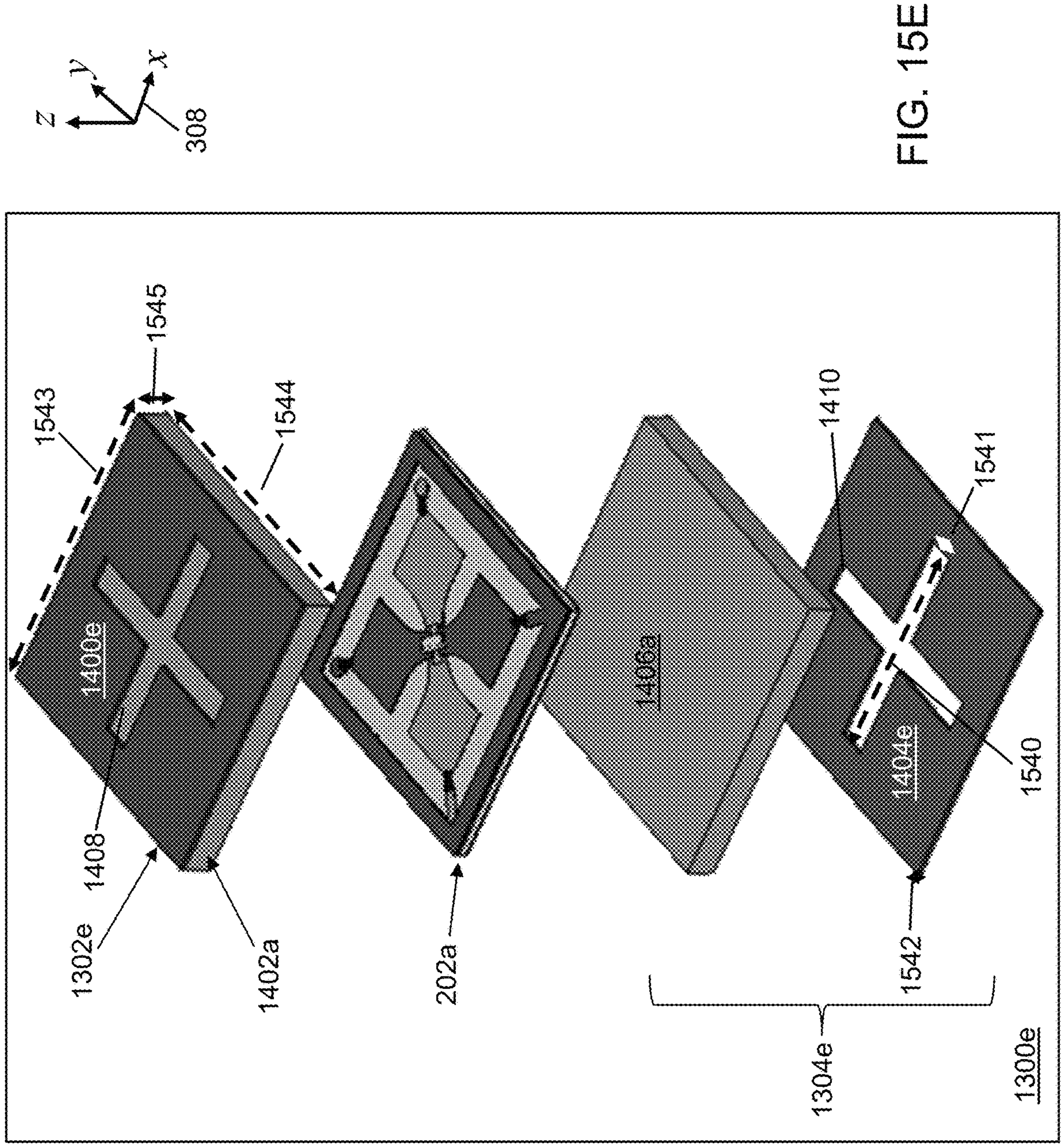
FIG. 15E depicts an exploded perspective view of the fifth polarization rotating layer antenna element of FIG. 14E in accordance with an illustrative embodiment.

Referring to FIG. 15E, an exploded perspective view of fifth polarization rotating layer antenna element 1300*e* is shown in accordance with an illustrative embodiment. In the illustrative embodiment of FIG. 15E, second conductive cross slot slab 1404*e* has a cross slot length 1540 in the direction parallel to the x-axis of orthogonal coordinate reference frame 308, a cross slot width 1541 in the direction parallel to the y-axis of first EM orthogonal system 208, and a cross depth 1542 in the direction parallel to the z-axis. In the illustrative embodiment of FIG. 15E, first dielectric slab 1402*a* has a slab length 1543 in the direction parallel to the x-axis of orthogonal coordinate reference frame 308, a slab width 1544 in the direction parallel to the y-axis of first EM orthogonal system 208, and a slab depth 1545 in the direction parallel to the z-axis. In the illustrative embodiment of FIG. 15E, a length of second conductive cross slot slab 1404*e* in the direction parallel to the x-axis of orthogonal coordinate reference frame 308 is equal to slab length 1543, and a width of second conductive cross slot slab 1404*e* in the direction parallel to the y-axis of orthogonal coordinate reference frame 308 is equal to slab width 1544.

In FIGS. 14A through 14E, second dielectric slab 1406*a* is transparent. In FIGS. 15A through 15E, first dielectric slab 1402*a* and second dielectric slab 1406*a* may have different dimensions in the x-y plane and the y-z plane depending on the embodiment.

Figure 16A:
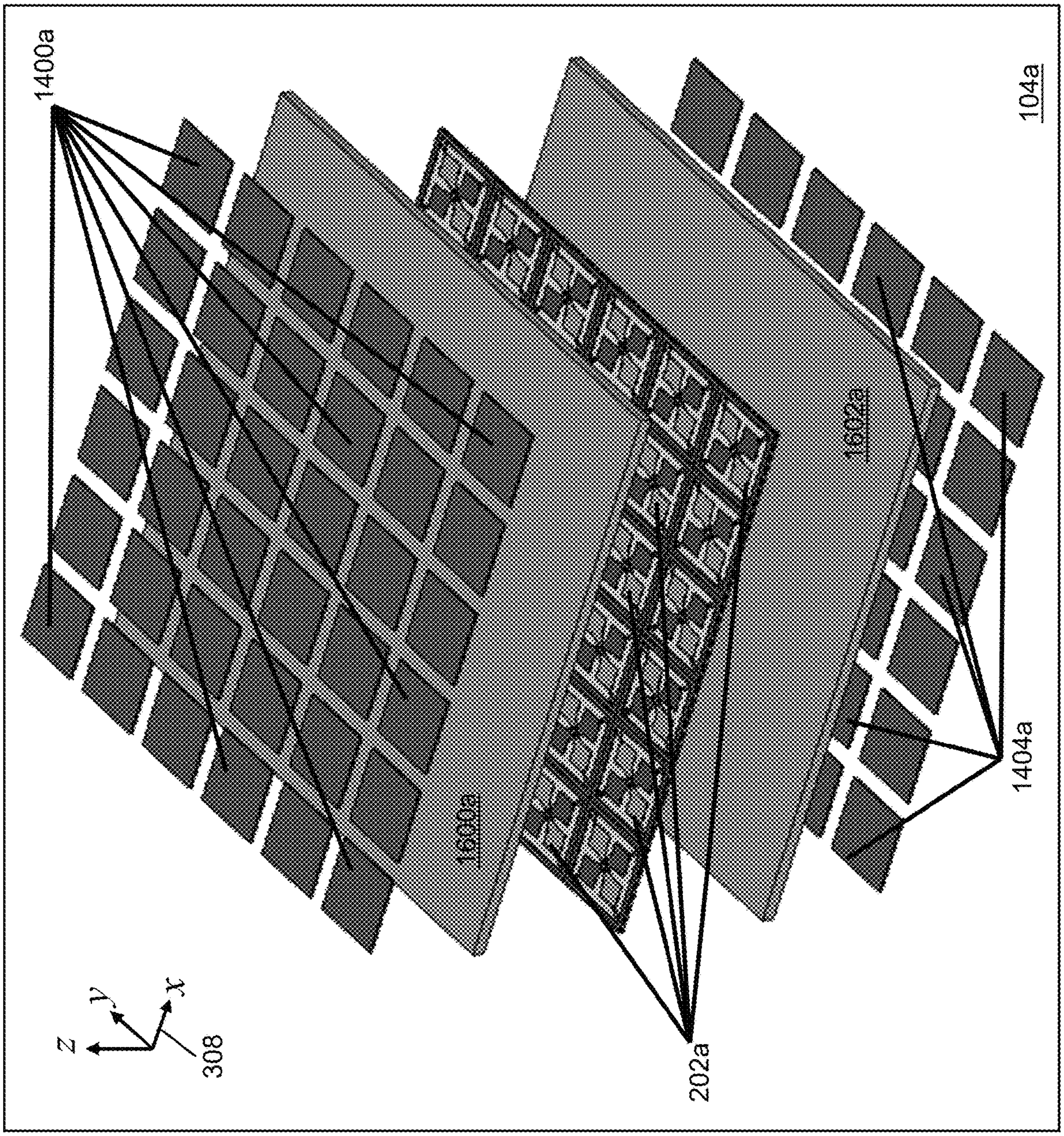
FIG. 16A depicts an exploded perspective view of a first phased array antenna comprised of first polarization rotating layer antenna elements in accordance with an illustrative embodiment.

Referring to FIG. 16A, an exploded perspective view of a first phased array antenna 104*a* is shown in accordance with an illustrative embodiment. In the illustrative embodiment, first phased array antenna 104*a* is a two-dimensional array of first polarization rotating layer antenna elements. The two-dimensional array of first polarization rotating layer antenna elements includes 36 first polarization rotating layer antenna elements arranged in a 6×6 pattern. Instead of forming individual antenna elements, a plurality of first conductive patches 1400*a* may be layered on, against, or adjacent a third dielectric slab 1600*a*, and a plurality of second conductive patches 1404*a* may be layered on, against, or adjacent a fourth dielectric slab 1602*a*. Third dielectric slab 1600*a* and fourth dielectric slab 1602*a* are formed of a dielectric material. 36 first polarization rotating elements 202*a* are further arranged in a 6×6 pattern to align, in the direction parallel to the z-axis of orthogonal coordinate reference frame 308, with the plurality of first conductive patches 1400*a* and the plurality of second conductive patches 1404*a*.

Figure 16B:
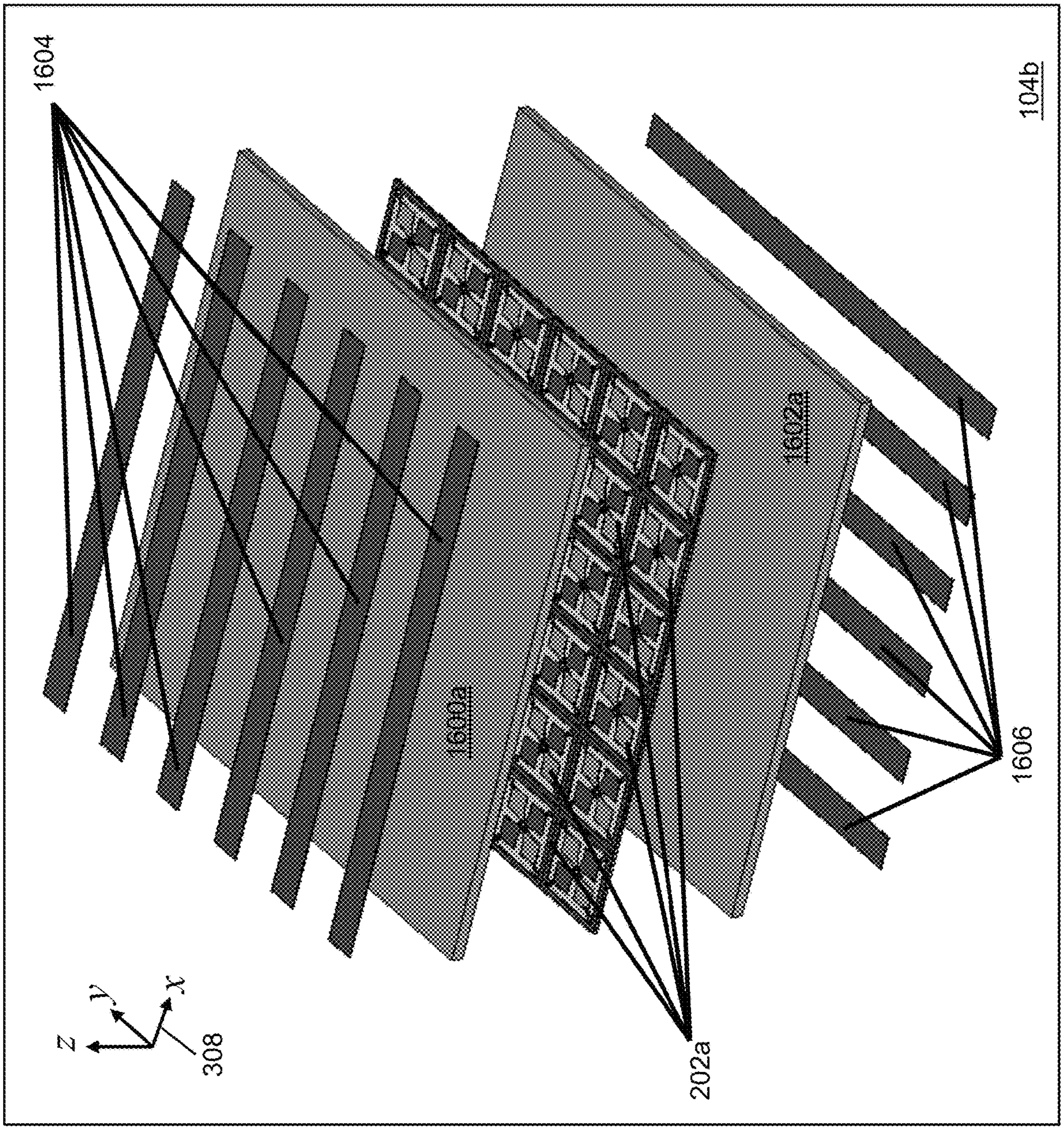
FIG. 16B depicts an exploded perspective view of a second phased array antenna comprised of second polarization rotating layer antenna elements in accordance with an illustrative embodiment.

Referring to FIG. 16B, an exploded perspective view of a second phased array antenna 104*b* is shown in accordance with an illustrative embodiment. Second phased array antenna 104*b* may include a two-dimensional array of second polarization rotating layer antenna elements. In the illustrative embodiment, the two-dimensional array of second polarization rotating layer antenna elements includes 36 second polarization rotating layer antenna elements arranged in a 6×6 pattern. Instead of forming individual antenna elements, a plurality of first conductive strips 1604 may be layered on, against, or adjacent third dielectric slab 1600*a*, and a plurality of second conductive strips 1606 may be layered on, against, or adjacent fourth dielectric slab 1602*a*. 36 first polarization rotating elements 202*a* are further arranged in a 6×6 pattern to align, in the direction parallel to the z-axis of orthogonal coordinate reference frame 308, with the plurality of first conductive strips 1604 and the plurality of second conductive strips 1606.

Figure 16C:
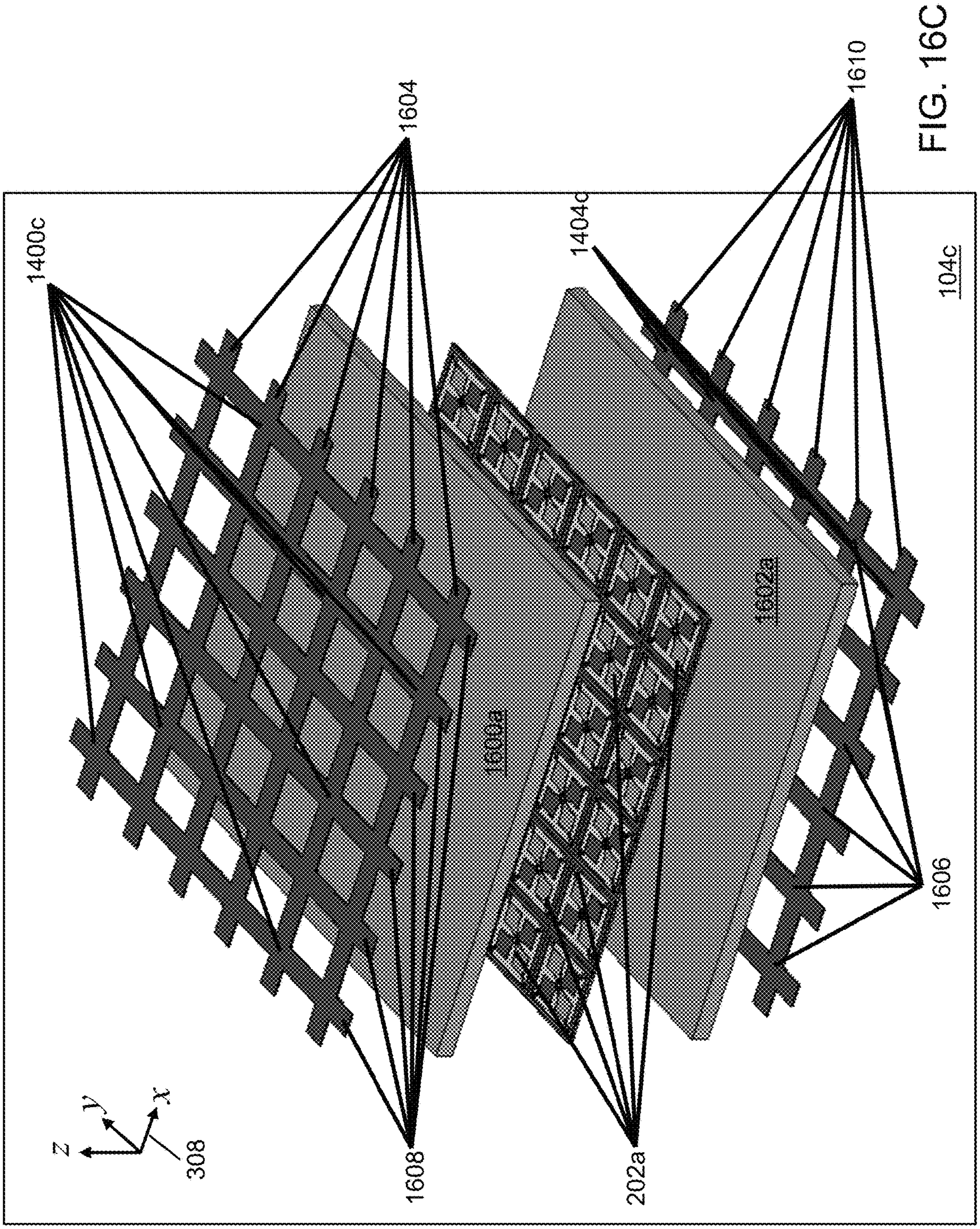
FIG. 16C depicts an exploded perspective view of a third phased array antenna comprised of third polarization rotating layer antenna elements in accordance with an illustrative embodiment.

Referring to FIG. 16C, an exploded perspective view of a third phased array antenna 104*c* is shown in accordance with an illustrative embodiment. Third phased array antenna 104*c* may include a two-dimensional array of third polarization rotating layer antenna elements. In the illustrative embodiment, the two-dimensional array of third polarization rotating layer antenna elements includes 36 third polarization rotating layer antenna elements arranged in a 6×6 pattern. Instead of forming individual antenna elements, the plurality of first conductive strips 1604 and a plurality of third conductive strips 1608 may be layered on, against, or adjacent third dielectric slab 1600*a*. The plurality of second conductive strips 1606 and a plurality of fourth conductive strips 1610 may be layered on, against, or adjacent fourth dielectric slab 1602*a*. 36 first polarization rotating elements 202*a* are further arranged in a 6×6 pattern to align, in the direction parallel to the z-axis of orthogonal coordinate reference frame 308, with the plurality of first conductive strips 1604, the plurality of second conductive strips 1606, the plurality of third conductive strips 1608, and the plurality of fourth conductive strips 1610.

Figure 16D:
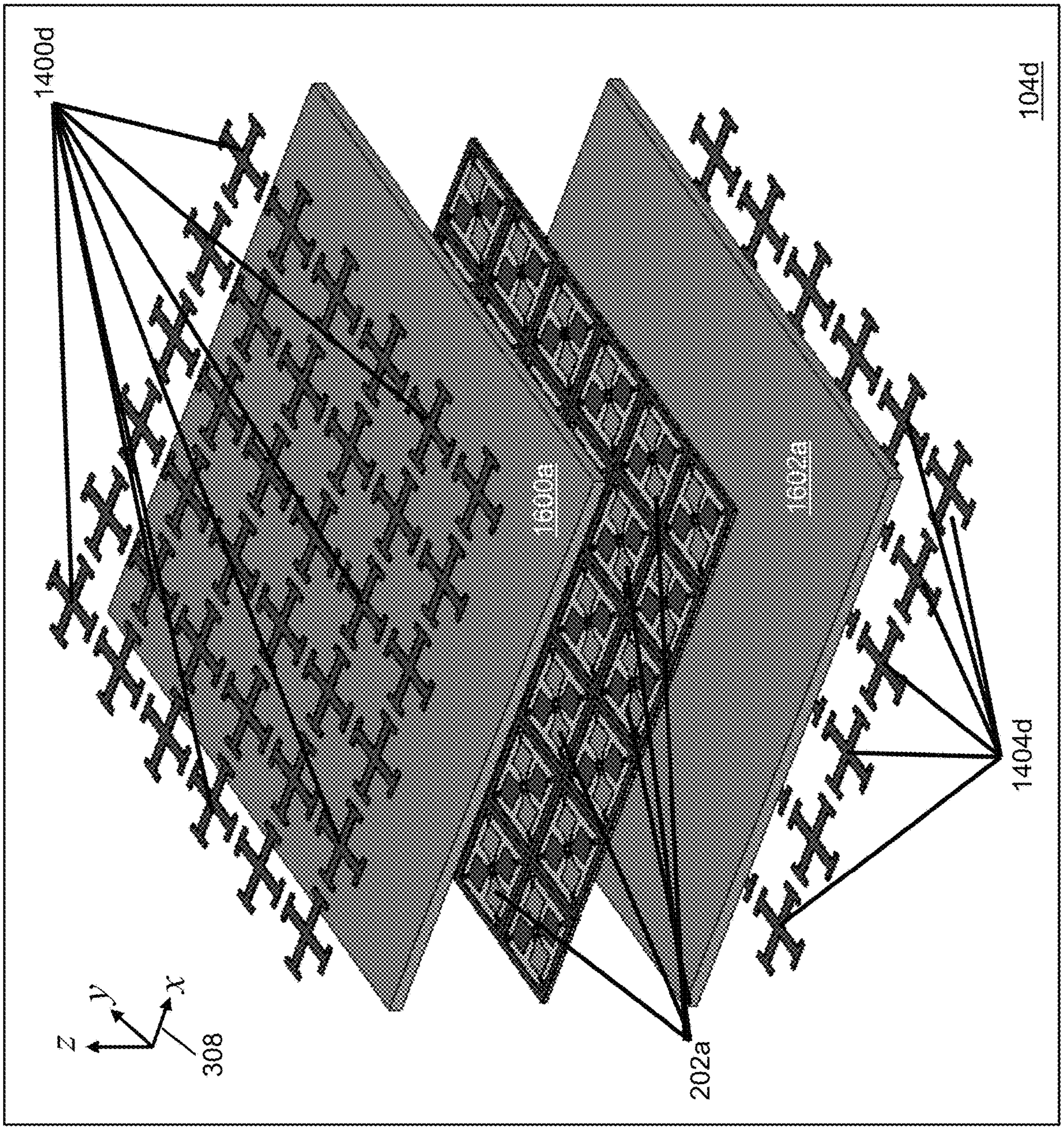
FIG. 16D depicts an exploded perspective view of a fourth phased array antenna comprised of fourth polarization rotating layer antenna elements in accordance with an illustrative embodiment.

Referring to FIG. 16D, an exploded perspective view of a fourth phased array antenna 104*d* is shown in accordance with an illustrative embodiment. Fourth phased array antenna 104*d* may include a two-dimensional array of fourth polarization rotating layer antenna elements. In the illustrative embodiment, the two-dimensional array of fourth polarization rotating layer antenna elements includes 36 fourth polarization rotating layer antenna elements arranged in a 6×6 pattern. Instead of forming individual antenna elements, a plurality of first conductive Jerusalem crosses 1400*d* may be layered on, against, or adjacent third dielectric slab 1600*a*, and a plurality of second conductive Jerusalem crosses 1404*d* may be layered on, against, or adjacent fourth dielectric slab 1602*a*. 36 first polarization rotating elements 202*a* are further arranged in a 6×6 pattern to align, in the direction parallel to the z-axis of orthogonal coordinate reference frame 308, with the two-dimensional array of fourth polarization rotating layer antenna elements.

Figure 16E:
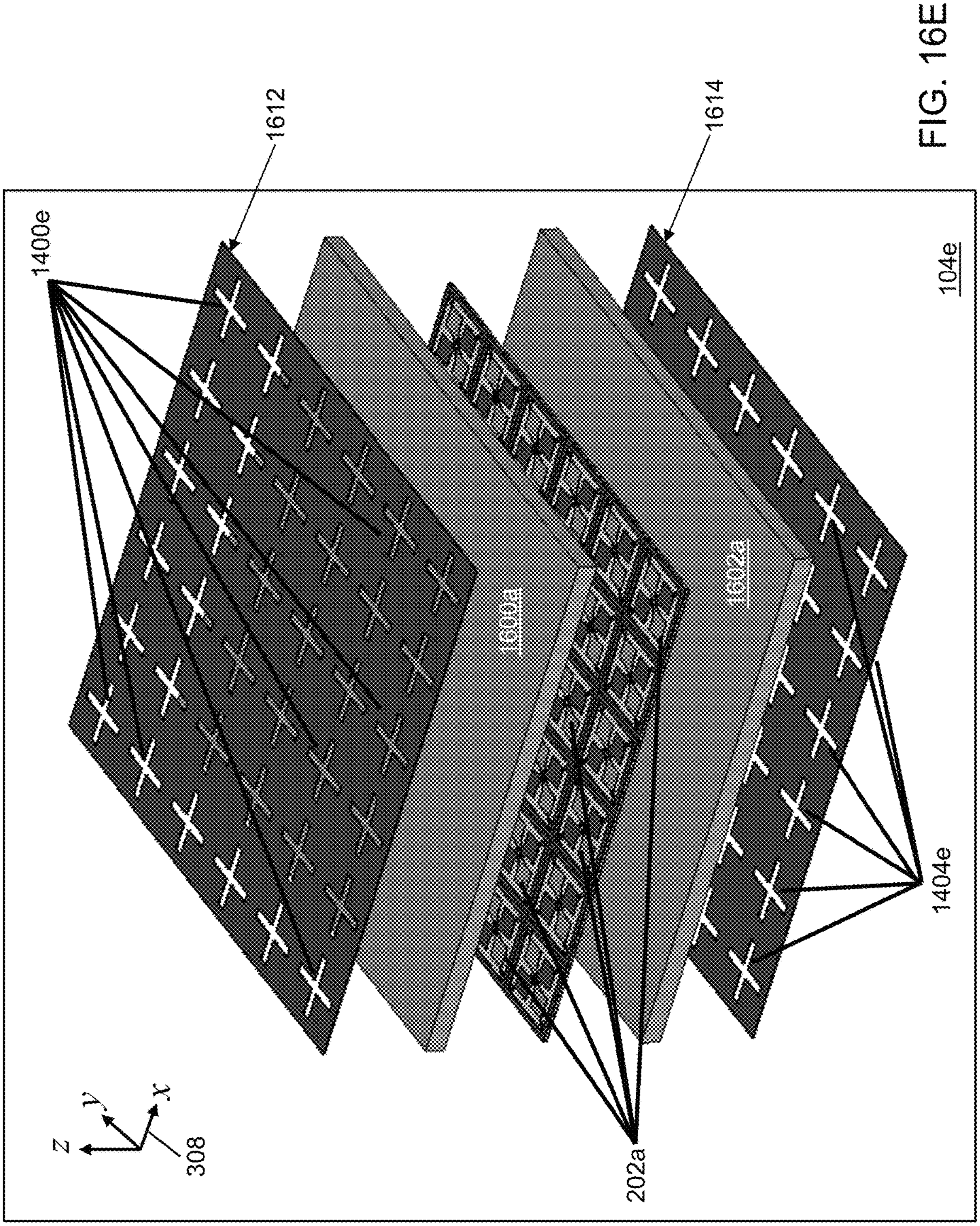
FIG. 16E depicts an exploded perspective view of a fifth phased array antenna comprised of fifth polarization rotating layer antenna elements in accordance with an illustrative embodiment.

Referring to FIG. 16E, an exploded perspective view of a fifth phased array antenna 104*e* is shown in accordance with an illustrative embodiment. Fifth phased array antenna 104*e* may include a two-dimensional array of fifth polarization rotating layer antenna elements. In the illustrative embodiment, the two-dimensional array of fifth polarization rotating layer antenna elements includes 36 fifth polarization rotating layer antenna elements arranged in a 6×6 pattern. Instead of forming individual antenna elements, a first conductive slab 1612 may be layered on, against, or adjacent third dielectric slab 1600*a*, and a second conductive slab 1614 may be layered on, against, or adjacent fourth dielectric slab 1602*a*. First conductive slab 1612 may include a plurality of first cross-shaped slot walls 1408 formed through first conductive slab 1612. Second conductive slab 1614 may include a plurality of second cross-shaped slot walls 1410 formed through second conductive slab 1614. 36 first polarization rotating elements 202*a* are further arranged in a 6×6 pattern to align, in the direction parallel to the z-axis of orthogonal coordinate reference frame 308, with the plurality of first cross-shaped slot walls 1408 and the plurality of second cross-shaped slot walls 1410.

FIGS. 14A-14E and 18A-18N depict low-profile, wideband, and electronically reconfigurable lens array antenna elements based on polarization-rotating (PR) and frequency-selective surfaces. The illustrative polarization rotating layer antenna elements 1300 include three distinct layers: a PR phase shifter layer (polarization rotating element 202) positioned between two layers that may be capacitive, inductive, or both capacitive and inductive. The outermost layers are in the form of two-dimensional (2-D) periodic arrangements of sub-wavelength elements (such as patches or strips) located on dielectric substrates. Meanwhile, the sandwiched PR phase shifter layer includes a pair of orthogonal dipoles separated from one another by a dielectric support substrate as described above. For high power applications, a recommended dielectric substrate may be a high-temperature-tolerant ceramic. The outer layers along with the dipole layers are oriented in a specific direction to enable rotation of the polarization of the transmitted wave by angles that achieve the intended phase shifts. A typical example choice would be for the polarization rotation to be ±90° with respect to the polarization of the incoming wave.

Figure 17:
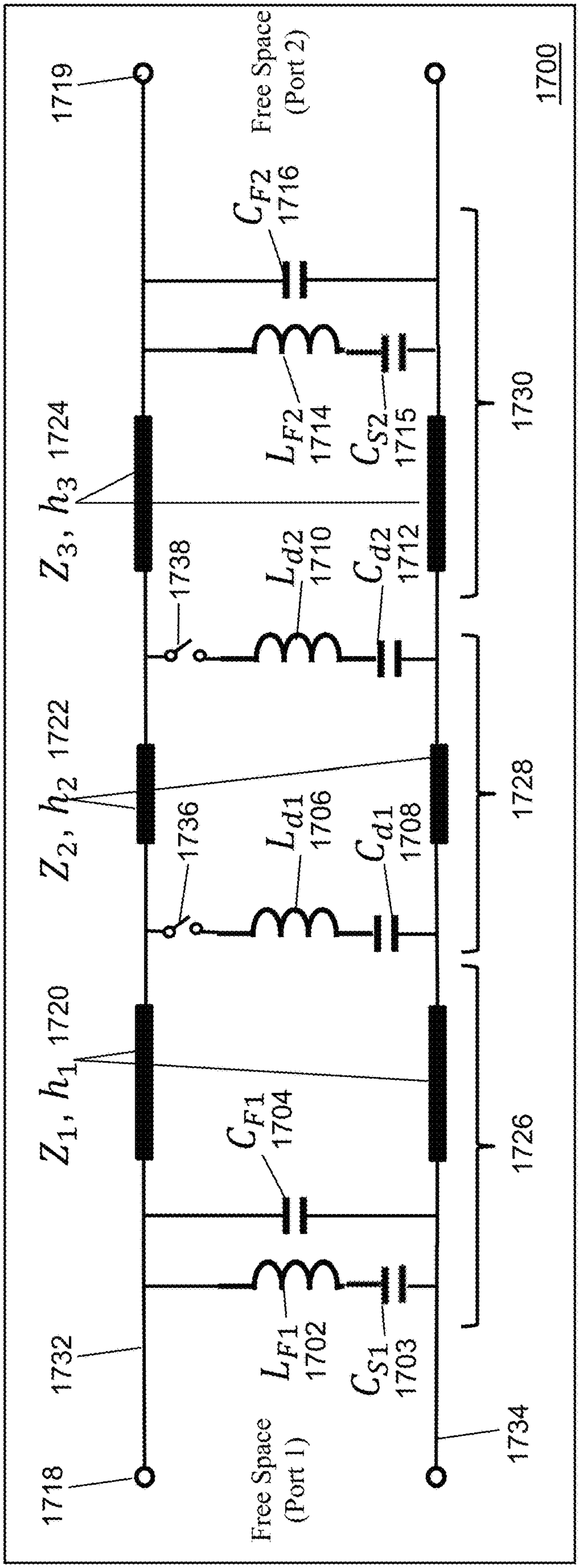
FIG. 17 depicts an equivalent circuit structure used to model a layer antenna element in accordance with an illustrative embodiment.

To better understand the operation of polarization rotating layer antenna element 1300, an equivalent circuit 1700 is shown referring to FIG. 17 that may be used to model operation of polarization rotating layer antenna elements 1300 in accordance with an illustrative embodiment. Equivalent circuit 1700 is valid for normally-incident, y-polarized waves and treats polarization rotating layer antenna element 1300 as a two-port network. In a simplified equivalent-circuit model describing a transmission response of the PR unit cell, the two outermost layers may be modeled as shunt capacitors $C_{F1}$ and $C_{F2}$, as shunt inductors $L_{F1}$ and $L_{F2}$, as shunt capacitors $C_{F1}$ and $C_{F2}$ with parallel shunt inductors $L_{F1}$ and $L_{F2}$, or as series circuit branches incorporating shunt inductors $L_{F1}$ and $L_{F2}$ in series with series capacitors $C_{S1}$ and $C_{S2}$. The dipoles on the surfaces of polarization rotating element 202 are modeled with switches and series capacitor-and-inductor circuit branches $L_{d1}$ and $C_{d1}$ and $L_{d2}$ and $C_{d2}$. The dielectric substrates are represented by short pieces of transmission lines, each with characteristic impedances of $Z_1=Z_0\sqrt{\varepsilon_{r1}}$, $Z_2=Z_0/\sqrt{\varepsilon_{r1}}$, and $Z_3=Z_0/\sqrt{\varepsilon_{r3}}$ and lengths of $h_1$, $h_2$, and $h_3$, respectively, where $\varepsilon_{r1}$, $\varepsilon_{r2}$, and $\varepsilon_{r3}$ are the dielectric permittivity of the respective substrates and Z, is the impedance of free space. Matching the input impedances of the two outward-facing FSSs (labelled as "ports" in FIG. 17) to 377 Ohms (Ω), the impedance of free space, is crucial for efficient wave transmission and polarization conversion. Consequently, the equivalent circuit parameters, which are related to physical properties of each polarization rotating layer antenna elements 1300 (e.g., dimensions and materials), can be adjusted to achieve the desired input impedance.

The conducting pattern layer that is layered on, against, or adjacent first dielectric slab 1402*a* or second dielectric slab 1406*a* is sized, shaped, and arranged to form a conducting surface. Equivalent circuit parameters may be used to model performance of the conducting pattern layer as lumped circuit elements based on the size, shape and arrangement. The material used to form the conducting pattern layer is chosen to be a good conductor such as copper.

Some of the equivalent circuit parameters may not be included depending on whether the conducting pattern layer of first impedance structure 1302 and of second impedance structure 1304 are capacitive, inductive, or resonant. The choice of inductive versus capacitive may be based on the orientation of the incident wave's electric field with respect to the alignment of conducting strips. When the E field is parallel to the strips, the magnetic field of the incident wave interacts with the magnetic field generated by the strip resulting in the strip(s) acting as an inductor. On the other hand, when the E field is perpendicular to the strips (while the magnetic field, H, is parallel to the strips), the electric field creates positive and negative charge accumulations on adjacent edges of the strips. In this configuration, the nearby edges of the adjacent strips act as two plates of a co-planar capacitor resulting in the strip(s) acting as a capacitor.

For example, first conductive patch 1400*a* and second conductive patch 1404*a* may be modeled as capacitive layers such that only the shunt capacitors $C_{F1}$ and $C_{F2}$ are included in equivalent circuit 1700. For example, first conductive strip 1400*b* and second conductive strip 1404*b* may be modeled as capacitive layers such that only the shunt capacitors $C_{F1}$ and $C_{F2}$ are included in equivalent circuit 1700 or may be modeled as inductive layers such that only the shunt inductors $L_{F1}$ and $L_{F2}$ are included in equivalent circuit 1700 dependent on the orientation of the incident wave. For example, first conductive cross 1400*c* and second conductive cross 1404*c* may be modeled as inductive layers such that only the shunt inductors $L_{F1}$ and $L_{F2}$ are included in equivalent circuit 1700. For example, first conductive Jerusalem cross 1400*d* and second conductive Jerusalem cross 1404*d* may be modeled as resonant layers that may include the shunt inductors $L_{F1}$ and $L_{F2}$ and the series capacitors $C_{S1}$ and $C_{S2}$ in equivalent circuit 1700. Other resonant layers may include a different combination of the shunt inductors $L_{F1}$ and $L_{F2}$, the shunt capacitors $C_{F1}$ and $C_{F2}$, and/or the series capacitors $C_{S1}$ and $C_{S2}$. When not included in equivalent circuit 1700, the shunt inductors $L_{F1}$ and $L_{F2}$, the shunt capacitors $C_{F1}$ and $C_{F2}$, and/or the series capacitors $C_{S1}$ and $C_{S2}$ may be considered to be parasitic or de minimis such that performance can be reasonably accurately modeled without their inclusion.

Equivalent circuit 1700 may include a first inductor 1702, a first capacitor 1703, a second capacitor 1704, a second inductor 1706, a third capacitor 1708, a third inductor 1710, a fourth capacitor 1712, a fourth inductor 1714, a fifth capacitor 1715, a sixth capacitor 1716, a first impedance 1720, a second impedance 1722, a third impedance 1724, a first bus line 1732, a second bus line 1734, a first switch 1736, and second switch 1738. A first port 1718 is indicated between first bus line 1732 and second bus line 1734. A second port 1719 is indicated between first bus line 1732 and second bus line 1734. First impedance 1720, second impedance 1722, and third impedance 1724 are connected in series in first bus line 1732. A first set of circuit elements 1726 includes first inductor 1702, first capacitor 1703, second capacitor 1704, and first impedance 1720 and represents first impedance structure 1302. A second set of circuit elements 1728 includes second inductor 1706, third capacitor 1708, third inductor 1710, fourth capacitor 1712, and second impedance 1722 and represents polarization rotating element 202. A third set of circuit elements 1730 includes fourth inductor 1714, fifth capacitor 1715, sixth capacitor 1716, and third impedance 1724 and represents second impedance structure 1304.

First inductor 1702 and first capacitor 1703 are connected in series between first bus line 1732 and second bus line 1734 opposite first port 1718. Fourth inductor 1714 and fifth capacitor 1703 are connected in series between first bus line 1732 and second bus line 1734. Second capacitor 1704 is connected between first bus line 1732 and second bus line 1734 in parallel with first inductor 1702 and first capacitor 1703. Sixth capacitor 1716 is connected between first bus line 1732 and second bus line 1734 in parallel with fourth inductor 1714 and fifth capacitor 1703 and opposite second port 1719.

First switch 1736, second inductor 1706, and third capacitor 1708 are connected in series between first impedance 1720 and second impedance 1722. Second switch 1738, third inductor 1710, and fourth capacitor 1712 are connected in series between second impedance 1722 and third impedance 1724.

For illustration, a paper by Mudar Al-Joumayly and Nader Behdad titled *A new technique for design of low-profile, second-order, bandpass frequency selective surfaces* published in IEEE transactions on antennas and propagation in volume 57.2 on pages 452-459 (2009) describes computation of the equivalent circuit parameters based on the structural characteristics of each polarization rotating layer antenna element 1300. As another example, a paper by Seyed Mohamad Amin Momeni Hasan Abadi and Nader Behdad titled *Inductively-coupled miniaturized-element frequency selective surfaces with narrowband, high-order bandpass responses* published in IEEE Transactions on Antennas and Propagation in volume 63.11 on pages 4766-4774 (2015) also describes computation of the equivalent circuit parameters based on the structural characteristics of each polarization rotating layer antenna element 1300. As yet another example, a paper by Xue Yang et al. titled *Design method for low-profile, harmonic-suppressed filter-antennas using miniaturized-element frequency selective surfaces* published in IEEE Antennas and Wireless Propagation Letters in volume 18.3 on pages 427-431 (2019) also describes computation of the equivalent circuit parameters based on the structural characteristics of each polarization rotating layer antenna element 1300.

Figure 18A:
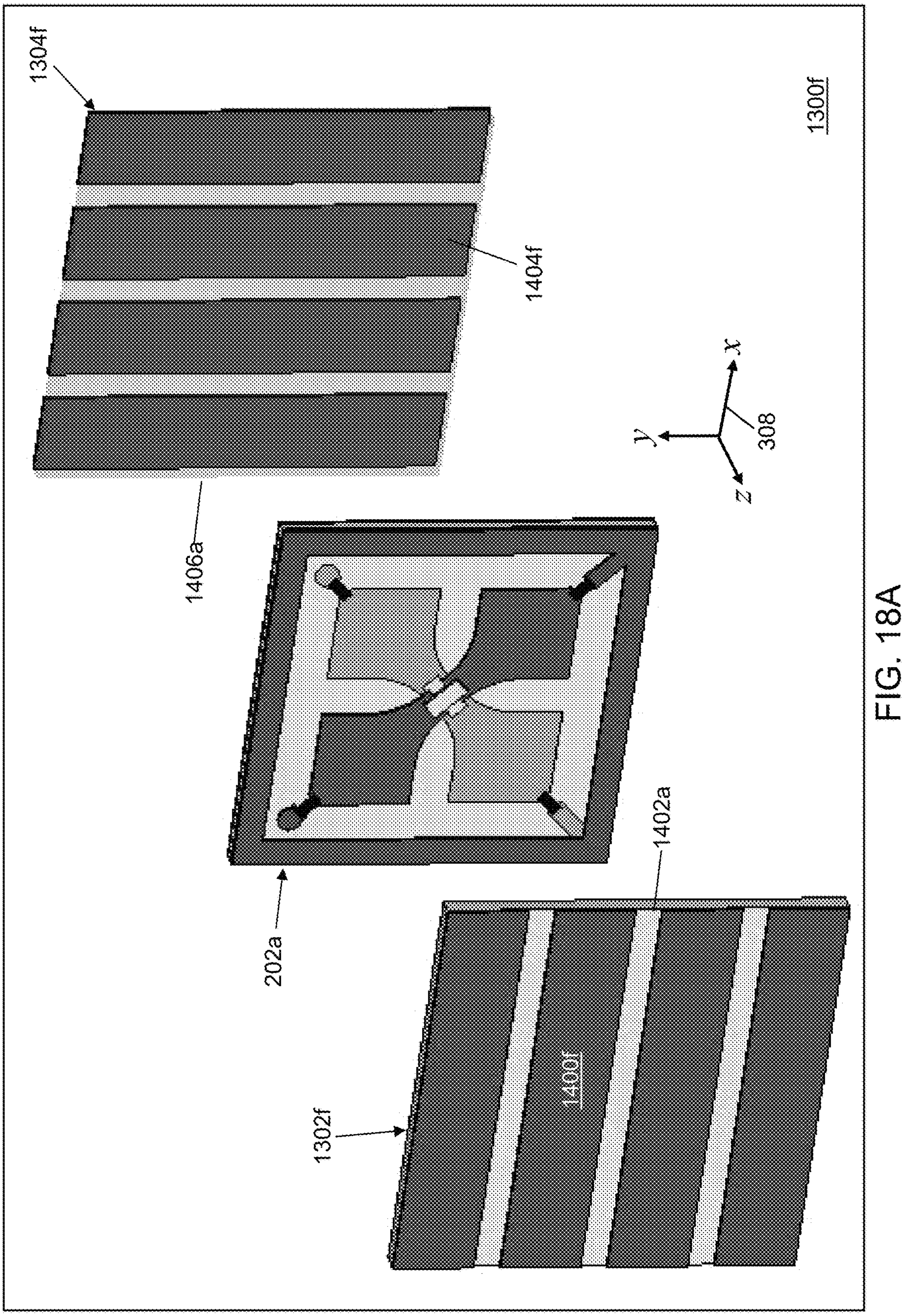
FIG. 18A depicts a perspective view of a sixth polarization rotating layer antenna element comprised of two wire-grid conducting layers in accordance with an illustrative embodiment.

Referring to FIG. 18A, a perspective view of a sixth polarization rotating layer antenna element 1300*f* is shown comprised of two wire-grid conducting layers in accordance with an illustrative embodiment. Sixth polarization rotating layer antenna element 1300*f* includes a first wire-grid impedance structure 1302*f*, first polarization rotating element 202*a*, and a second wire-grid impedance structure 1304*f*. First wire-grid impedance structure 1302*f* and second wire-grid impedance structure 1304*f* are identical except that second wire-grid impedance structure 1304*f* is rotated 90° in the x-y plane and 180° in the x-z plane relative to first wire-grid impedance structure 1302*f*. First wire-grid impedance structure 1302*f* may include a first plurality of conductive strips 1400*f* and first dielectric slab 1402*a*. The first plurality of conductive strips 1400*f* extend parallel to each other and to the x-axis of orthogonal coordinate reference frame 308 and are formed of conductive material layered on, against, or adjacent to first dielectric slab 1402*a*. Second wire-grid impedance structure 1304*a* may include a second plurality of conductive strips 1404*f* and second dielectric slab 1406*a*. The second plurality of conductive strips 1404*f* extend parallel to each other and to the y-axis of orthogonal coordinate reference frame 308 and are formed of conductive material layered on, against, or adjacent to second dielectric slab 1406*a*. The first plurality of conductive strips 1400*f* and the second plurality of conductive strips 1404*f* may be modeled as capacitive layers such that only the shunt capacitors $C_{F1}$ and $C_{F2}$ are included in equivalent circuit 1700.

Figure 18B:
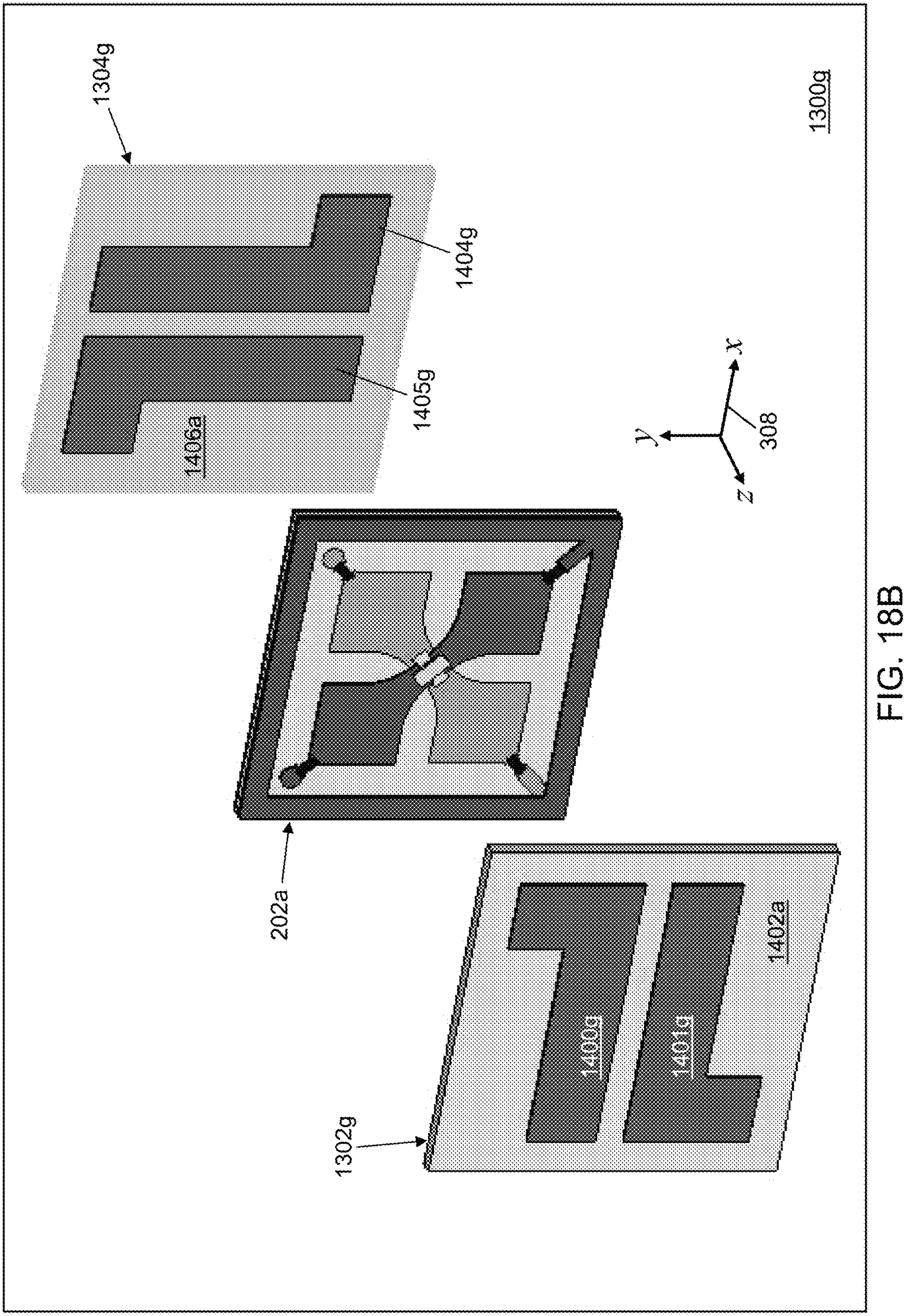
FIG. 18B depicts a perspective view of a seventh polarization rotating layer antenna element comprised of two L-resonator conducting layers in accordance with an illustrative embodiment.

Referring to FIG. 18B, a perspective view of a seventh polarization rotating layer antenna element 1300*g* is shown comprised of two L-resonator conducting layers in accordance with an illustrative embodiment. Seventh polarization rotating layer antenna element 1300*g* includes a first L-resonator impedance structure 1302*g*, first polarization rotating element 202*a*, and a second L-resonator impedance structure 1304*g*. First L-resonator impedance structure 1302*g* and second L-resonator impedance structure 1304*g* are identical except that second L-resonator impedance structure 1304*g* is rotated 90° in the x-y plane and 180° in the x-z plane relative to first L-resonator impedance structure 1302*g*. First L-resonator impedance structure 1302*g* may include a first L-shaped conductive strip 1400*g*, a second L-shaped conductive strip 1401*g*, and first dielectric slab 1402*a*. First L-shaped conductive strip 1400*g* and second L-shaped conductive strip 1401*g* are formed of conductive material layered on, against, or adjacent to first dielectric slab 1402*a*. First L-shaped conductive strip 1400*g* and second L-shaped conductive strip 1401*g* are identical except that second L-shaped conductive strip 1401*g* is rotated 180° in the x-y plane relative to first L-shaped conductive strip 1400*g*. Second L-resonator impedance structure 1304*g* may include a third L-shaped conductive strip 1404*g*, a fourth L-shaped conductive strip 1405*g*, and second dielectric slab 1406*a*. Third L-shaped conductive strip 1404*g* and fourth L-shaped conductive strip 1405*g* are formed of conductive material layered on, against, or adjacent to second dielectric slab 1406*a*. Third L-shaped conductive strip 1404*g* and fourth L-shaped conductive strip 1405*g* are identical except that third L-shaped conductive strip 1404*g* is rotated 180° in the x-y plane relative to fourth L-shaped conductive strip 1405*g*.

First L-shaped conductive strip 1400$g$ and second L-shaped conductive strip 1401$g$ may be modeled as resonant layers that may include shunt inductors $L_{F1}$ and $L_{F2}$ and series capacitors $C_{S1}$ and $C_{S2}$ in equivalent circuit 1700.

Figure 18C:
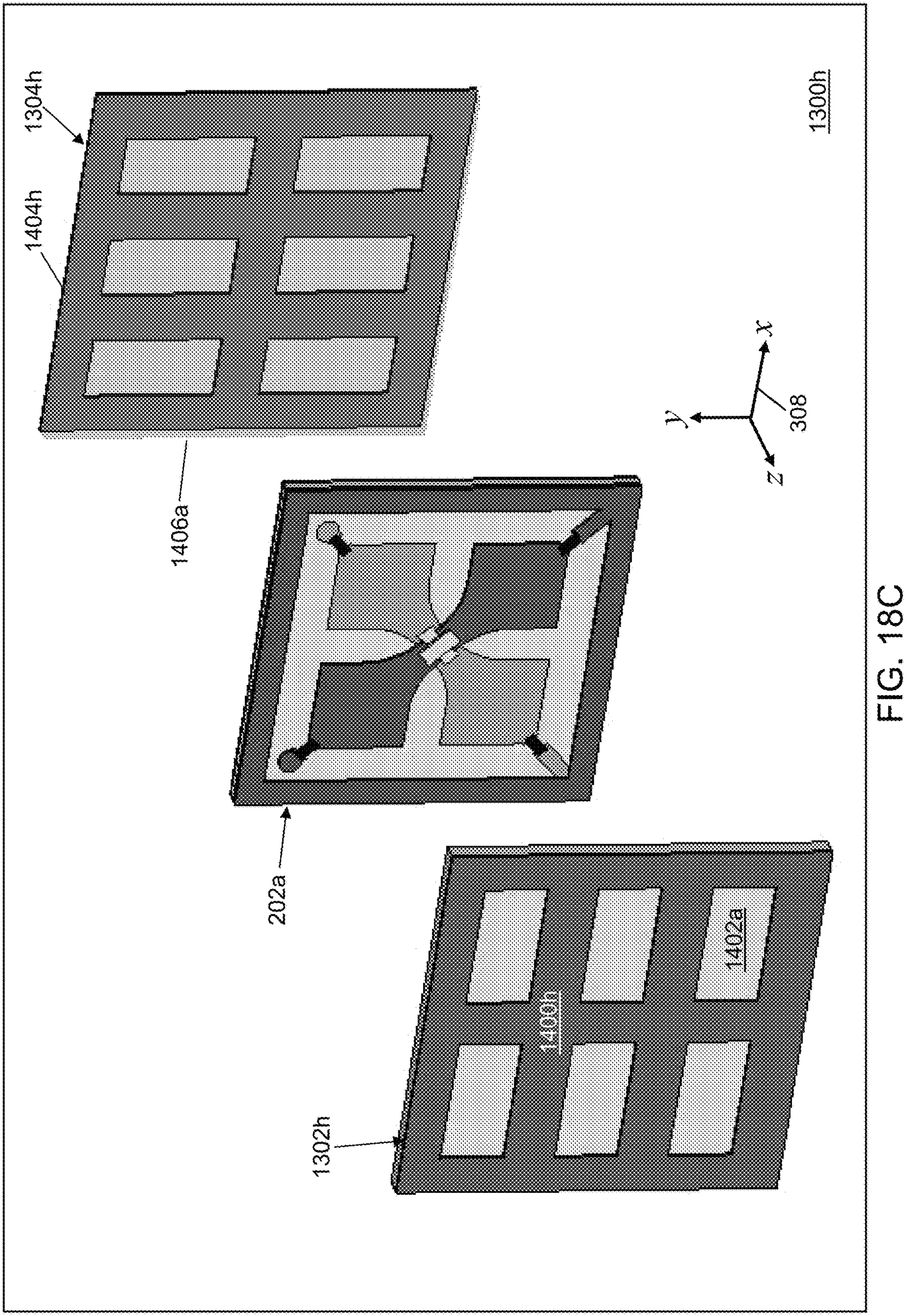
FIG. 18C depicts a perspective view of an eighth polarization rotating layer antenna element comprised of two slot array conducting layers in accordance with an illustrative embodiment.

Referring to FIG. 18C, a perspective view of an eighth polarization rotating layer antenna element 1300$h$ is shown comprised of two slot array conducting layers in accordance with an illustrative embodiment. Eighth polarization rotating layer antenna element 1300$h$ includes a first slot array impedance structure 1302$h$, first polarization rotating element 202$a$, and a second slot array impedance structure 1304$h$. First slot array impedance structure 1302$h$ and second slot array impedance structure 1304$h$ are identical except that second slot array impedance structure 1304$h$ is rotated 90° in the x-y plane and 180° in the x-z plane relative to first slot array impedance structure 1302$h$. First slot array impedance structure 1302$h$ may include a third conductive slab 1400$h$ formed of conductive material layered on, against, or adjacent to first dielectric slab 1402$a$. A plurality of rectangular shaped slot walls may be formed through third conductive slab 1400$h$. Second slot array impedance structure 1304$h$ may include a fourth conductive slab 1404$h$ formed of conductive material layered on, against, or adjacent to second dielectric slab 1406$a$. A plurality of rectangular shaped slot wall may be formed through fourth conductive slab 1404$h$. Third conductive slab 1400$h$ and fourth conductive slab 1404$h$ may be modeled as inductive layers such that only the shunt inductors $L_{F1}$ and $L_{F2}$ are included in equivalent circuit 1700.

Figure 18D:
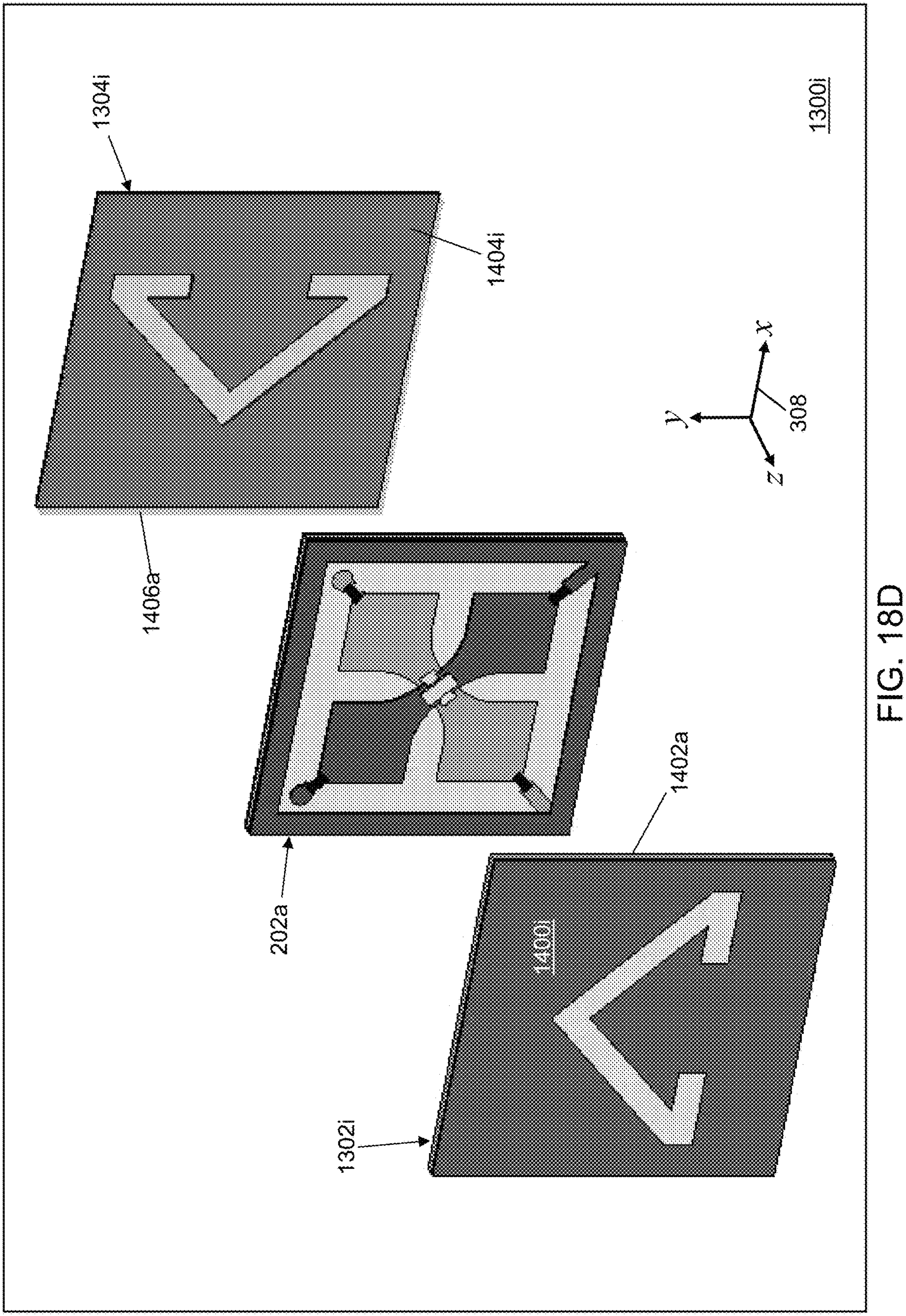
FIG. 18D depicts a perspective view of a ninth polarization rotating layer antenna element comprised of two V-shaped slot conducting layers in accordance with an illustrative embodiment.

Referring to FIG. 18D, a perspective view of a ninth polarization rotating layer antenna element 1300$i$ is shown comprised of two V-shaped slot conducting layers in accordance with an illustrative embodiment. Ninth polarization rotating layer antenna element 1300$i$ includes a first V-shaped slot impedance structure 1302$i$, first polarization rotating element 202$a$, and a second V-shaped slot impedance structure 1304$i$. First V-shaped slot impedance structure 1302$i$ and second V-shaped slot impedance structure 1304$i$ are identical except that second V-shaped slot impedance structure 1304$i$ is rotated 90° in the x-y plane and 180° in the x-z plane relative to first V-shaped slot impedance structure 1302$i$. First V-shaped slot impedance structure 1302$i$ may include a fifth conductive slab 1400$i$ formed of conductive material layered on, against, or adjacent to first dielectric slab 1402$a$. A V-shaped slot wall may be formed through fifth conductive slab 1400$i$. Second V-shaped slot impedance structure 1304$i$ may include a sixth conductive slab 1404$i$ formed of conductive material layered on, against, or adjacent to second dielectric slab 1406$a$. A V-shaped slot wall may be formed through sixth conductive slab 1404$i$. Fifth conductive slab 1400$i$ and sixth conductive slab 1404$i$ may be modeled as resonant layers that may include the shunt inductors $L_{F1}$ and $L_{F2}$ and the shunt capacitors $C_{F1}$ and $C_{F2}$ in equivalent circuit 1700.

Figure 18E:
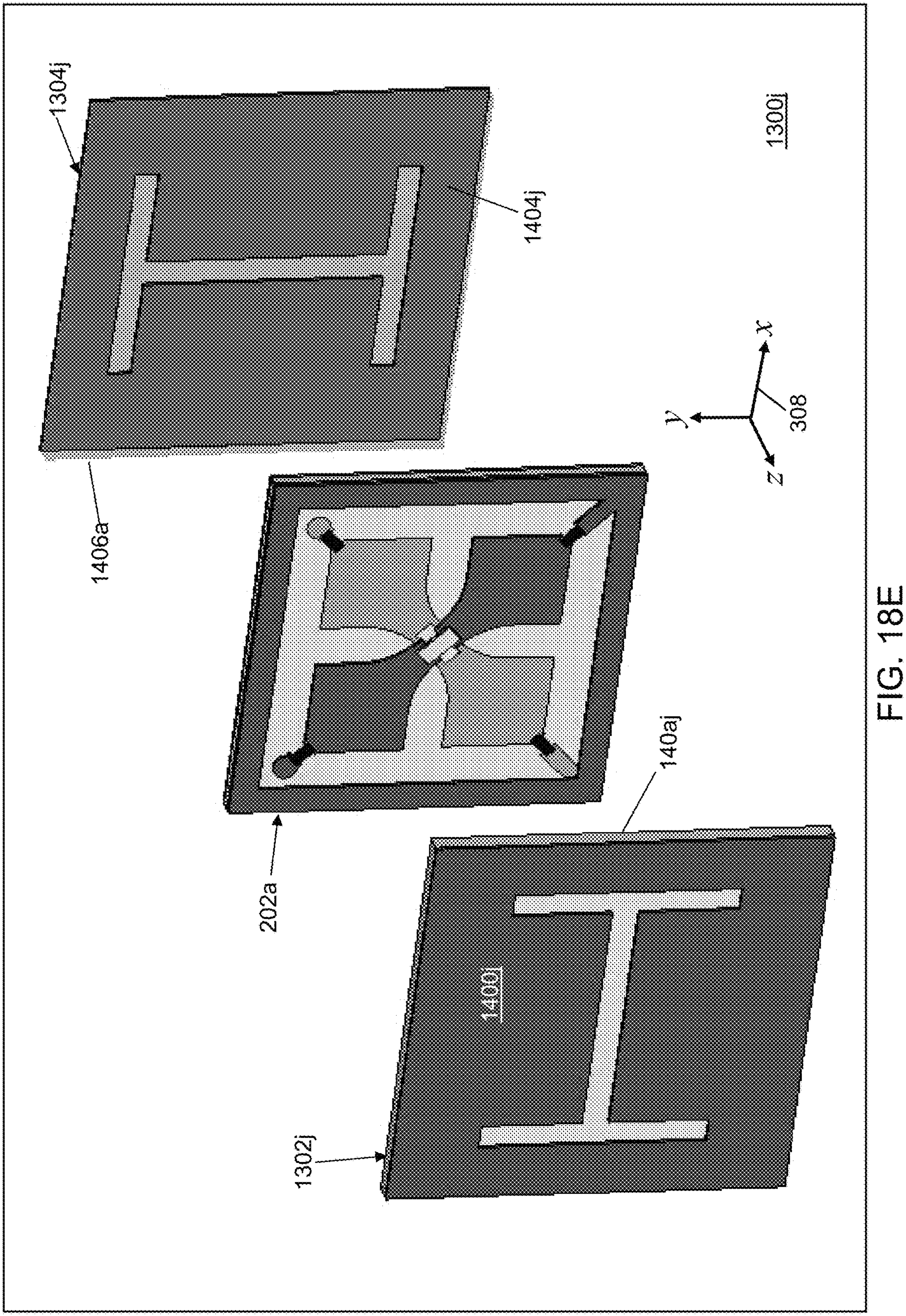
FIG. 18E depicts a perspective view of a tenth polarization rotating layer antenna element comprised of two I-shaped slot conducting layers in accordance with an illustrative embodiment.

Referring to FIG. 18E, a perspective view of a tenth polarization rotating layer antenna element 1300$j$ is shown comprised of two I-shaped slot conducting layers in accordance with an illustrative embodiment. Tenth polarization rotating layer antenna element 1300$j$ includes a first I-shaped slot impedance structure 1302$j$, first polarization rotating element 202$a$, and a second I-shaped slot impedance structure 1304$j$. First I-shaped slot impedance structure 1302$j$ and second I-shaped slot impedance structure 1304$j$ are identical except that second I-shaped slot impedance structure 1304$j$ is rotated 90° in the x-y plane and 180° in the x-z plane relative to first I-shaped slot impedance structure 1302$j$. First I-shaped slot impedance structure 1302$j$ may include a seventh conductive slab 1400$j$ formed of conductive material layered on, against, or adjacent to first dielectric slab 1402$a$. An I-shaped slot wall may be formed through seventh conductive slab 1400$j$. Second I-shaped slot impedance structure 1304$j$ may include an eighth conductive slab 1404$j$ formed of conductive material layered on, against, or adjacent to second dielectric slab 1406$a$. An I-shaped slot wall may be formed through eighth conductive slab 1404$j$. Sixth conductive slab 1400$j$ and seventh conductive slab 1404$j$ may be modeled as resonant layers that may include the shunt inductors $L_{F1}$ and $L_{F2}$ and the shunt capacitors $C_{F1}$ and $C_{F2}$ in equivalent circuit 1700.

Figure 18F:
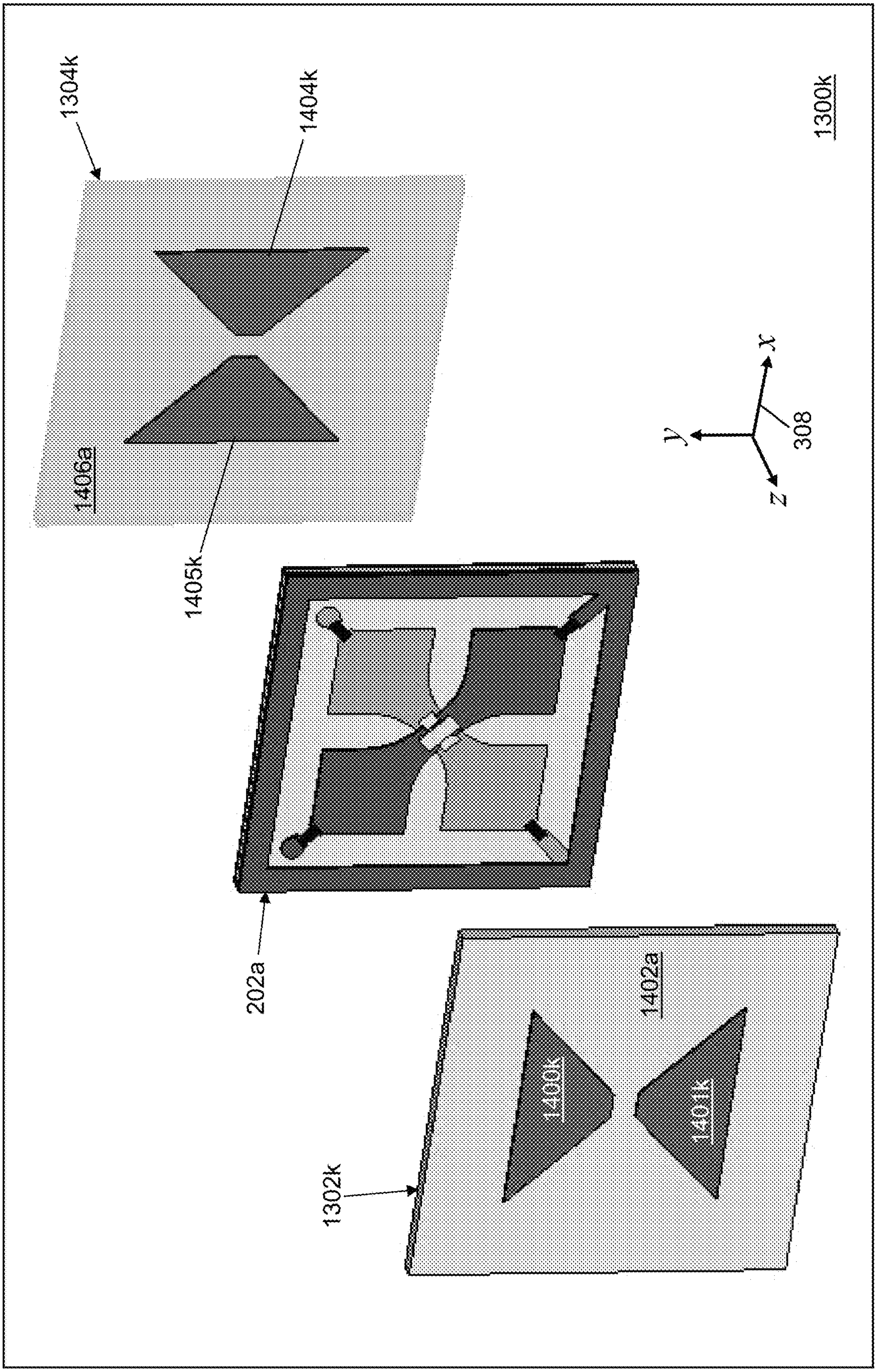
FIG. 18F depicts a perspective view of an eleventh polarization rotating layer antenna element comprised of two bow-tie conducting layers in accordance with an illustrative embodiment.

Referring to FIG. 18F, a perspective view of an eleventh polarization rotating layer antenna element 1300$k$ is shown comprised of two bow-tie conducting layers in accordance with an illustrative embodiment. Eleventh polarization rotating layer antenna element 1300$k$ includes a first bow-tie impedance structure 1302$k$, first polarization rotating element 202$a$, and a second bow-tie impedance structure 1304$k$. First bow-tie impedance structure 1302$k$ and second bow-tie impedance structure 1304$k$ are identical except that second bow-tie impedance structure 1304$k$ is rotated 90° in the x-y plane and 180° in the x-z plane relative to first bow-tie impedance structure 1302$k$. First bow-tie impedance structure 1302$k$ may include a first triangular-shaped conductive strip 1400$k$, a second triangular-shaped conductive strip 1401$k$, and first dielectric slab 1402$a$. First triangular-shaped conductive strip 1400$k$ and second triangular-shaped conductive strip 1401$k$ are formed of conductive material layered on, against, or adjacent to first dielectric slab 1402$a$. First triangular-shaped conductive strip 1400$k$ and second triangular-shaped conductive strip 1401$k$ are identical except that second triangular-shaped conductive strip 1401$k$ is rotated 180° in the x-y plane relative to first triangular-shaped conductive strip 1400$k$. First triangular-shaped conductive strip 1400$k$ and second triangular-shaped conductive strip 1401$k$ each form a top squared off triangle. Second bow-tie impedance structure 1304$k$ may include a third triangular-shaped conductive strip 1404$k$, a fourth triangular-shaped conductive strip 1405$k$, and second dielectric slab 1406$a$. Third triangular-shaped conductive strip 1404$k$ and fourth triangular-shaped conductive strip 1405$k$ are formed of conductive material layered on, against, or adjacent to second dielectric slab 1406$a$. Third triangular-shaped conductive strip 1404$k$ and fourth triangular-shaped conductive strip 1405$k$ are identical except that third triangular-shaped conductive strip 1404$k$ is rotated 180° in the x-y plane relative to fourth triangular-shaped conductive strip 1405$k$. Third triangular-shaped conductive strip 1404$k$ and fourth triangular-shaped conductive strip 1405$k$ each form a top squared off triangle. First triangular-shaped conductive strip 1400$k$ and second triangular-shaped conductive strip 1401$k$ may be modeled as resonant layers that may include the shunt inductors $L_{F1}$ and $L_{F2}$ and the series capacitors $C_{S1}$ and $C_{S2}$ in equivalent circuit 1700.

Figure 18G:
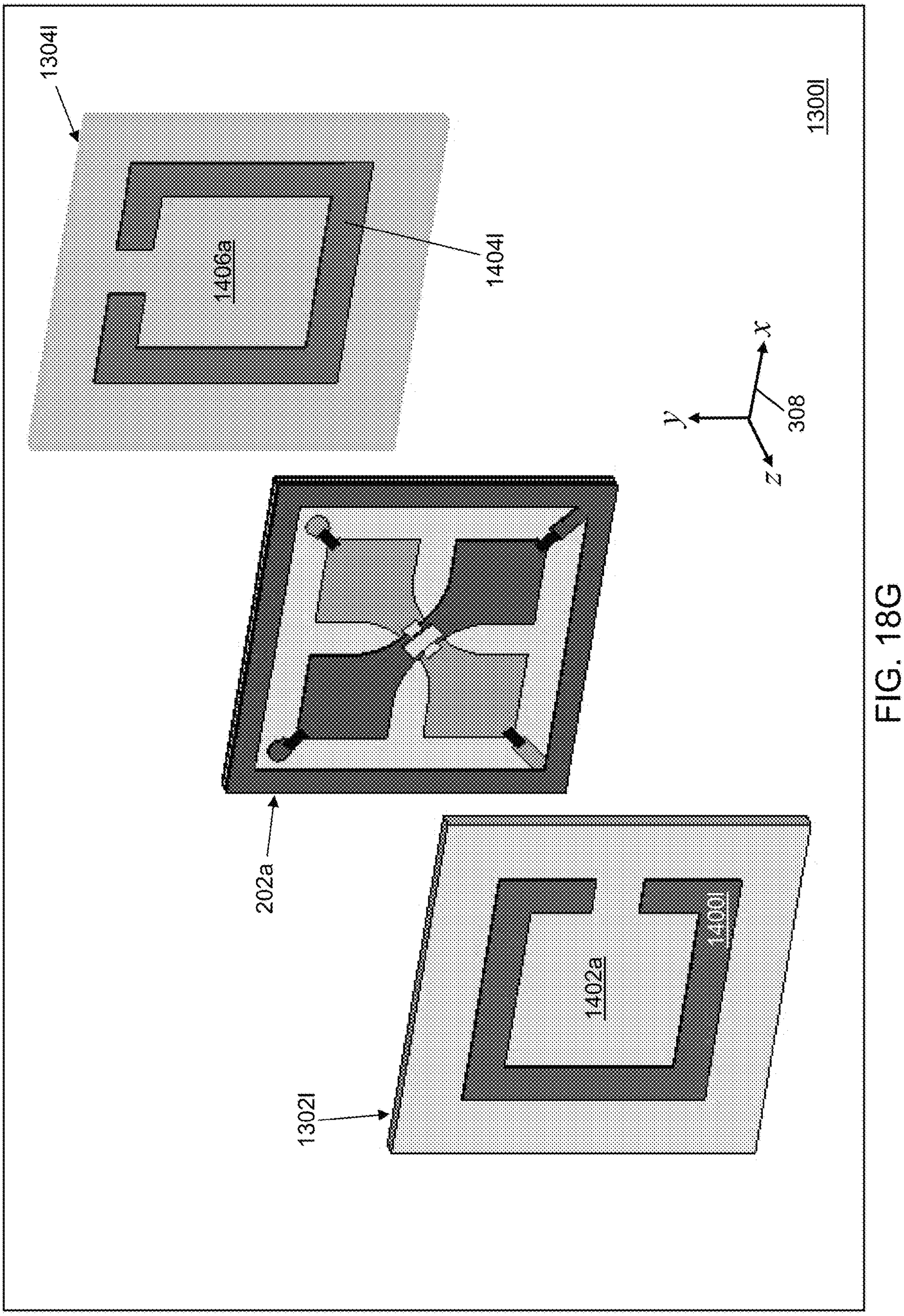
FIG. 18G depicts a perspective view of a twelfth polarization rotating layer antenna element comprised of two split-ring resonator conducting layers in accordance with an illustrative embodiment.

Referring to FIG. 18G, a perspective view of a twelfth polarization rotating layer antenna element 13001 is shown comprised of two split-ring resonator conducting layers in accordance with an illustrative embodiment. Twelfth polarization rotating layer antenna element 13001 includes a first split-ring resonator impedance structure 13021, first polarization rotating element 202$a$, and a second split-ring resonator impedance structure 13041. First split-ring resonator impedance structure 13021 and second split-ring resonator impedance structure 13041 are identical except that second split-ring resonator impedance structure 13041 is rotated 90° in the x-y plane and 180° in the x-z plane relative to first split-ring resonator impedance structure 13021. First split-ring resonator impedance structure 13021 may include a first square C-shaped conductive strip 14001 and first dielectric slab 1402*a*. First square C-shaped conductive strip 14001 is formed of conductive material layered on, against, or adjacent to first dielectric slab 1402*a*. Second split-ring resonator impedance structure 13041 may include a second square C-shaped conductive strip 14041 and second dielectric slab 1406*a*. Second square C-shaped conductive strip 14041 is formed of conductive material layered on, against, or adjacent to second dielectric slab 1406*a*. First square C-shaped conductive strip 14001 and second square C-shaped conductive strip 14041 may be modeled as resonant layers that may include the shunt inductors $L_{F1}$ and $L_{F2}$ and the series capacitors $C_{S1}$ and $C_{S2}$ in equivalent circuit 1700.

Figure 18H:
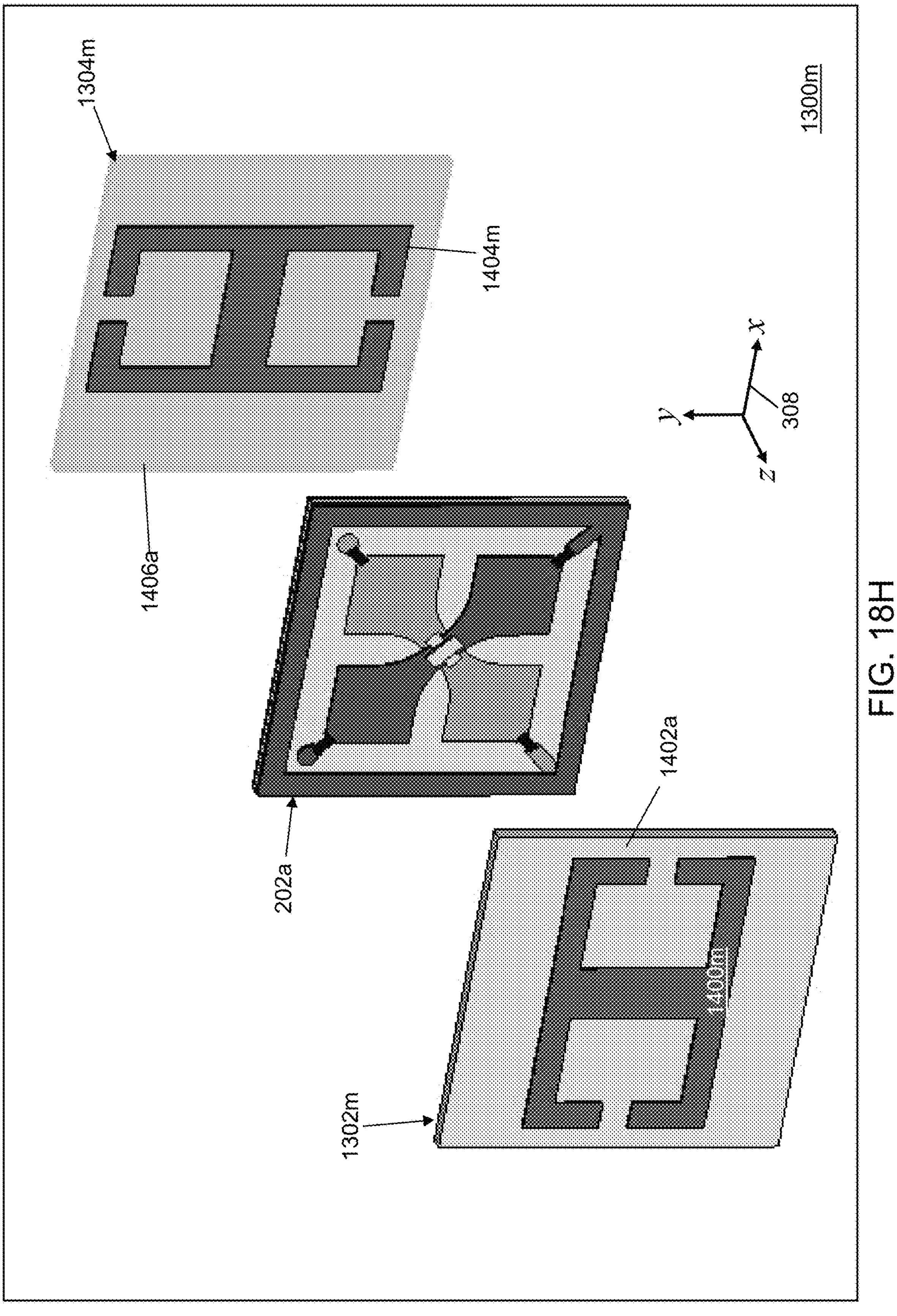
FIG. 18H depicts a perspective view of a thirteenth polarization rotating layer antenna element comprised of two double split-ring resonator conducting layers in accordance with an illustrative embodiment.

Referring to FIG. 18H, a perspective view of a thirteenth polarization rotating layer antenna element 1300*m* is shown comprised of two double split-ring resonator conducting layers in accordance with an illustrative embodiment. Thirteenth polarization rotating layer antenna element 1300*m* includes a first double split-ring resonator impedance structure 1302*m*, first polarization rotating element 202*a*, and a second double split-ring resonator impedance structure 1304*m*. First double split-ring resonator impedance structure 1302*m* and second double split-ring resonator impedance structure 1304*m* are identical except that second double split-ring resonator impedance structure 1304*m* is rotated 90° in the x-y plane and 180° in the x-z plane relative to first double split-ring resonator impedance structure 1302*m*. First double split-ring resonator impedance structure 1302*m* may include a first double square C-shaped conductive strip 1400*m* and first dielectric slab 1402*a*. First double square C-shaped conductive strip 1400*m* is formed of conductive material layered on, against, or adjacent to first dielectric slab 1402*a*. Second double split-ring resonator impedance structure 1304*m* may include a second double square C-shaped conductive strip 1404*m* and second dielectric slab 1406*a*. Second double square C-shaped conductive strip 1404*m* is formed of conductive material layered on, against, or adjacent to second dielectric slab 1406*a*. First double square C-shaped conductive strip 1400*m* and third double square C-shaped conductive strip 1404*m* are formed as two back-to-back square shaped Cs. First double square C-shaped conductive strip 1400*m* and second double square C-shaped conductive strip 1404*m* may be modeled as resonant layers that may include the shunt inductors $L_{F1}$ and $L_{F2}$ and the shunt capacitors $C_{F1}$ and $C_{F2}$ in equivalent circuit 1700.

Figure 18I:
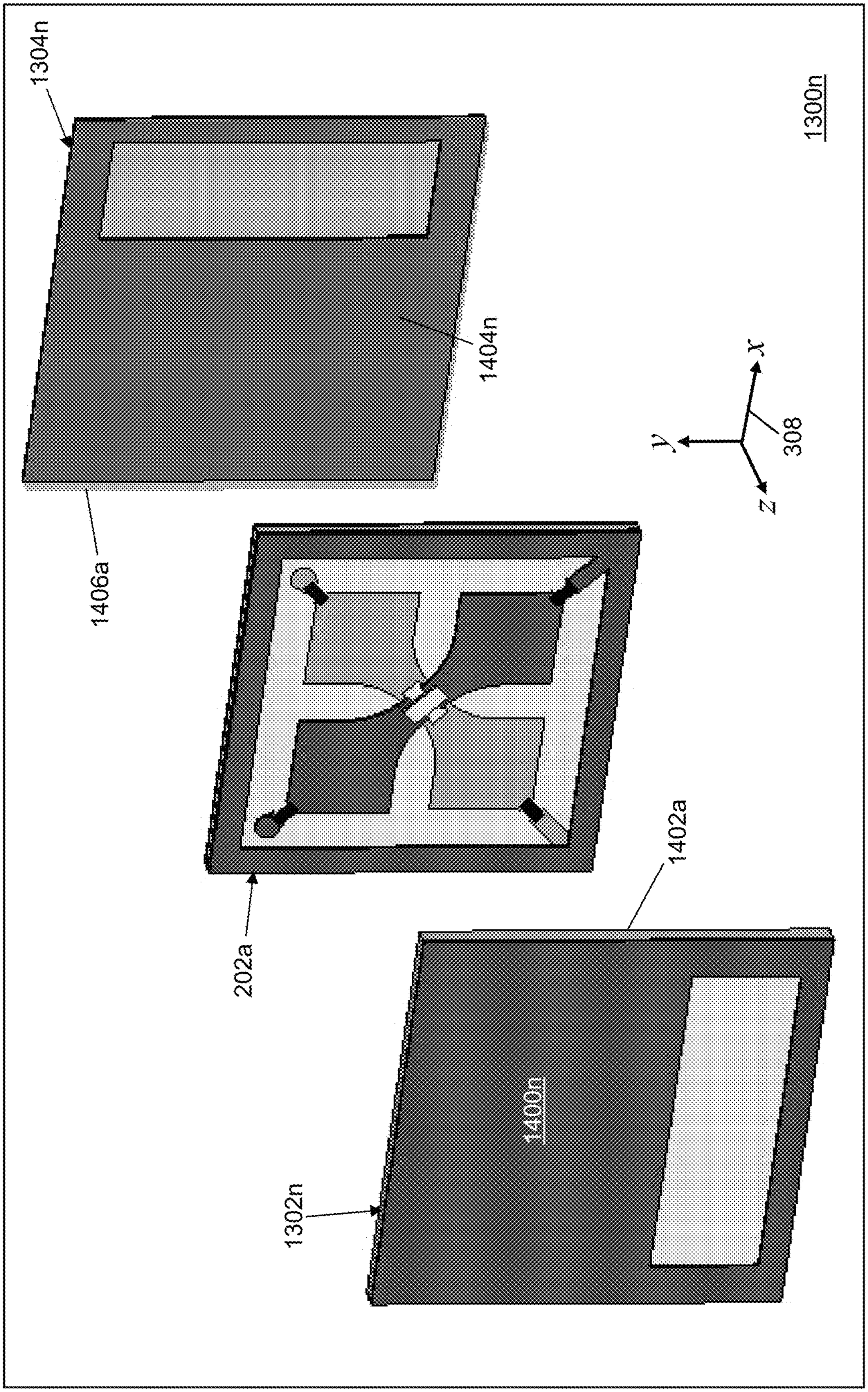
FIG. 18I depicts a perspective view of a fourteenth polarization rotating layer antenna element comprised of two rectangular slot conducting layers in accordance with an illustrative embodiment.

Referring to FIG. 18I, a perspective view of a fourteenth polarization rotating layer antenna element 1300*n* is shown comprised of two rectangular slot conducting layers in accordance with an illustrative embodiment. Fourteenth polarization rotating layer antenna element 1300*n* includes a first rectangular slot impedance structure 1302*n*, first polarization rotating element 202*a*, and a second rectangular slot impedance structure 1304*n*. First rectangular slot impedance structure 1302*n* and second rectangular slot impedance structure 1304*n* are identical except that second rectangular slot impedance structure 1304*n* is rotated 90° in the x-y plane and 180° in the x-z plane relative to first rectangular slot impedance structure 1302*n*. First rectangular slot impedance structure 1302*n* may include a ninth conductive slab 1400*n* formed of conductive material layered on, against, or adjacent to first dielectric slab 1402*a*. A rectangular slot wall may be formed through ninth conductive slab 1400*n*. Second rectangular slot impedance structure 1304*n* may include a tenth conductive slab 1404*n* formed of conductive material layered on, against, or adjacent to second dielectric slab 1406*a*. A rectangular slot wall may be formed through tenth conductive slab 1404*n*. First rectangular slot impedance structure 1302*n* and second rectangular slot impedance structure 1304*n* may be modeled as inductive layers such that only the shunt inductors $L_{F1}$ and $L_{F2}$ are included in the equivalent circuit without the shunt capacitors $C_{F1}$ and $C_{F2}$ or the series capacitors $C_{S1}$ and $C_{S2}$. Ninth conductive slab 1400*n* and tenth conductive slab 1404*n* may be modeled as inductive layers such that only the shunt inductors $L_{F1}$ and $L_{F2}$ are included in equivalent circuit 1700.

Figure 18J:
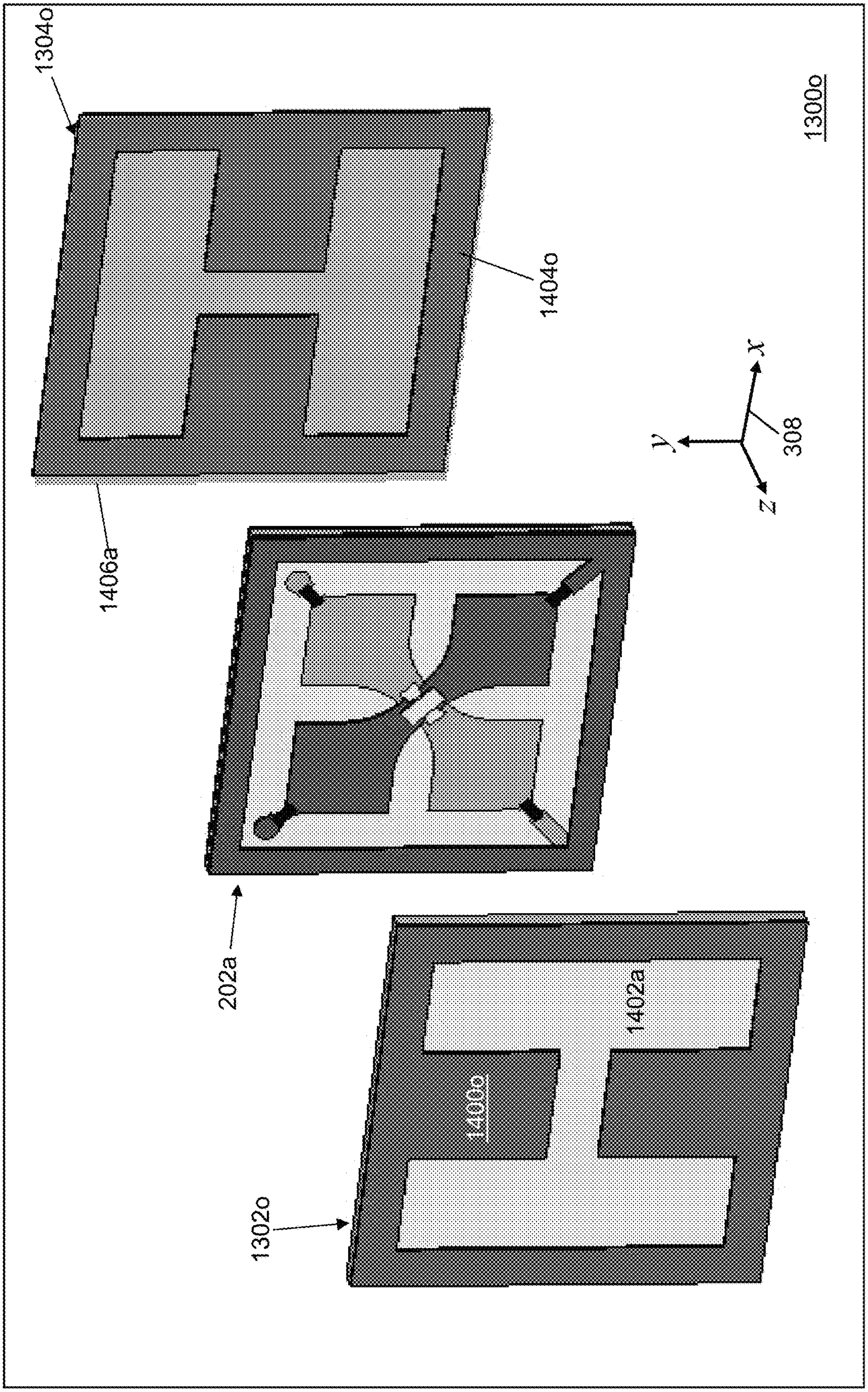
FIG. 18J depicts a perspective view of a fifteenth polarization rotating layer antenna element comprised of two H-shaped slot conducting layers in accordance with an illustrative embodiment.

Referring to FIG. 18J, a perspective view of a fifteenth polarization rotating layer antenna element 13000 is shown comprised of two H-shaped slot conducting layers in accordance with an illustrative embodiment. Fifteenth polarization rotating layer antenna element 13000 includes a first H-shaped slot impedance structure 13020, first polarization rotating element 202*a*, and a second H-shaped slot impedance structure 13040. First H-shaped slot impedance structure 13020 and second H-shaped slot impedance structure 13040 are identical except that second H-shaped slot impedance structure 13040 is rotated 90° in the x-y plane and 180° in the x-z plane relative to first H-shaped slot impedance structure 13020. First H-shaped slot impedance structure 13020 may include an eleventh conductive slab 14000 formed of conductive material layered on, against, or adjacent to first dielectric slab 1402*a*. An H-shaped slot wall may be formed through eleventh conductive slab 14000. Second H-shaped slot impedance structure 13040 may include a twelfth conductive slab 14040 formed of conductive material layered on, against, or adjacent to second dielectric slab 1406*a*. An H-shaped slot wall may be formed through twelfth conductive slab 14040. Eleventh conductive slab 14000 and twelfth conductive slab 14040 may be modeled as resonant layers that may include the shunt inductors $L_{F1}$ and $L_{F2}$ and the shunt capacitors $C_{F1}$ and $C_{F2}$ in equivalent circuit 1700.

Figure 18K:
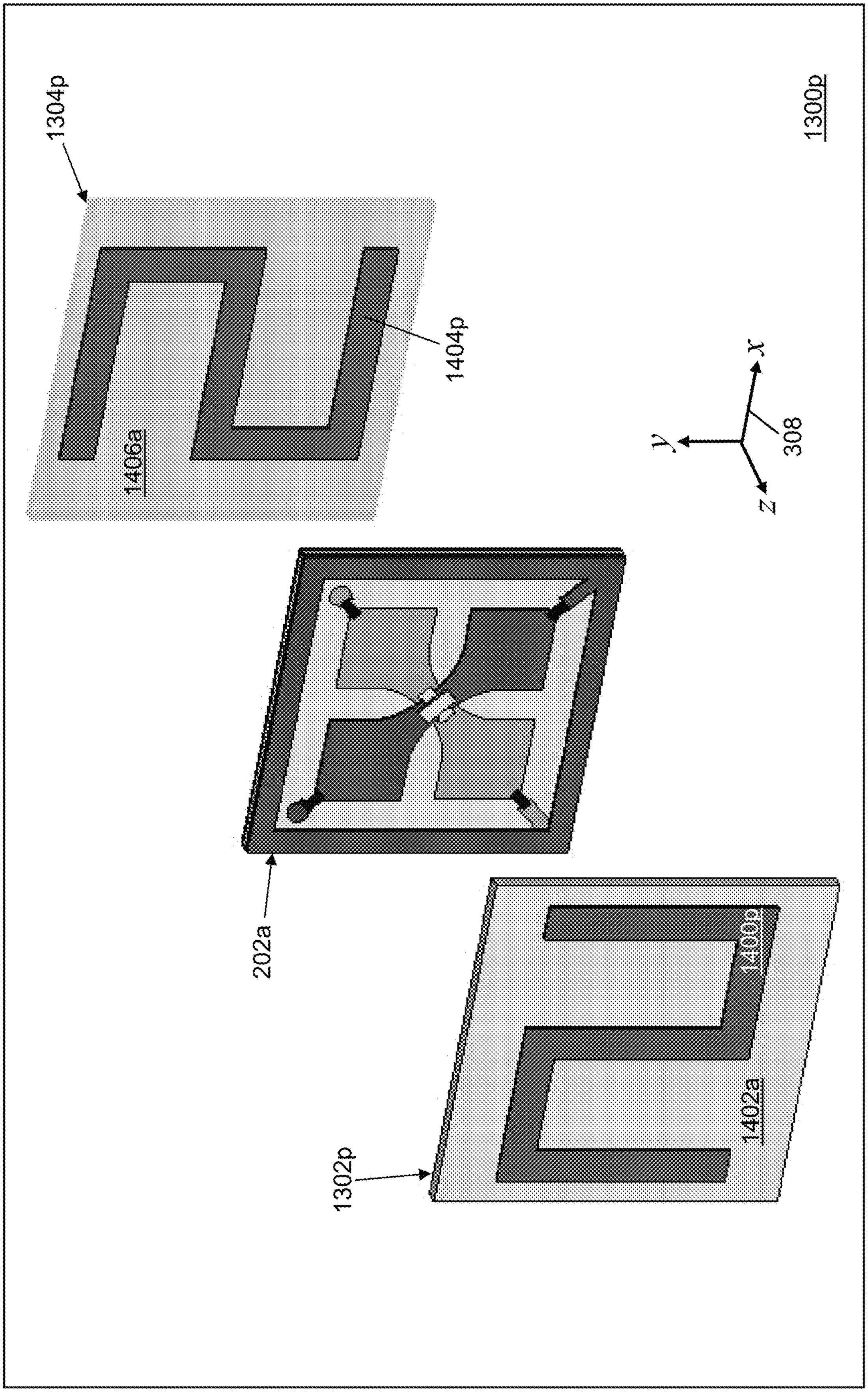
FIG. 18K depicts a perspective view of a sixteenth polarization rotating layer antenna element comprised of two S-shaped resonator conducting layers in accordance with an illustrative embodiment.

Referring to FIG. 18K, a perspective view of a sixteenth polarization rotating layer antenna element 1300*p* is shown comprised of two S-shaped resonator conducting layers in accordance with an illustrative embodiment. Sixteenth polarization rotating layer antenna element 1300*p* includes a first S-shaped resonator impedance structure 1302*p*, first polarization rotating element 202*a*, and a second S-shaped resonator impedance structure 1304*p*. First S-shaped resonator impedance structure 1302*p* and second S-shaped resonator impedance structure 1304*p* are identical except that second S-shaped resonator impedance structure 1304*p* is rotated 90° in the x-y plane and 180° in the x-z plane relative to first S-shaped resonator impedance structure 1302*p*. First S-shaped resonator impedance structure 1302*p* may include a first S-shaped conductive strip 1400*p* and first dielectric slab 1402*a*. First square S-shaped conductive strip 1400*p* is formed of conductive material layered on, against, or adjacent to first dielectric slab 1402*a* in the shape of a square S. Second S-shaped resonator impedance structure 1304*p* may include a second S-shaped conductive strip 1404*p* and second dielectric slab 1406*a*. Second S-shaped conductive strip 1404*p* is formed of conductive material layered on, against, or adjacent to second dielectric slab 1406*a* in the shape of a square S. First S-shaped conductive strip 1400*p* and second S-shaped conductive strip 1404*p* may be modeled as resonant layers that may include the shunt inductors $L_{F1}$ and $L_{F2}$ and the series capacitors $C_{S1}$ and $C_{S2}$ in equivalent circuit 1700.

Figure 18L:
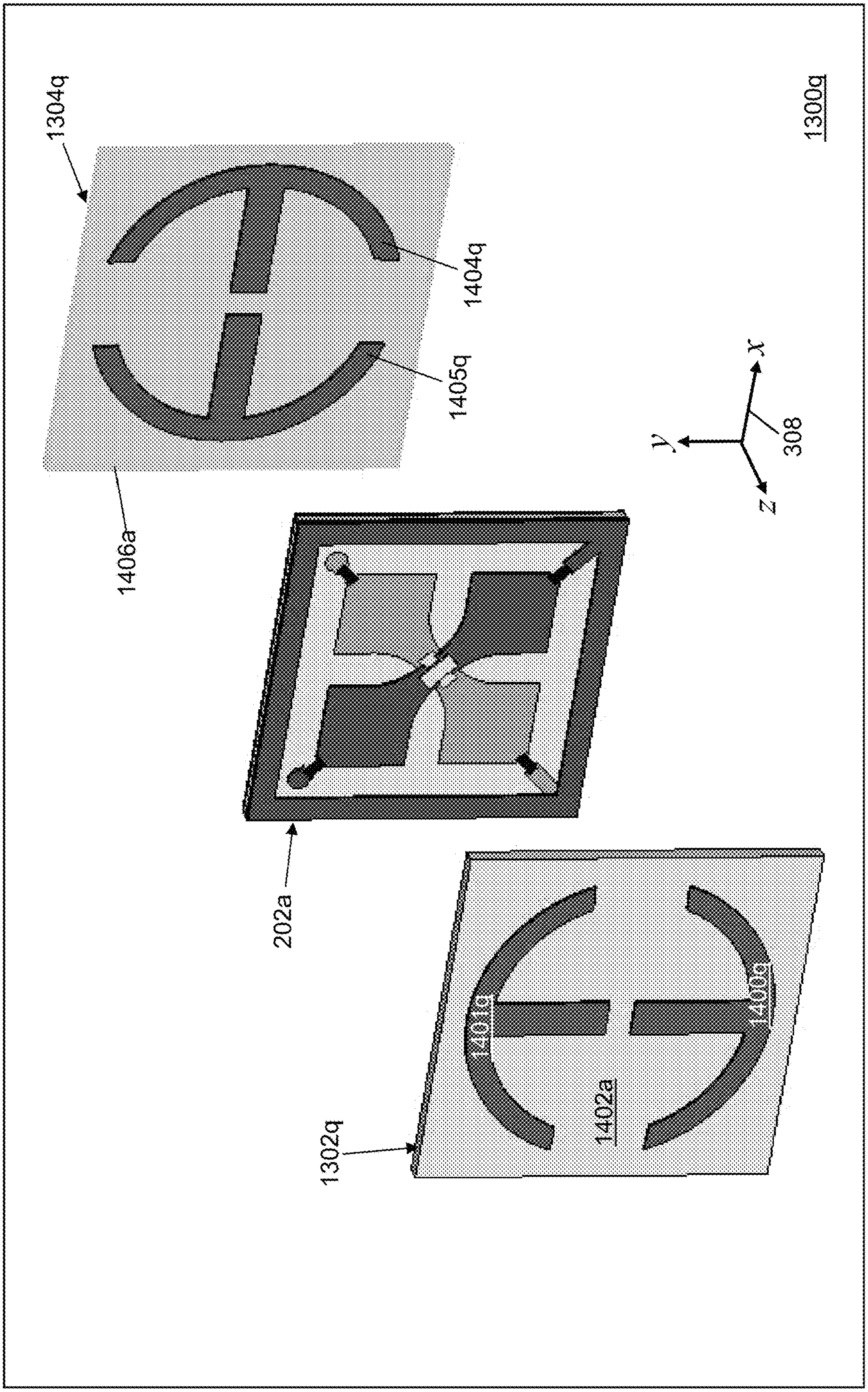
FIG. 18L depicts a perspective view of a seventeenth polarization rotating layer antenna element comprised of two split-ring conducting layers in accordance with an illustrative embodiment.

Referring to FIG. 18L, a perspective view of a seventeenth polarization rotating layer antenna element 1300*q* is shown comprised of two split-ring conducting layers in accordance with an illustrative embodiment. Seventeenth polarization rotating layer antenna element 1300*q* includes a first split-ring impedance structure 1302*q*, first polarization rotating element 202*a*, and a second split-ring impedance structure 1304*q*. First split-ring impedance structure 1302*q* and second split-ring impedance structure 1304*q* are identical except that second split-ring impedance structure 1304*q* is rotated 90° in the x-y plane and 180° in the x-z plane relative to first split-ring impedance structure 1302*q*. First split-ring antenna 1302*q* may include a first split-ring conductive strip 1400*q*, a second split-ring conductive strip 1401*q*, and first dielectric slab 1402*a*. First split-ring conductive strip 1400*q* and second split-ring conductive strip 1401*q* are formed of conductive material layered on, against, or adjacent to first dielectric slab 1402*a*. First split-ring conductive strip 1400*q* and second split-ring conductive strip 1401*q* are identical except that second split-ring conductive strip 1401*q* is rotated 180° in the x-y plane relative to first split-ring conductive strip 1400*q*. First split-ring conductive strip 1400*q* and second split-ring conductive strip 1401*q* together form a broken ring with a broken center conductor. Second split-ring impedance structure 1304*q* may include a third split-ring conductive strip 1404*q*, a fourth split-ring conductive strip 1405*q*, and second dielectric slab 1406*a*. Third split-ring conductive strip 1404*q* and fourth split-ring conductive strip 1405*q* are formed of conductive material layered on, against, or adjacent to second dielectric slab 1406*a*. Third split-ring conductive strip 1404*q* and fourth split-ring conductive strip 1405*q* are identical except that fourth split-ring conductive strip 1405*q* is rotated 180° in the x-y plane relative to third split-ring conductive strip 1404*q*. Third split-ring conductive strip 1404*q* and fourth split-ring conductive strip 1405*q* together form a broken ring with a broken center conductor. First split-ring conductive strip 1400*q* and second split-ring conductive strip 1401*q* may be modeled as resonant layers that may include the shunt inductors $L_{F1}$ and $L_{F2}$ and the shunt capacitors $C_{F1}$ and $C_{F2}$ in equivalent circuit 1700.

Figure 18M:
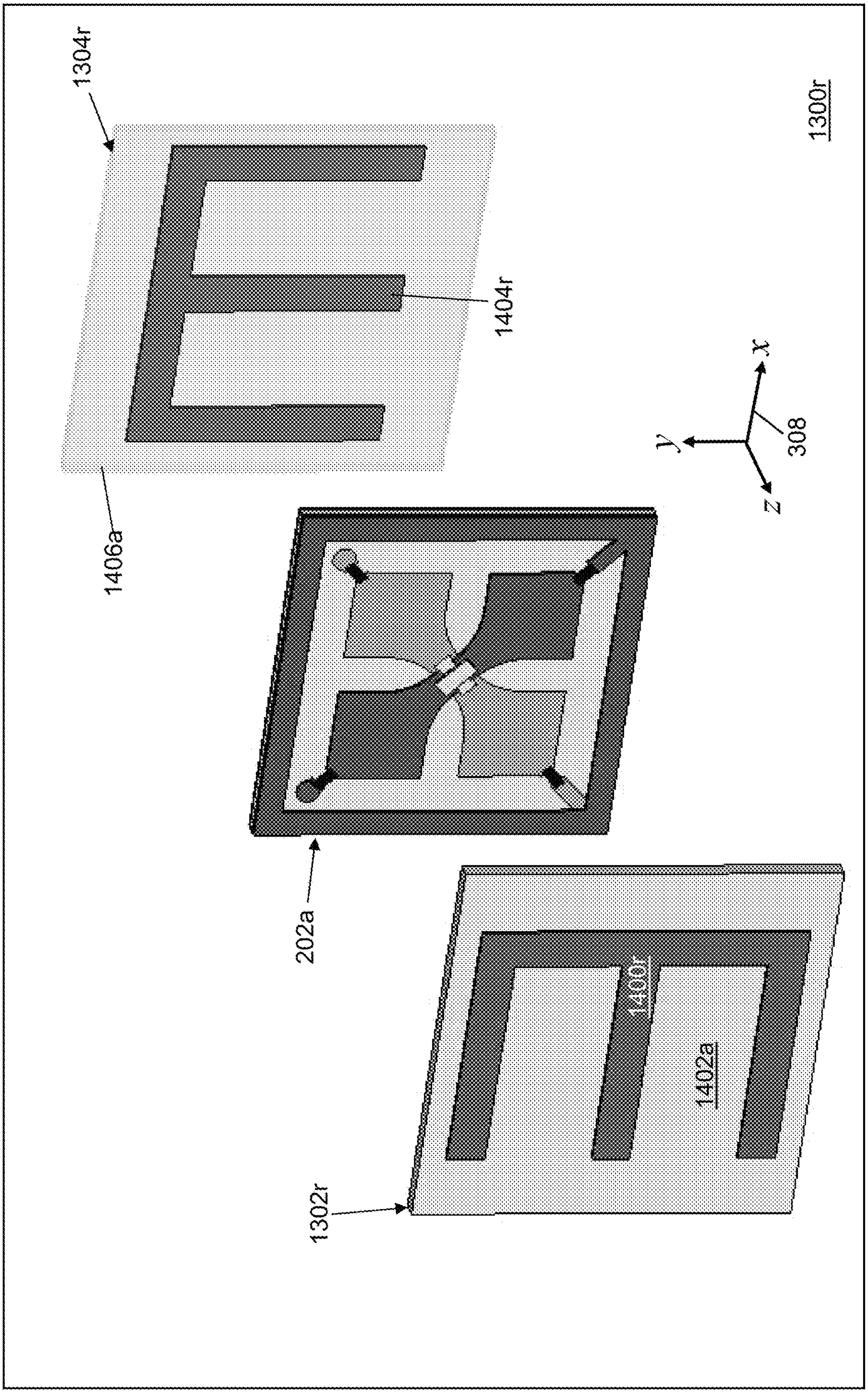
FIG. 18M depicts a perspective view of an eighteenth polarization rotating layer antenna element comprised of two E-shaped resonator conducting layers in accordance with an illustrative embodiment.

Referring to FIG. 18M, a perspective view of an eighteenth polarization rotating layer antenna element 1300*r* is shown comprised of two E-shaped resonator conducting layers in accordance with an illustrative embodiment. Eighteenth polarization rotating layer antenna element 1300*r* includes a first E-shaped resonator impedance structure 1302*r*, first polarization rotating element 202*a*, and a second E-shaped resonator impedance structure 1304*r*. First E-shaped resonator impedance structure 1302*r* and second E-shaped resonator impedance structure 1304*r* are identical except that second E-shaped resonator impedance structure 1304*r* is rotated 90° in the x-y plane and 180° in the x-z plane relative to first E-shaped resonator impedance structure 1302*r*. First E-shaped resonator impedance structure 1302*r* may include a first E-shaped conductive strip 1400*r* and first dielectric slab 1402*a*. First square E-shaped conductive strip 1400*r* is formed of conductive material layered on, against, or adjacent to first dielectric slab 1402*a* in the shape of an E. Second E-shaped resonator impedance structure 1304*r* may include a second E-shaped conductive strip 1404*r* and second dielectric slab 1406*a*. Second E-shaped conductive strip 1404*r* is formed of conductive material layered on, against, or adjacent to second dielectric slab 1406*a* in the shape of an E. First E-shaped conductive strip 1400*r* and second E-shaped conductive strip 1404*r* may be modeled as resonant layers that may include the shunt inductors $L_{F1}$ and $L_{F2}$ and the series capacitors $C_{S1}$ and $C_{S2}$ in equivalent circuit 1700.

Figure 18N:
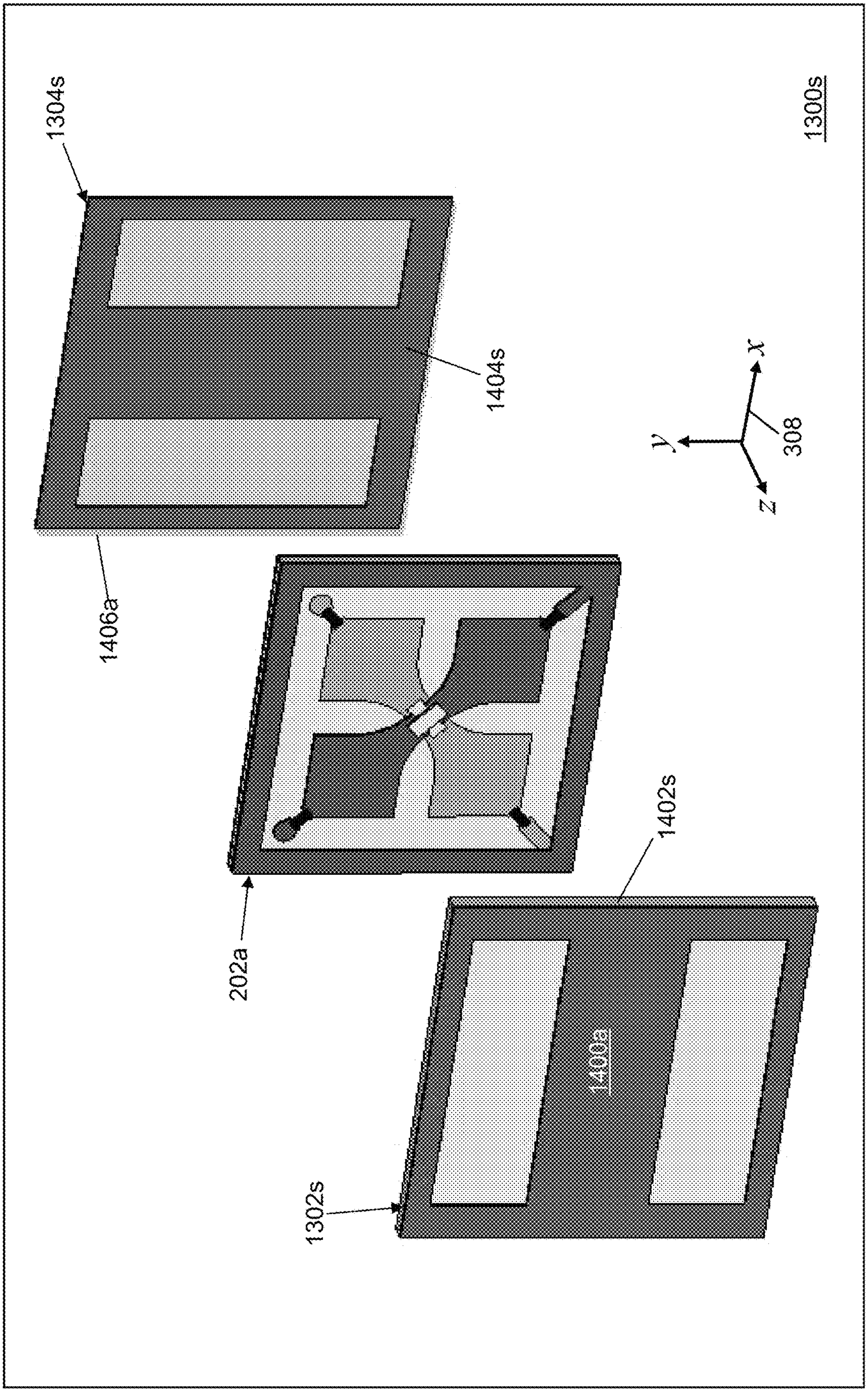
FIG. 18N depicts a perspective view of a nineteenth polarization rotating layer antenna element comprised of two rectangular slot array conducting layers in accordance with an illustrative embodiment.

Referring to FIG. 18N, a perspective view of a nineteenth polarization rotating layer antenna element 1300*s* is shown comprised of two rectangular slot array conducting layers in accordance with an illustrative embodiment. Nineteenth polarization rotating layer antenna element 1300*s* includes a first rectangular slot array impedance structure 1302*s*, first polarization rotating element 202*a*, and a second rectangular slot array impedance structure 1304*s*. First rectangular slot array impedance structure 1302*s* and second rectangular slot array impedance structure 1304*s* are identical except that second rectangular slot array impedance structure 1304*s* is rotated 90° in the x-y plane and 180° in the x-z plane relative to first rectangular slot array impedance structure 1302*s*. First rectangular slot array impedance structure 1302*s* may include a thirteenth conductive slab 1400*s* formed of conductive material layered on, against, or adjacent to first dielectric slab 1402*a*. Two identical rectangular slot walls may be formed through thirteenth conductive slab 1400*s*. Second rectangular slot array impedance structure 1304*s* may include a fourteenth conductive slab 1404*s* formed of conductive material layered on, against, or adjacent to second dielectric slab 1406*a*. Two identical rectangular slot walls may be formed through fourteenth conductive slab 1404*s*. Thirteenth conductive slab 1400*s* and fourteenth conductive slab 1404*s* may be modeled as inductive layers such that only the shunt inductors $L_{F1}$ and $L_{F2}$ are included in the equivalent circuit without the shunt capacitors $C_{F1}$ and $C_{F2}$ or the series capacitors $C_{S1}$ and $C_{S2}$.

In FIGS. 18A through 18N, second dielectric slab 1406*a* is transparent. In FIGS. 18A through 18N, first dielectric slab 1402*a* and second dielectric slab 1406*a* may have different dimensions in the x-y plane and the y-z plane depending on the embodiment.

Though the illustrative embodiments of polarization rotating antenna element 106 and of polarization rotating layer antenna element 1300 are shown with the first antenna and the second antenna identical except that the second antenna is rotated 90° in the x-y plane and 180° in the x-z plane relative to the first antenna, the first antenna and the second antenna need not be identical. For example, an antenna system may be housed within a radome to protect it from the environment. Radomes are typically composed of dielectric materials and are often placed in close proximity to the antenna itself. The radome may load the structure asymmetrically because the radome is only positioned on one side of the antenna. The presence of the radome changes the effective wave impedance on one side of the antenna and not on the other. To compensate for this effect, asymmetric antennas can be designed to account for the different wave impedance on the sides of the antenna.

Further, first dielectric slab 1402*a* and second dielectric slab 1406*a* need not be identical.

As understood by a person of skill in the art, dimensions of each polarization rotating antenna element 106 may be defined based on a desired center frequency of the incoming electromagnetic wave. Further, the design may vary based on a location in the array. For example, a key challenge in designing a phase array system involves addressing performance issues related to unit cell size and spacing, particularly concerning grating lobes. The demand for wide bandwidth and wide-scan angle capabilities may lead to a preference for smaller spacing between the elements (typically limited to 0.5) for a wide-angle scanned beam) to avoid formation of high grating lobes. However, the use of densely packed arrays with small element spacing, especially within large apertures, introduces significant costs and complexity of implementation due to the need for a substantial number of electronically reconfigurable phase shifters and associated components. A possible solution involves the use of unit cell sizes with different sizes and shapes within the same array.

To balance the trade-off between performance and cost within the large aperture, a potentially effective approach involves modifying the element spacing based on their proximity to the array center. Recognizing that in an antenna array with a large aperture, elements closer to the center have a more significant impact on the array's overall performance due to amplitude tapering over the aperture. Therefore, smaller element spacings may be used in regions closer to a center of the aperture. Since these elements have the largest excitation coefficients (due to amplitude tapering from the feed), their performance is the most important to the overall performance of the phased-array. Simultaneously, adopting a triangular, rectangular, or hexagonal lattice for the border elements enables us to use fewer elements on the periphery of the aperture where the excitation coefficients of the elements are lower and the performance of those elements are less significant to the overall performance of the array. This choice allows for increasing the effective spacing between peripheral elements, resulting in a reduction of the number of required elements in the array without considerably compromising functionality. This strategic adjustment offers a balance between the desired performance and the cost/complexity of the phased-array.

In contrast to a square-shaped unit cell that provides symmetric beam steering across azimuth and elevation, a rectangular lattice introduces an asymmetry. This asymmetry becomes advantageous when a wider beam scan angle is desired in one direction compared to the other. This allows larger element spacing along the directions where a limited scan angle is needed thereby reducing the total elements of the array that need to be electronically controlled.

A hexagonal shaped unit cell is useful for designing phased-array antennas with triangular lattice shapes compared to square or rectangular lattice shapes for the array element. Depending on the desired beam scan angle in the principal planes of radiation, arrays with triangular grids can be designed to provide the desired scan coverage with a fewer number of radiating elements.

Any of second polarization rotating element 202*b*, third polarization rotating element 202*c*, fourth polarization rotating element 202*d*, fifth polarization rotating element 202*e*, sixth polarization rotating element 202*f*, and seventh polarization rotating element 202*g* may replace first polarization rotating element 202*a* in the illustrative embodiments of polarization rotating antenna element 106 provided herein.

As understood by a person of skill in the art, dimensions of each polarization rotating layer antenna element 1300 may be defined based on a desired center frequency of the incoming electromagnetic wave. For example, equivalent circuit 1700 may be used to determine the dimensions of each polarization rotating layer antenna element 1300 based on the materials selected for use. Any of second polarization rotating element 202*b*, third polarization rotating element 202*c*, fourth polarization rotating element 202*d*, fifth polarization rotating element 202*e*, sixth polarization rotating element 202*f*, and seventh polarization rotating element 202*g* may replace first polarization rotating element 202*a* in the illustrative embodiments of polarization rotating layer antenna element 1300 provided herein.

As understood by a person of skill in the art, different shaped conducting layers may be formed on first dielectric slab 1402*a* and second dielectric slab 1406*a* in addition to those illustrated in FIGS. 14A-14D and 18A, 18B, 18F-18H, and 18K-18M. As understood by a person of skill in the art, different shaped slot walls may be formed on a conducting slab in addition to those illustrated in FIGS. 14E and 18C-18E, 18I, 18J, and 18N.

As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, etch, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

Any directional references used herein, such as left-side, right-side, top, bottom, back, front, up, down, above, below, etc., are for illustration only based on the orientation in the drawings selected to describe the illustrative embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. An antenna element comprising:

a first impedance structure comprising:

- a first dielectric slab formed of a first dielectric material, wherein the first dielectric slab has a first face and a second face, wherein the first face is on an opposite side of the first dielectric slab relative to the second face; and
- a first conducting pattern layer formed of a first electrically conductive material, wherein the first conducting pattern layer is mounted on the first face of the first dielectric slab;

a second impedance structure comprising:

- a second dielectric slab formed of a second dielectric material, wherein the second dielectric slab has a third face and a fourth face, wherein the third face is on an opposite side of the second dielectric slab relative to the fourth face; and
- a second conducting pattern layer formed of a second electrically conductive material, wherein the second conducting pattern layer is mounted on the third face of the second dielectric slab; and a polarization rotating element comprising:

a frame formed of a third electrically conductive material;

a third dielectric slab including a first dielectric surface and a second dielectric surface formed within the frame, wherein the first dielectric surface is on an opposite side of the third dielectric slab relative to the second dielectric surface, wherein the third dielectric slab is formed of a third dielectric material;

a third conducting pattern layer formed of a third electrically conductive material mounted to the first dielectric surface between the first dielectric surface and the second face of the first dielectric slab, wherein the third conducting pattern layer includes a first conductor and a second conductor;

a first switch connected between the first conductor and the second conductor to electrically connect the first conductor to the second conductor or to electrically disconnect the first conductor from the second conductor, wherein, when the first conductor and the second conductor are electrically connected, the first conductor and the second conductor form a first dipole;

a fourth conducting pattern layer formed of a fourth electrically conductive material mounted to the second dielectric surface between the second dielectric surface and the fourth face of the second dielectric slab, wherein the fourth conducting pattern layer includes a third conductor and a fourth conductor; and a second switch connected between the third conductor and the fourth conductor to electrically connect the third conductor to the fourth conductor or to electrically disconnect the third conductor from the fourth conductor, wherein, when the third conductor and the fourth conductor are electrically connected, the third conductor and the fourth conductor form a second dipole.

2. The antenna element of claim 1, wherein an incoming electric field propagates through the first impedance structure, the polarization rotating element, and the second impedance structure in the axial direction.

3. The antenna element of claim 1, wherein at least one of the first electrically conductive material, the second electrically conductive material, the third electrically conductive material, and the fourth electrically conductive material is formed of a different electrically conductive material relative to any other of the first electrically conductive material, the second electrically conductive material, the third electrically conductive material, and the fourth electrically conductive material.

4. The antenna element of claim 1, wherein the fourth conducting pattern layer is identical to the third conducting pattern layer.

5. The antenna element of claim 1, wherein the first conducting pattern layer is identical to the second conducting pattern layer.

6. The antenna element of claim 1, wherein the first dielectric slab layer is identical to the second dielectric slab.

7. The antenna element of claim 6, wherein the first conducting pattern layer is identical to the second conducting pattern layer.

8. The antenna element of claim 1, wherein, when the first switch electrically connects the first conductor to the second conductor, the second switch electrically disconnects the third conductor from the fourth conductor to define a first mode of the polarization rotating element.

9. The antenna element of claim 8, wherein the first mode is configured to rotate a polarization of an outgoing electric field by 90 degrees relative to an incoming electric field.

10. The antenna element of claim 9, wherein, when the second switch electrically connects the third conductor to the fourth conductor, the first switch electrically disconnects the first conductor from the second conductor to define a second mode of the polarization rotating element.

11. The antenna element of claim 10, wherein the second mode is configured to rotate the polarization of the outgoing electric field by −90 degrees relative to the incoming electric field.

12. The antenna element of claim 1, wherein the first switch and the second switch are single pole, single throw switches.

13. The antenna element of claim 1, wherein the first switch comprises:

a diode connected between the first conductor and the second conductor;

a first bias line connected to a first end of the first conductor opposite where the diode is connected to the first conductor; and a second bias line connected to a first end of the second conductor opposite where the diode is connected to the second conductor.

14. The antenna element of claim 13, wherein a voltage applied to the first bias line or to the second bias line controls whether the first switch electrically connects the first conductor to the second conductor or electrically disconnects the first conductor from the second conductor.

15. The antenna element of claim 1, wherein the first conducting pattern layer comprises a conductive slab with a slot wall formed through the conductive slab.

16. The antenna element of claim 15, wherein the slot wall forms at least one shape selected from the group consisting of a polygonal shape, a cross shape, a V-shape, an H-shape.

17. The antenna element of claim 1, wherein the first conducting pattern layer comprises a conductive slab, wherein the conductive slab is sized and shaped identical to the first dielectric slab.

18. The antenna element of claim 1, wherein the first conducting pattern layer comprises at least one continuous conductive strip forming a shape selected from the group consisting of a polygonal shape, a strip shape, a cross shape, a Jerusalem cross shape, an L-shape, a top squared off triangle shape, a square C-shape, a square S-shape, an E-shape, and a split-ring shape.

19. The antenna element of claim 1, wherein the first conducting pattern layer comprises a plurality of conductive strips.

20. A phased array antenna comprising:

a plurality of antenna elements, wherein each antenna element of the plurality of antenna elements comprises a first impedance structure comprising:

a first dielectric slab formed of a first dielectric material, wherein the first dielectric slab has a first face and a second face, wherein the first face is on an opposite side of the first dielectric slab relative to the second face; and a first conducting pattern layer formed of a first electrically conductive material, wherein the first conducting pattern layer is mounted on the first face of the first dielectric slab;

a second impedance structure comprising:

a second dielectric slab formed of a second dielectric material, wherein the second dielectric slab has a third face and a fourth face, wherein the third face is on an opposite side of the second dielectric slab relative to the fourth face; and a second conducting pattern layer formed of a second electrically conductive material, wherein the second conducting pattern layer is mounted on the third face of the second dielectric slab; and a polarization rotating element comprising:

a frame formed of a third electrically conductive material;

a third dielectric slab including a first dielectric surface and a second dielectric surface formed within the frame, wherein the first dielectric surface is on an opposite side of the third dielectric slab relative to the second dielectric surface, wherein the third dielectric slab is formed of a third dielectric material;

a third conducting pattern layer formed of a third electrically conductive material mounted to the first dielectric surface between the first dielectric surface and the second face of the first dielectric slab, wherein the third conducting pattern layer includes a first conductor and a second conductor;

a first switch connected between the first conductor and the second conductor to electrically connect the first conductor to the second conductor or to electrically disconnect the first conductor from the second conductor, wherein, when the first conductor and the second conductor are electrically connected, the first conductor and the second conductor form a first dipole;

a fourth conducting pattern layer formed of a fourth electrically conductive material mounted to the second dielectric surface between the second dielectric surface and the fourth face of the second dielectric slab, wherein the fourth conducting pattern layer includes a third conductor and a fourth conductor; and a second switch connected between the third conductor and the fourth conductor to electrically connect the third conductor to the fourth conductor or to electrically disconnect the third conductor from the fourth conductor, wherein, when the third conductor and the fourth conductor are electrically connected, the third conductor and the fourth conductor form a second dipole.

* * * * *